United States Patent
Uehara

(10) Patent No.: US 8,749,722 B2
(45) Date of Patent: Jun. 10, 2014

(54) DISPLAY DEVICE DISPLAYING AN IMAGE FOR A FIRST VIEWPOINT AND AN IMAGE FOR A SECOND VIEWPOINT

(75) Inventor: Shin-Ichi Uehara, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 11/976,118

(22) Filed: Oct. 22, 2007

(65) Prior Publication Data

US 2008/0094700 A1 Apr. 24, 2008

(30) Foreign Application Priority Data

Oct. 23, 2006 (JP) .................................. 2006-288066
Oct. 11, 2007 (JP) .................................. 2007-265912

(51) Int. Cl.
*G02F 1/1335* (2006.01)
(52) U.S. Cl.
USPC ................................ 349/15; 349/95; 349/112
(58) Field of Classification Search
USPC ............................................. 349/15, 95, 112
See application file for complete search history.

(56) References Cited

U.S. PATENT DOCUMENTS

| | | | | |
|---|---|---|---|---|
| 5,831,765 A * | 11/1998 | Nakayama et al. | ........... | 359/464 |
| 6,364,497 B1 * | 4/2002 | Park et al. | ........... | 362/627 |
| 6,864,862 B2 * | 3/2005 | Sato et al. | ........... | 345/32 |
| 7,420,741 B2 * | 9/2008 | Uehara et al. | ........... | 359/619 |
| 2002/0036731 A1 * | 3/2002 | Takahashi et al. | ........... | 349/112 |
| 2005/0099688 A1 * | 5/2005 | Uehara et al. | ........... | 359/462 |
| 2006/0001974 A1 * | 1/2006 | Uehara et al. | ........... | 359/619 |
| 2006/0091391 A1 * | 5/2006 | Lee et al. | ........... | 257/59 |
| 2006/0146208 A1 * | 7/2006 | Kim | ........... | 349/15 |

FOREIGN PATENT DOCUMENTS

| | | |
|---|---|---|
| CN | 1289054 | 3/2001 |
| CN | 2563604 | 7/2003 |
| JP | 6-32354 | 12/1994 |
| JP | 2001-249205 | 9/2001 |
| JP | 2002-107510 | 4/2002 |
| JP | 2002-174852 | 6/2002 |
| JP | 2004-212916 | 7/2004 |
| JP | 2004-280079 | 10/2004 |

(Continued)

OTHER PUBLICATIONS

Chinese Patent Office issued a Chinese Office Action dated Nov. 20, 2009, Application No. 2007101668636.

(Continued)

*Primary Examiner* — Bumsuk Won
*Assistant Examiner* — Charles Chang
(74) *Attorney, Agent, or Firm* — Young & Thompson

(57) ABSTRACT

A reflective liquid crystal display panel is a display panel for three-dimensional display in which pixel pairs as display elements composed of one left-eye pixel L and right-eye pixel R each are provided in a matrix. The lenticular lens is an optical member for image separation that is provided to separate the light from the left and right pixels, and numerous lenticular lenses form a lens array that is arranged in one dimension. An anisotropic scattering sheet as an anisotropic scattering element is provided between the lenticular lens and the reflective liquid crystal display panel. In this configuration, a reduction in the quality of the reflective display can be minimized, and improved image quality can be achieved without changing the concavo-convex structure of the reflecting panel and the lens shape of the lenticular lens in display device that is capable of displaying different images to a plurality of viewpoints.

12 Claims, 44 Drawing Sheets

(56) References Cited

FOREIGN PATENT DOCUMENTS

| JP | 2005-78824 | 3/2005 |
| JP | 2005-316372 | 11/2005 |
| JP | 2005-326803 | 11/2005 |
| JP | 2006-17820 | 1/2006 |
| JP | 2006-030512 | 2/2006 |
| JP | 2006-251352 | 9/2006 |
| WO | 01/38932 | 5/2001 |

OTHER PUBLICATIONS

Chinese Patent Office issued a Chinese Office Action dated Jun. 30, 2010, Application No. 200710166863.6.
Japanese Official Action—2007-265912—May 22, 2012.
JP Office Action dated Jul. 2, 2013, with partial English translation; Application No. 2012-163158.

* cited by examiner

DISPLAY DEVICE DISPLAYING AN IMAGE FOR A FIRST VIEWPOINT AND AN IMAGE FOR A SECOND VIEWPOINT

BACKGROUND OF THE INVENTION

1. Field of the Invention

The present invention relates to a display device capable of displaying an image toward each of a plurality of viewpoints, and to a terminal device, and particularly relates to a display device capable of reducing a deterioration in display quality due to the structure of the display device, to a terminal device, and to a display panel and optical member that can be suitably used in the display device and terminal device.

2. Description of the Related Art

Due to recent technological development, display panels are deployed and used in various locations in a range of devices that includes monitors, television receivers, and other large terminal devices; notebook personal computers, cash dispensers, vending machines, and other mid-sized terminal devices; and personal TVs, PDAs (Personal Digital Assistance: personal information terminal), mobile phones, mobile gaming devices, and other small terminal devices. Because of their thin profile, light weight, small size, low energy consumption, and other advantages, display devices that use liquid crystals in particular are deployed in a large number of terminal devices. Current display devices show the same content as is visible in the frontal direction even when observed from a viewpoint that is not in the frontal direction, but display devices that enable a different image to be viewed according to the viewpoint are being developed, and are anticipated as next-generation display devices. A three-dimensional image display device can be cited as an example of a device that is capable of displaying a different image to each of a plurality of viewpoints. A three-dimensional image display device must have a function for providing different images for left and right viewpoints, i.e., parallax images to the left and right eyes.

Numerous three-dimensional image display systems have been investigated in the past as methods for specifically implementing the function described above, and these systems can be broadly classified as systems that use eyeglasses and systems that do not use eyeglasses. Systems that use eyeglasses include anaglyph systems that use a color difference, polarized-light eyeglass systems that use polarized light, and other systems, but the inconvenience of eyeglasses is inherent to these systems. Eyeglass-free systems that do not use eyeglasses have therefore been heavily investigated in recent years.

Eyeglass-free systems include lenticular lens systems, parallax barrier systems, and the like. As described in Japanese Laid-open Patent Application No. 2004-280079, a lenticular lens system uses a lenticular lens as means for dividing an image with respect to a plurality of viewpoints. In the lenticular lens, one of the surfaces is composed of a flat surface, and the opposite surface has a plurality of semi-cylindrical convex parts (cylindrical lenses) extending in one direction that are formed so as to be parallel to each other in the longitudinal direction thereof. In a lenticular lens three-dimensional image display device, the lenticular lens and the display panel are arranged in sequence from the direction of the observer, and the pixels of the display panel are positioned at the focal plane of the lenticular lens. In the display panel, pixels for displaying a right-eye image and pixels for displaying a left-eye image are arranged in alternating fashion. At this time, groups of adjacent pixels correspond to the convex parts of the lenticular lens. The light from the pixels is thereby allocated to the directions of the left and right eyes by the convex parts of the lenticular lens. Different images can be recognized by the left and right eyes, and the observer can recognize a three-dimensional image.

A parallax barrier system uses a barrier (light-blocking panel) in which numerous openings in the shape of narrow vertical stripes, i.e., slits, are formed as a means for dividing an image. Groups comprising pixels for displaying a left-eye image and pixels for displaying a right-eye image are arranged to correspond to the slits of the parallax barrier. As a result, the pixels for displaying the left-eye image are blocked by the barrier and unable to be seen by the observer's right eye, and only the pixels for displaying the right-eye image are visible to the observer's right eye. In the same manner, the pixels for displaying the right-eye image are blocked by the barrier and unable to be seen by the observer's left eye, and only the pixels for displaying the left-eye image are visible to the observer's left eye. As a result, the observer can recognize a three-dimensional image when a parallax image is displayed.

When the parallax barrier system was first proposed, the parallax barrier was positioned between the pixels and the eyes, thereby obstructing the view and creating the problem of poor visibility. However, recent developments in liquid crystal display devices have enabled the parallax barrier to be placed behind the display panel, thereby improving visibility. Parallax barrier three-dimensional image display devices are therefore being actively investigated. However, a parallax barrier system is a system for "hiding" unnecessary light rays using a barrier, whereas a lenticular lens system changes the propagation direction of light, and the lenticular lens system has an advantage in that there is no reduction of the brightness of the display image in principle. A lenticular lens system is therefore being investigated for application in mobile devices and the like in particular, in which high-luminance display and low power consumption are important.

A multi-image simultaneous display device capable of displaying a plurality of different images to multiple viewpoints at the same time has been developed (see Japanese Laid-open Patent Application No. 06-332354, for example) as another example of a device that is capable of displaying different images to a plurality of viewpoints. In this display, a function for allocating an image using a lenticular lens is utilized to display a different image for each observation direction simultaneously under the same conditions. A single multi-image simultaneous display device can thereby simultaneously provide images that differ from each other to a plurality of observers who are positioned in different directions from each other with respect to the display device. According to Japanese Laid-open Patent Application No. 06-332354, the use of this multi-image simultaneous display device enables reductions in installation space and electricity cost in comparison to preparing a number of normal single-image display devices equal to the number of images that are to be displayed at one time.

Since a different image can thus be displayed to each different viewpoint, display devices in which a lenticular lens, parallax barrier, or other optical member is provided are being actively investigated. However, the present inventors have discovered that several problems occur when an optical member is merely provided, and the inventors have proposed means for overcoming these problems.

For example, when a semi-transmissive display panel and a reflective display panel that is provided with a reflecting panel having an concavo-convex (i.e. meaning "protruding" here and hereafter) structure in the pixels is used as described in Japanese Laid-open Patent Application No. 2004-280079, a region occurs in which the luminance of the display is partially reduced according to the observation position, the display appears to darken in the position in which the luminance was reduced when the observation position is changed, and in some cases, a dark lined pattern is observed to be superimposed on the image. The display quality is visibly reduced by this change in the luminance of the display. The cause of this problem is that the reflection angle varies according to the tilt angle of the tilted surfaces that constitute the concavo-convex structure when external light that is focused by the lenticular lens is reflected by the concavo-convex structure formed on the reflecting panel. Japanese Laid-open Patent Application No. 2004-280079 therefore proposes a method for providing the lenticular lens so that the focal distance thereof differs from the distance between the reflecting panel and the lens; a method for setting the tilted surfaces of the concavo-convex structure so that the concavo-convex structure reflects the light multiple times that is focused by the lenticular lens; and a method for setting the concavo-convex structure so that the probability of a tilted surface having a certain tilt angle being present in the concavo-convex structure is uniform among the pixels in the alignment direction of the cylindrical lenses.

As described in Japanese Laid-open Patent Application No. 2006-17820, another problem that occurs when an optical member is provided is that a fringe pattern is superimposed on the display image, and display quality is severely reduced by the effect of the concavo-convex structure formed in the illumination member of the transmissive display device when an optical member used for image separation is incorporated into a transmissive display device. The cause of this problem is that an in-plane distribution occurs in the directivity of light rays emitted from the illumination member due to the concavo-convex structure that is formed in the illumination member, and this in-plane distribution is visibly magnified by the optical member for image separation. This problem is exacerbated as the concavo-convex structure of the illumination member is brought closer to the focal plane of the lenticular lens by profile reduction and the like. Japanese Laid-open Patent Application No. 2006-17820 therefore proposes a method for minimizing the reduction of display quality by making the distance between adjacent convex parts in the concavo-convex structure smaller than the value obtained by multiplying the distance between the concavo-convex structure and the pixels by the lens pitch of the lenticular lens and dividing the result by the focal distance, and by varying the concavo-convex structure according to the lenticular lens used.

However, such problems as the following are apparent in the methods described above for overcoming the issues described above, i.e., the reduction in display quality caused by the concavo-convex structure formed in the reflecting panel, or the image quality reduction due to the concavo-convex structure formed in the illumination member, by varying the performance of the concavo-convex structure or the lenticular lens. Specifically, problems occur in that the lens or other optical element, as well as the concavo-convex structure of the reflecting panel, and the concavo-convex structure of the illumination member must be changed. There may be no options for modification particularly when a common, standardized product is used for the members described above. In the case of a lens, illumination member, or other member that has a three-dimensional shape, a change may have to be made from the molding stage in the case of a surface shape variation, which may involve a large-scale modification. There is therefore a need for a method for overcoming the aforementioned problems by a simpler means without modifying the lens surface or the concavo-convex structure.

As a result of concentrated investigation of display devices provided with a lenticular lens, a parallax barrier, or other optical member, the inventors discovered that the pattern of boundary regions between adjacent pixels or other regions that do not contribute to the display in these display devices is observed as parallel lines in the arrangement direction of the lenses or slits, and that the problem of reduced image quality occurs.

SUMMARY OF THE INVENTION

A first object of the present invention is to provide a display device capable of minimizing a reduction in the quality of a reflective display and achieving increased image quality without changing the concavo-convex structure of the reflecting panel and the lens shape of the lenticular lens in a display device that is provided with an optical member for image separation, to provide a terminal device, to provide a display panel, and to provide an optical member.

A second object of the present invention is to provide a display device capable of minimizing a reduction in the quality of a transmissive display and achieving increased image quality without changing the concavo-convex structure formed in the illumination member and the lens shape of the lenticular lens, to provide a terminal device, to provide a display panel, and to provide an optical member.

A third object of the present invention is to provide a display device capable of achieving increased image quality and minimizing a reduction in image quality that is caused by the pattern of regions that do not contributed to the display being observed as lines that are parallel to the arrangement direction of the lenses and slits, to provide a terminal device, to provide a display panel, and to provide an optical member.

The present invention is characterized in that an anisotropic scattering part is provided to the display device, whereby it is possible to minimize a reduction in the quality of the image displayed using the image separating optical means and the display panel, without dramatically compromising the image separating effect of the lens, the barrier, or other image separating optical means. In order to achieve this, an anisotropic scattering part is preferably provided for scattering light that is incident or excident with respect to the pixels of the display panel so that the scattering in the image separation direction is different from scattering in other directions. As a result, not only is it possible to prevent a reduction in the display image quality, but costs can be reduced because the structure of the image allocation part and the display panel need not be changed.

In particular, the direction of maximum scattering by the anisotropic scattering part is the direction orthogonal to the image separation direction, whereby the image quality can be improved without compromising the image separation effect of the image separation optical means. The anisotropic scattering part is preferably disposed on the image separation means side of the display panel pixels. In this case, in combination with a display panel having a reflecting plate in pixels, deterioration in image quality is minimized by the image allocation part and the concavo-convex structure formed on the reflecting plate, and the image quality of the reflection display can be improved. In combination with a semi-transmissive or [fully] transmissive display panel, it is possible to reduce any deterioration in image quality due to the combination of the image allocation part and the boundary of adjoining pixels, and to improve image quality.

According to the display device of the present invention, furthermore, the direction of maximum scattering of the anisotropic scattering part can be the first direction, where the pixel for displaying an image for the first viewpoint and the pixel for displaying an image for the second viewpoint are arranged in the display unit. The image allocation part allocates light emitted from the pixels to different directions along a first direction. In this case, the anisotropic scattering part is disposed on the rear side of the display panel, thereby maximizing the effect of arresting deterioration in image quality caused by the anisotropic scattering part. It is also possible to increase image quality particularly in the case that a planar light source for emitting light in a plane is provided to the rear side of the display panel. This is because light is emitted in a plane via the concavo-convex structure formed on the surface and interior of the planar light source, but the present invention is able to minimize any deterioration in display quality due to the concavo-convex structure of the planar light source and the image allocation part. Moreover, the use of the anisotropic scattering part enables the scattering direction to be limited, and any decrease in frontal luminance can accordingly be minimized.

According to the present invention, in a display device to which a lenticular lens and a parallax barrier or other optical member for image allocation is provided, an anisotropic scattering part is provided that produces greater scattering in the direction orthogonal to the image allocation direction of the optical member in the display plane than the scattering in the image allocation direction. The effects of the concavo-convex structure formed on the reflecting panel can thereby be reduced, and image quality can be improved. The effects of the concavo-convex structure formed on the illumination member can also be reduced, and image quality can be improved. Furthermore, the effects of non-display regions that are observed as line segments parallel to the image allocation direction can be reduced, and image quality can be improved.

BRIEF DESCRIPTION OF THE DRAWINGS

FIG. 49 shows diagrams relating to an anisotropic scattering sheet that is a structural element of the display device, wherein

DESCRIPTION OF THE PREFERRED EMBODIMENTS

Figure 1:
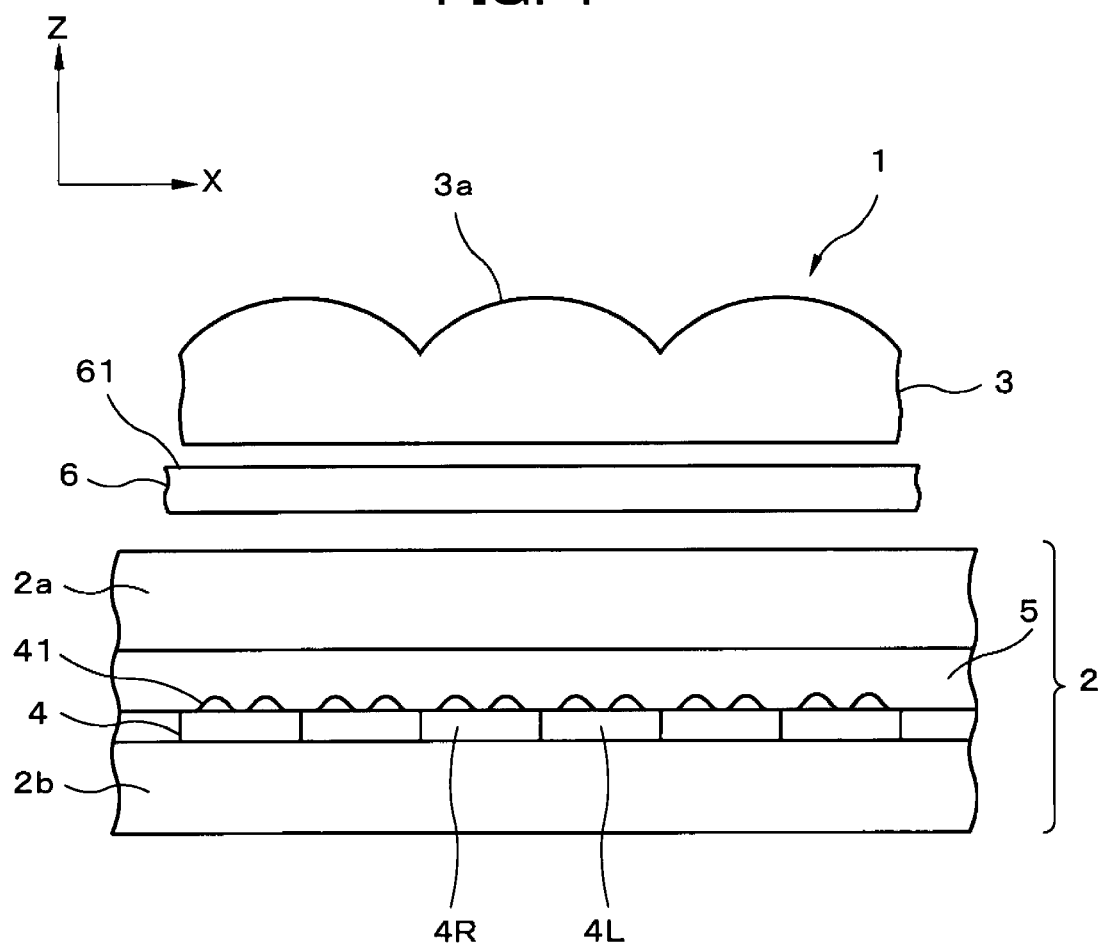
FIG. 1 is a sectional view showing the display device according to Embodiment 1 of the present invention.

The display device of the present invention can be constructed as follows. Namely, the display device of the present invention comprises a display panel in which a plurality of display units that includes at least pixels for displaying an image for a first viewpoint, and pixels for displaying an image for a second viewpoint is arranged in a matrix, an image allocation part for allocating light emitted from the pixels to different directions along a first direction in which the pixels for displaying an image for a first viewpoint, and the pixels for displaying an image for a second viewpoint are arranged in the display units, and an anisotropic scattering part for scattering incident light or excident light with respect to the display panel so that scattering in a second direction that is orthogonal to the first direction differs from scattering in the first direction.

In the present invention, a reduction in image quality caused by the structure of the image allocation part and the display panel can be prevented, and image quality can be improved. Since there is no need to change the structure of the image allocation part and the display panel, cost can also be reduced.

The direction of maximum scattering by the anisotropic scattering part is the second direction, whereby adverse effects on the image allocation effect of the image allocation part can be kept to a minimum, and image quality can be enhanced by the anisotropic scattering part.

Furthermore, the direction of maximum scattering by the anisotropic scattering part is a direction that is rotated toward the first direction from the second direction, whereby scattering in the first direction and the second direction can easily be adjusted, and a significant modification to the member can be prevented. The cost can therefore be reduced.

Furthermore, the anisotropic scattering part may be a structure in which convex parts or concave parts are formed that extend in one direction, and the anisotropic scattering part may have a one-dimensionally arranged prism structure in which a plurality of prisms extending in one direction is arranged parallel to each other. The anisotropic scattering part may also have a lenticular lens structure in which a plurality of cylindrical lenses extending in one direction is arranged parallel to each other, and the pitch of the lenticular lens may be made smaller than the arrangement pitch of the pixels.

The anisotropic scattering part may be disposed between the image allocation part and the display panel, for example. A reduction in display quality due to the structure of the image allocation part and the display panel can thereby be prevented, and a reduction in display quality due to the concavo-convex structure of the reflecting panel can be prevented particularly when a reflective display panel is used.

In this case, the anisotropic scattering part may have a transparent substrate and an anisotropic scattering structure that is formed on a surface of the transparent substrate. This configuration makes it possible to use a commonly used anisotropic scattering sheet, and also to minimize the effects on other members when modification of the anisotropic scattering effect is necessary.

Furthermore, the surface on which the anisotropic scattering structure of the anisotropic scattering part is formed may be oriented towards the image allocation part of the display device. Unwanted interaction with the image allocation part can thereby be reduced, and image quality can be improved.

Furthermore, the anisotropic scattering part is integrated with the image allocation part, whereby there is no need for a component for supporting the anisotropic scattering structure of the anisotropic scattering part, and a thinner profile can therefore be obtained. Since the anisotropic scattering part and the image allocation part can be integrally formed rather than formed separately and combined, the number of members can be reduced, and the number of assembly steps can be reduced. The cost can therefore be reduced. Since it is also possible to eliminate fluctuation in the relative positioning of the anisotropic scattering part and the image allocation part during assembly, unevenness can also be reduced.

Furthermore, the anisotropic scattering part is formed a surface of the image allocation part that faces toward the display panel, whereby the anisotropic scattering part can be simultaneously formed on the back surface during manufacturing of the image allocation part. The manufacturing cost can therefore be reduced, and the overall cost can also be reduced.

In this case, the anisotropic scattering part is formed on an adhesive layer for fixing the image allocation part, thereby eliminating the need for a die for molding the anisotropic scattering structure, and a process for transferring the anisotropic scattering structure. The cost can therefore be reduced.

Alternatively, the anisotropic scattering part is formed in an internal structure of the image allocation part, whereby the adhesive layer can be selected from a wider range of options, and the cost can be reduced.

Alternatively, the anisotropic scattering part may be formed on the display panel, in which case, the display panel has an optical film, and the anisotropic scattering part may be an anisotropic scattering adhesive layer for fixing the optical film to a substrate of the display panel.

In the display device of the present invention, the direction of maximum scattering by the anisotropic scattering part may be the first direction. In this case, the anisotropic scattering part is provided to the back surface side of the display panel, whereby the effects of the anisotropic scattering part for preventing a reduction in display quality can be maximized.

A configuration may also be adopted in which the anisotropic scattering part has a transparent substrate and an anisotropic scattering structure that is formed on a surface of the transparent substrate, and the surface on which the anisotropic scattering structure of the anisotropic scattering part is formed is disposed towards the back surface of the display device. Adverse effects on the image allocation effect of the image allocation part can thereby be kept to a minimum, and image quality can be enhanced by the anisotropic scattering part.

A configuration may also be adopted in which the display device of the present invention has a planar light source for emitting light in a plane on a back surface of the display panel, and the planar light source emits light in a plane through the use of a concavo-convex structure formed inside or on a surface of the planar light source. A reduction in display quality due to the concavo-convex structure of the planar light source and the image allocation part can thereby be prevented without adversely affecting the image allocation effects of the image allocation part. Since the scattering direction can be limited through the use of the anisotropic scattering part, a reduction in frontal luminance can also be prevented.

The planar light source may have a light-guide panel, and a concavo-convex structure may be formed in the light-guide panel. Furthermore, the planar light source may have optical means for enhancing luminance, and the optical means for enhancing luminance may have a concavo-convex structure. The range of options for selecting the optical member for enhancing luminance can thereby be increased, and the cost can be reduced.

In the display device of the present invention, the display panel is transmissive, for example. In the present invention, a reduction in image quality due to the combination of the image allocation part and the boundaries of adjacent pixels can be prevented, and image quality can be improved. Furthermore, when a planar light source is provided to the back surface, a reduction in image quality due to the combination of the image allocation part and the planar light source can be prevented, and image quality can be improved.

The display panel may be a display panel that has a reflecting panel in pixels, for example, and a concavo-convex structure may be formed in the reflecting panel. A reduction in image quality due to the image allocation part and the concavo-convex structure of the reflecting panel can thereby be prevented, and the image quality of reflective display can be improved.

In this case, the reflecting panel may be a semi-transmissive display panel formed in regions of a portion of the pixels. This configuration makes it possible to reduce not only the banding caused in the light-blocking regions by the anisotropic scattering part, but also the banding caused in the display region for reflection during transmissive display, and the quality of transmissive display can therefore be enhanced. During reflective display, not only is it possible to reduce the banding caused in the light-blocking regions by the anisotropic scattering part, but also the banding caused in the display region for transmission, and the quality of reflective display can therefore be enhanced. Specifically, the quality of transmissive display and reflective display in a semi-transmissive display device can be enhanced.

In this case, regions for reflective display in which the reflecting panel is formed, and regions for transmissive display in which light of the pixels is transmitted may be arranged in repeating fashion in the second direction. The effects for preventing a reduction in image quality by the anisotropic scattering part can thereby be demonstrated to the maximum extent.

The display panel may be a liquid crystal display panel, for example. The liquid crystal display panel is a lateral-field-mode liquid crystal display panel or a multi-domain vertical-alignment-mode liquid crystal display panel, for example. In the present invention, a reduction in image quality due to the image allocation part and the orientation division means of the liquid crystal layer can be minimized, and a display device having a wide viewing angle can be obtained.

Furthermore, the display units of the display panel have a striped color pixel arrangement for creating a color display, and the arrangement direction of the color stripes is the second direction, for example. The ratio of pixel boundary regions that extend in the first direction increases when the arrangement direction of the color stripes is the second direction, but the effects of this increase can be reduced by the present invention, and image quality can therefore be improved.

Furthermore, the display units may be formed within a square. The vertical and horizontal resolutions of the display image can thereby be made the same, and image quality can be further improved.

The pixels in the display units may also have a light-blocking region on the periphery of the display region thereof, and the light-blocking region extending in the second direction may be tilted in relation to the second direction. The visibility range of the display image can thereby be increased, and the effects of the present invention can be enhanced.

Furthermore, a configuration may be adopted in which the pixels in the display units have a trapezoidal display region and are arranged with point symmetry with respect to adjacent pixels. This configuration enables the present invention to be suitably applied to an active matrix display panel that uses thin-film transistors in particular, and enables an increased open area ratio.

In the display device of the present invention, the image allocation part is a lens array that is formed so that the lenses are arranged in the first direction, for example. Since this configuration eliminates light loss due to the image division means, a bright display can be obtained.

In the display device of the present invention, the image allocation part is a parallax barrier that is formed so that openings having a limited width are arranged in the first direction, for example. The image allocation part can thereby easily be formed using a photolithography technique, and the cost can therefore be reduced.

The terminal device of the present invention has the display device. The terminal device is a mobile telephone, a personal information terminal, a personal television, a gaming device, a digital camera, a video camera, a video player, a notebook personal computer, a cash dispenser, or an automatic vending machine, for example.

The display panel of the present invention is a display panel in which a plurality of display units that includes at least pixels for displaying an image for a first viewpoint, and pixels for displaying an image for a second viewpoint is arranged in a matrix, wherein scattering of excident light in the display plane is endowed with anisotropy, and light that exits from the pixels is allocated to different directions along the first direction in which the pixels for displaying an image for a first viewpoint, and the pixels for displaying an image for a second viewpoint are arranged in the display units.

The optical member of the present invention is an optical member that is used in a display panel in which a plurality of display units that includes at least pixels for displaying an image for a first viewpoint, and pixels for displaying an image for a second viewpoint is arranged in a matrix, wherein the optical member comprises a planar image allocation part for allocating incident light to different directions, and an anisotropic scattering part for imparting anisotropy to scattering in the plane of the image allocation part. According to the present invention, the optical member can be combined with the display panel to create a display device that has high image quality.

In this case, the direction of maximum scattering by the anisotropic scattering part may be the direction orthogonal to the image allocation direction of the image allocation part.

Furthermore, the optical member may have a substrate, and the image allocation part and anisotropic scattering part may be formed on a surface that faces the substrate.

Furthermore, the optical member may have a substrate, and the anisotropic scattering part may be formed within the substrate.

Furthermore, the optical member may have an adhesive layer, and the adhesive layer may be the anisotropic scattering part.

Figure 2:
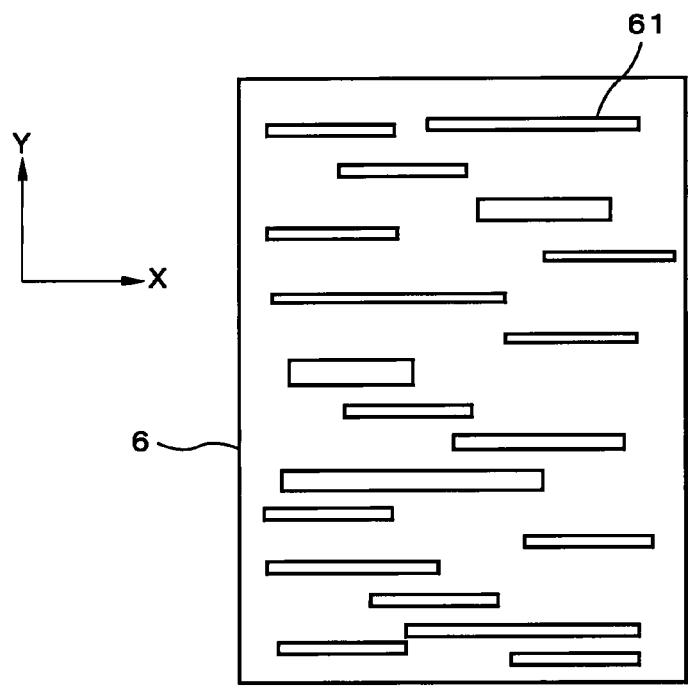
FIG. 2 is a top view showing the anisotropic scattering sheet of the display device shown in FIG. 1.
Figure 3:
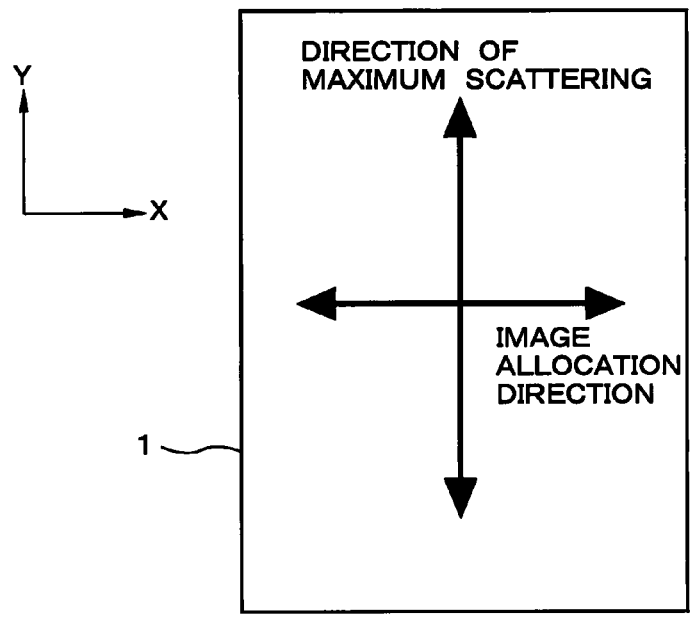
FIG. 3 is a top view showing the relationship between the image allocation direction of the image allocation part, and the scattering direction of the anisotropic scattering sheet.
Figure 4:
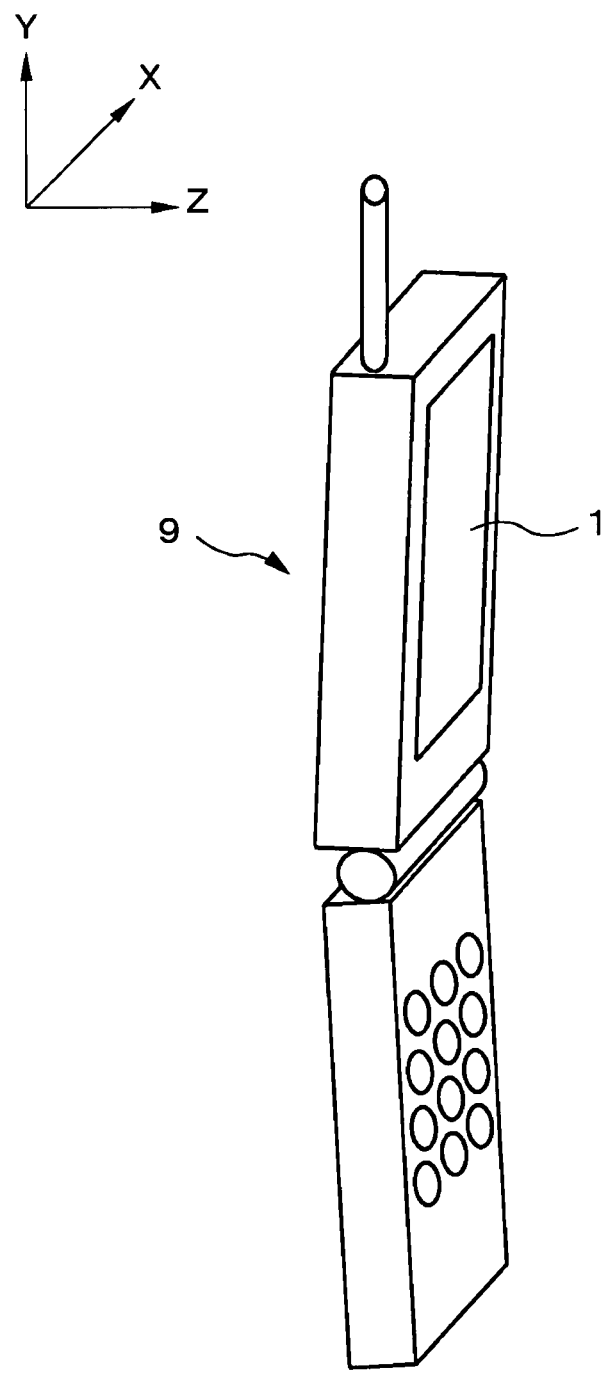
FIG. 4 is a perspective view showing the terminal device of the present embodiment.

Next, the display device, terminal device, display panel, and optical member according to embodiments of the present invention will be specifically described hereinafter with reference to the accompanying drawings. The display device, terminal device, display panel, and optical member according to Embodiment 1 of the present invention will first be described. FIG. 1 is a sectional view showing the display device according to the present embodiment; FIG. 2 is a top view showing the anisotropic scattering sheet shown in FIG. 1; FIG. 3 is a top view showing the relationship between the image allocation direction of the image allocation part, and the scattering direction of the anisotropic scattering sheet in the display device shown in FIG. 1; and FIG. 4 is a perspective view showing the terminal device of the present embodiment.

As shown in FIG. 1, the display device according to Embodiment 1 uses a reflective liquid crystal display panel 2 as the display panel, and the reflective liquid crystal display device 1 is provided with a lenticular lens 3. The lenticular lens 3 is disposed on the side of the display surface of the reflective liquid crystal display panel 2, i.e., on the side facing the user. An anisotropic scattering sheet 6 as the anisotropic scattering element is provided between the lenticular lens 3 and the reflective liquid crystal display panel 2. Specifically, in the reflective liquid crystal display device 1, the reflective liquid crystal display panel 2, the anisotropic scattering sheet 6, and the lenticular lens 3 are layered in this sequence in the direction of the user.

The reflective liquid crystal display panel 2 is a liquid crystal panel used for three-dimensional display in which pixel pairs as display units that are composed of one left-eye pixel 4L and one right-eye pixel 4R are provided in a matrix. The lenticular lens 3 is an optical member for image separation that is provided in order to separate the light from the left and right pixels, and the lenticular lens 3 is a lens array in which numerous cylindrical lenses 3a are aligned in one dimension. The arrangement direction of the cylindrical lenses 3a is set to the direction in which the left-eye pixels 4L and the right-eye pixels 4R are arranged in repeating fashion. The extension direction of the cylindrical lenses 3a, i.e., the longitudinal direction, is the direction orthogonal to the arrangement direction in the display plane. The cylindrical lenses 3a are one-dimensional lenses having a semi-cylindrical convex part that have a lens effect only in the direction orthogonal to the longitudinal direction thereof. The focal distance of the cylindrical lenses 3a is set to the distance between the principal points of the cylindrical lenses 3a, i.e., the apexes of the lenses, and the pixels (left-eye pixels 4L or the right-eye pixels 4R).

An XYZ orthogonal coordinate system is set up as described below for convenience in the present specification. In the direction in which the left-eye pixels 4L and the right-eye pixels 4R are arranged in repeating fashion, the direction from the right-eye pixels 4R to the left-eye pixels 4L is the +X direction, and the opposite direction is the −X direction. The +X direction and the −X direction are collectively referred to as the X-axis direction. The longitudinal direction of the cylindrical lenses 3a is the Y-axis direction. Furthermore, the direction that is orthogonal to both the X-axis direction and the Y-axis direction is the Z-axis direction. Within the Z-axis direction, the direction from the left-eye pixels 4L or the right-eye pixels 4R to the lenticular lens 3 is the +Z direction, and the opposite direction is the −Z direction. The +Z direction is the frontal direction, i.e., the direction towards the user, and the user sees the surface on the +Z side of the reflective liquid crystal display panel 2. The +Y direction is the direction in which a right-handed coordinate system is established. Specifically, when the person's right thumb is in the +X direction, and the index finger is in the +Y direction, the middle finger is in the +Z direction.

When the XYZ orthogonal coordinate system is set up as described above, the arrangement direction of the cylindrical lenses 3a is the X-axis direction, and the left-eye pixels 4L and the right-eye pixels 4R are each arranged in rows in the Y-axis direction. The arrangement period of pixel pairs in the X-axis direction is substantially equal to the arrangement period of the cylindrical lenses. In the X-axis direction, a row of pixel pairs arranged in the Y-axis direction corresponds to a single cylindrical lens 3a.

In the reflective liquid crystal display panel 2, a liquid crystal layer 5 is formed between two substrates 2a, 2b that are provided across a minute gap, and a reflecting panel 4 is formed on the surface on the +Z side of the substrate 2b disposed on the −Z side. Numerous concavo-convex structures 41 are provided on the surface of the reflecting panel 4, and the concavo-convex structures 41 make the surface of the reflecting panel 4 a diffuse reflection surface. Specifically, external light that is incident on the reflecting panel 4 from a particular direction is diffusely reflected in various directions by the concavo-convex structures 41 on the surface of the reflecting panel 4 and also reflected towards the observer. Since the frontally reflected component can thereby be reduced, a bright reflective display can be product at an angle at which a light source pattern is not visible. When the light source emits diffuse light, since the component of light reflected in the frontal direction can be increased relative to mere mirror reflection, a bright reflective display can be produced.

As shown in FIG. 2, anisotropic scattering structures 61 are formed on the surface in the +Z direction of the anisotropic scattering sheet 6. Specifically, the anisotropic scattering sheet 6 has a transparent substrate and anisotropic scattering structures 61 that are formed on the surface of the transparent substrate as an anisotropic scattering part (i.e., anisotropic scattering means). The anisotropic scattering structures 61 are band-shaped convex parts that extend in the X-axis direction in the XY plane, and a plurality of the anisotropic scattering structures 61 is formed on the surface of the anisotropic scattering sheet 6. According to this configuration, numerous anisotropic scattering structures 61 are traversed by tracing along the Y-axis direction on the surface of the +Z side of the anisotropic scattering sheet 6. Specifically, this surface has numerous concavo-convex structures in the Y-axis direction. In contrast, few or no anisotropic scattering structures 61 are traversed by tracing along the X-axis direction of the surface. This surface therefore has few concavo-convex structures in the X-axis direction.

In more general terms, the surface of the anisotropic scattering sheet 6 has numerous concavo-convex structures in a specific direction, and few concavo-convex structures in the direction orthogonal to the specific direction. In the present embodiment, the specific direction in which there are numerous concavo-convex structures is set to the Y-axis direction. According to this configuration, the anisotropic scattering sheet 6 produces maximum scattering in the Y-axis direction, and minimum scattering in the X-axis direction. As shown in FIG. 3, the scattering performance in the angles between the Y-axis direction and the X-axis direction in the XY plane is dependent on the shape of the anisotropic scattering structures 61, but the scattering performance rapidly deteriorates with rotation from the Y-axis direction to the X-axis direction in the present embodiment.

In general, the image allocation effect of the lenticular lens 3 or other image allocation part (i.e., image allocation means or image separation means) tends to decrease when the scattering means is installed. The reason for this in the present embodiment, for example, is that when light reflected by the reflecting panel 4 of the left-eye pixels 4L is significantly scattered by the scattering means, the light also enters the right eye of the user in the same manner as the light that is reflected in the right-eye pixels 4R. As described above, the longitudinal direction of the cylindrical lenses 3a that constitute the lenticular lens 3 is set to the Y-axis direction in the present embodiment, and the arrangement direction of the cylindrical lenses 3a is set to the X-axis direction. The lenticular lens 3 therefore has image allocation effects in the X-axis direction. In contrast, the anisotropic scattering sheet 6 is set so that the scattering thereof is maximized in the Y-axis direction and minimized in the X-axis direction. Specifically, in the reflective liquid crystal display device 1 of the present embodiment, the anisotropic scattering sheet 6 is disposed so that the effect of the scattering performance thereof on the image allocation effect of the lenticular lens 3 is minimized. In the present invention, the lenticular lens is described as the image allocation means. In a strict sense, the cylindrical lenses constituting the lenticular lens function as means for separating left eye pixel light from right eye pixel light into different directions. The lenticular lens is thereby able to allocate the image for the left eye and the image for the right eye to different directions. Such phenomena are regarded as being able to be exhibited in the present invention, with the lenticular lens having an image allocating effect.

Furthermore, in the reflective liquid crystal display device 1 of the present embodiment, the anisotropic scattering sheet 6 and the lenticular lens 3 are not sealed, and the anisotropic scattering sheet 6 and the reflective liquid crystal display panel 2 are also not sealed. Specifically, air layers are provided in the spaces between the anisotropic scattering sheet 6, lenticular lens 3, and reflective liquid crystal display panel 2.

As shown in FIG. 4, the terminal device according to the present embodiment is a mobile telephone 9. The reflective liquid crystal display device 1 is mounted in the mobile telephone 9. The X-axis direction of the reflective liquid crystal display device 1 is the transverse direction of the screen of the mobile telephone 9, and the Y-axis direction of the reflective liquid crystal display device 1 is the longitudinal direction of the screen of the mobile telephone 9.

Figure 5:
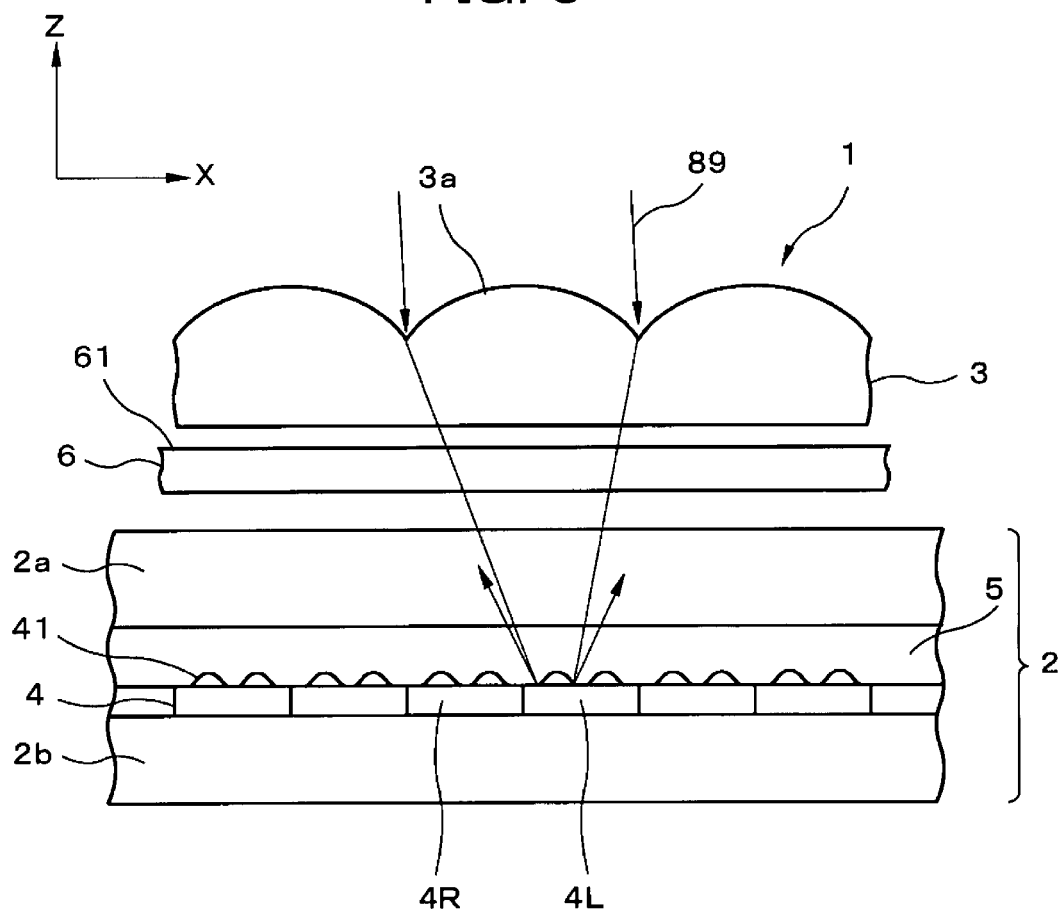
FIG. 5 is a diagram showing the optical model in a cross-section created by a line segment that is parallel to the X-axis direction in the reflective liquid crystal display device of the present embodiment.

Following is a description of the operation of the display device of the present invention configured as described above. FIG. 5 is a diagram showing the optical model in a cross-section of the reflective liquid crystal display device created by a line segment that is parallel to the X-axis direction in the reflective liquid crystal display device shown in FIG. 1. As shown in FIG. 5, since the display device of the present embodiment is reflective, external light is used for the display. First, the following operational description will focus on the light 89 of a parallel light component in the external light that is incident on the reflective liquid crystal display device 1. The light 89 incident on the lenticular lens 3 is focused by the lenticular lens 3. As previously mentioned, the focal distance of the lenticular lens 3 is set so that the focal point occurs at the reflecting panel 4.

In a case in which the effect of the anisotropic scattering sheet 6 is removed, the light that is focused by the lenticular lens has a focal point at the surface of the reflecting panel. When the focal point is on a tilted surface of a concavo-convex structure, the light is reflected at an angle by the tilted surface. As a result, the reflected light is propagated in a direction other than that of the user, and the light essentially does not contribute to the display. Conversely, when a focal point occurs at a flat part of a concavo-convex structure, the light is reflected in the frontal direction, and the reflected light proceeds in the direction of the user and therefore contributes to the display. Bright regions and dark regions thus occur in the display according to the angle of the external light and the position of the user. Differences in brightness are therefore superimposed in the display image, and a reduction in image quality is observed.

However, in the present invention, the anisotropic scattering sheet 6 is provided between the lenticular lens 3 and the reflecting panel 4. The anisotropic scattering sheet 6 produces maximum scattering in the Y-axis direction, and minimum scattering in the X-axis direction, as previously mentioned. Therefore, the light focused by the lenticular lens 3 is focused in conjunction with a slight scattering in the X-axis direction on the surface of the reflecting panel 4. The surface area in which the reflecting panel is irradiated is thereby made larger than in a case in which the anisotropic scattering sheet 6 is not provided. Scattering is greater in the Y-axis direction than in the X-axis direction, which makes it possible to increase the surface area in which the reflecting panel is irradiated. The light focused by the lenticular lens 3 is thereby radiated to various locations that include tilted parts and flat parts of the concavo-convex structures 41 on the reflecting panel 4. Specifically, the parallel light entering the display device is focused in the X-axis direction by the lenticular lens 3, but the anisotropic scattering sheet 6 scatters some light in the X-axis direction and more in the Y-axis direction. In other words, even when parallel light enters, it is possible for the amount thereof to be the same as when anisotropically scattered light having greater scattering characteristics in the Y-axis direction enters. Thus, the degradation of the displayed image originated from the concavo-convex structures can be lowered. Next, the reflected light is propagated at various angles.

A portion of this light passes again through the lenticular lens 3, and left and right images are separated and propagated in the direction of the user to create a three-dimensional display. The light passes through the anisotropic scattering sheet 6 once more before passing through the lenticular lens 3, but any deterioration in image quality due to the concavo-convex structure can be reduced depending on the effect of the anisotropic scattering that occurs.

The effect of the present embodiment will next be described. As described above, in the present embodiment, the anisotropic scattering sheet is provided between the lenticular lens and the reflecting panel, and the direction of minimum scattering by the anisotropic scattering sheet is in the direction in which the image allocation effects of the lenticular lens are demonstrated. The direction of maximum scattering is arranged orthogonally with respect to the direction in which the image allocating effect of the lenticular lens is demonstrated. According to this configuration, a reduction in display quality due to the lenticular lens and the concavo-convex structures of the reflecting panel can be prevented without significantly reducing the image allocation effects of the lenticular lens. If isotropic scattering (scatter) is used, difficulties will be presented in regard to achieving the image allocation effect of the lenticular lens as well as the effect of minimizing deterioration in the display quality as caused by the concavo-convex structure. Using anisotropic scattering enables both of these to be achieved. Even when parallel light enters, the anisotropic scattering sheet and other anisotropic scattering means enables the quantity thereof to be the same as when anisotropically scattered light enters. In other words, the anisotropic scattering means converts the parallel light component of the incident light into anisotropically scattered light. The anisotropically scattered light is set so that the image allocating effect of the lenticular lens will not be compromised. It is possible thereby not only to improve image quality when parallel light is incident, but also when spotlight or other light that has a relatively high directivity enters. Specifically, excellent display quality can be achieved regardless of the illumination conditions. When the concavo-convex structures of the reflecting panel are large, the image quality is reduced not only by a dark lined pattern, but also by graininess caused by the pitch of the concavo-convex structures. However, since the present embodiment is designed so that scattering is significant in the direction in which the image allocation effects of the lenticular lens are not demonstrated, the reduction in image quality due to graininess can be prevented, and the display quality can be enhanced. Furthermore, the anisotropic scattering sheet in the present embodiment also has scattering performance in directions that are slightly tilted from the Y-axis direction in the XY plane, and this scattering in tilted directions can therefore be used to reduce dark lined patterns and enhanced the display quality. Furthermore, there is no need to modify the lenticular lens or the concavo-convex structures of the reflecting panel, and the same lenticular lens can be used in a transmissive display device and a reflective display device, for example. The number of types of members needed for manufacturing can therefore be reduced, and the cost can be reduced. In the present embodiment, since an anisotropic scattering sheet is used, the scattering performance in the X-axis direction and the Y-axis direction can easily be adjusted merely by changing the angle of the sheet in the XY plane. When the scattering performance is insufficient in the X-axis direction, for example, the anisotropic scattering sheet may merely be positioned so that the scattering performance in the X-axis direction increases, and significant modification of members and the like can be prevented. The cost can therefore be reduced.

The anisotropic scattering sheet in the present embodiment was described as being arranged so that the direction in which scattering is minimized is the direction in which the image allocation effects of the lenticular lens are demonstrated, but the present invention is not limited by this configuration, and the anisotropic scattering sheet may be disposed at any angle as far as the allocation effect can be shown. According to this configuration, the scattering performance in the X-axis direction and the Y-axis direction can easily be adjusted merely by changing the angle of the sheet in the XY plane, and the scattering performance can be adjusted without a large scale modification to the members. Cost can therefore be reduced.

An example was also described in the present embodiment in which the anisotropic scattering structures 61 were convex parts formed on the surface of the +Z side of the anisotropic scattering sheet 6, but the anisotropic scattering structures 61 may be formed on the surface of the −Z side of the anisotropic scattering sheet 6. However, when the anisotropic scattering structures 61 are disposed close to the focus of the lenticular lens 3, a significant risk arises that the structures themselves will degrade the image quality. It is accordingly preferred for the anisotropic scattering structures 61 to be formed on the surface of the +Z side of the anisotropic scattering sheet 6, which will be situated apart from the focus. In other words, orienting the surface on which the anisotropic scattering structures are formed toward the lenticular lens enables deterioration in image quality to be minimized. The anisotropic scattering structures may also be concave parts instead of convex parts. Any anisotropic scattering sheet may be used insofar as the scattering produced by the sheet is anisotropic. For example, it is possible to use a film that is obtained by preparing a mother die in which an anisotropic scattering pattern is machined, and transferring the pattern of the die using a hot embossing method or a 2P method; a holographic diffuser in which a one-dimensional hologram pattern is formed; or a sheet obtained by extending a common isotropic scattering sheet (film) to endow the sheet with anisotropy. When a sheet obtained by extending a common isotropic scattering sheet to endow the sheet with anisotropy is used, the isotropic scattering sheet used as the starting sheet may be an anisotropic scattering sheet that has scattering due to the surface concavo-convex structures, and anisotropy in the surface concavo-convex structures due to extension. The isotropic scattering sheet as the starting sheet may also be an anisotropic scattering sheet in which materials having different refractive indices are included in the sheet, and the extension generates anisotropy in the distribution of the materials having different refractive indices, thereby producing anisotropic scattering.

Furthermore, the pattern of anisotropic scattering may be a one-dimensional prism array in which numerous one-dimensional prisms are arranged, or a one-dimensional lens array in which numerous cylindrical lenses as one-dimensional lenses are arranged. The lenticular lens used as the image allocation part is set so as to separate the images displayed by the left-eye pixels and the right-eye pixels at a prescribed angle, but the one-dimensional lens array as the anisotropic scattering part is disposed so as to have no such image separating effect. As an example, lenses are arranged at a pitch that is extremely fine compared to the pixels. The focal distance is set so as to be several times the distance between the lenses and the pixels, or a fraction of the distance, so that the lens focal points are not positioned on the pixels. A rotated arrangement in the XY plane as the display plane is effective when such a one-dimensional optical element is used. Specifically, the direction of maximum scattering by the anisotropic scattering part (scatter) is preferably a direction that is rotated toward the first direction from the second direction.

The anisotropic scattering sheet 6 in the present embodiment was described as having a structure in which an air layer is present in the gap between the anisotropic scattering sheet 6 and the lenticular lens 3, and in the gap between the anisotropic scattering sheet 6 and the reflective liquid crystal display panel 2. However, the present invention is not limited by this configuration, and the gaps may be filled by an adhesive member, an adhesive, or the like that has a prescribed refractive index. Fluctuation in the positioning of the lenticular lens and the reflective liquid crystal display panel can thereby be prevented, and reflection at the interfaces can also be reduced. The display quality can therefore be further increased. As described in the present embodiment, when an anisotropic scattering sheet in which concavo-convex structures are formed on the surface is used as the anisotropic scattering part, since the scattering effects are lost when the sheet is fixed by a material having the same refractive index as the concavo-convex structures, it is appropriate to use a material that has a different refractive index. An advantage of using a separate anisotropic scattering sheet as the anisotropic scattering part in the manner of the present embodiment is that a common anisotropic scattering sheet can be used, and the effects on other members can be minimized even when it is necessary to modify the anisotropic scattering effects.

Furthermore, a reflective liquid crystal display panel was used as the display panel in the description of the present embodiment, but the present invention is not limited by this configuration, and the present invention can be effectively applied to a display panel that uses a reflecting panel having concavo-convex structures. For example, the present invention can be applied in the case of a semi-transmissive liquid crystal display panel that is capable of reflective display as well as transmissive display, and in the case of a reflective display panel other than a liquid crystal display panel. In a semi-transmissive liquid crystal display panel, the present invention can be applied in the same manner as the present embodiment in a micro-reflective liquid crystal display panel having a large ratio of transmissive regions, and in a micro-transmissive liquid crystal display panel having a large ratio of reflective regions. The drive method of the liquid crystal display panel may be a TFT (Thin Film Transistor) scheme, a TFD (Thin Film Diode) scheme, or other active matrix scheme, or an STN (Super Twisted Nematic liquid crystal) scheme or other passive matrix scheme.

The case of a two-eyed three-dimensional display device in which only left-eye pixels and right-eye pixels are provided was described in the present embodiment, but the present invention can also be applied in the case of an N-eyed device (wherein N is an integer greater than 2).

Furthermore, in the present embodiment, a color image may be displayed in conjunction with a system in which light sources of multiple colors are lit according to a time division, in addition to color display using a color filter.

Also, the display unit may be formed in a square in which the pitch in the X-direction is the same as the pitch in the Y-direction. In other words, all of the pitches of the display units are the same.

The lenticular lens in the present embodiment was described as having a structure in which the lens surface was in the +Z direction towards the user, but the present invention is not limited by this configuration, and the lens surface may be in the −Z direction towards the display panel. In this case, since the distance between the lens and the pixels can be reduced, the advantage of adaptability to increased resolution is gained. In addition, the surface on which the anisotropic scattering structures are formed can be placed away from the focus of the lenticular lens. Image quality is thereby improved.

A description of the present embodiment has been provided wherein the cylindrical lenses that constitute the lenticular lens are arranged in the X-axis direction, and the scattering characteristics of the anisotropic scattering means are greater in the Y-axis direction than in the X-axis direction. In FIG. 4, the display surface of the display device is depicted as being composed from edges parallel to the X-axis direction and edges parallel to the Y-axis direction. However, this configuration is not provided by way of limitation in the present invention; the cylindrical lenses may also be arranged in the display screen with respect to a rotational arrangement. In such cases, the device in FIG. 4 may be regarded as being rotated in the XY plane. In other words, it is important that the direction in which the cylindrical lenses are arranged and the scattering characteristics of the anisotropic scattering means fulfill the constitution of the present embodiment.

The image allocation part in the present embodiment was described as being a lenticular lens, but the present invention is not limited by this configuration, and the present invention can also be applied to a parallax barrier system in which a slit array is used as the image allocation part. A lenticular lens is a three-dimensional shape having a vertical structure, whereas a parallax barrier has a planar two-dimensional shape and can easily be fabricated using a photolithography technique. Cost can therefore be reduced. However, as described above, there is no loss of light due to the image separation means when a lenticular lens is used. Consequently, a lenticular lens system is advantageous in regards to obtaining a bright reflective display.

A detailed description shall now be provided in regard to the conditions under which the lenticular lens is actuated as the image allocation means. In the present embodiment, the image allocation means must allocate light emitted by the left eye and right eye pixels in mutually different directions along a first direction in which the pixels are arranged; i.e., along the X-axis direction. Therefore, the following description will make reference to FIG. 6 for a case in which the image allocation effect is demonstrated at its maximum limit.

H refers to the distance between the principal point (i.e., the apex) of the lenticular lens 3 and the pixel, n refers to the refractive index of the lenticular lens 3, and L refers to the lens pitch. P refers to the pitch of each left eye pixel 4L or right eye pixel 4R. Accordingly, 2P refers to the display pixel arrangement pitch, comprising one left eye pixel 4L and one right eye pixel 4R.

The optimal observation distance OD refers to the distance between the lenticular lens 3 and an observer. e refers to the period of the enlarged projected image of the pixels at this distance OD; i.e., the period of the widths of the projected images of the left eye pixels 4L and right eye pixels 4R in a theoretical plane that is parallel to the lens and situated apart therefrom by distance OD. WL refers to the distance from the center of the cylindrical lens 3a positioned in the center of the lenticular lens 3, to the center of the cylindrical lens 3a positioned at an end of the lenticular lens 3 in the X-axis direction. WP refers to the distance between the center of display pixels comprising left eye pixels 4L and right eye pixels 4R, as positioned in the center of the reflective liquid crystal display 2; and the center of display pixels positioned oh an end of the reflective liquid crystal display 2 in the X-axis direction. α and β refer, respectively, to the angles of incidence and excidence with regard to light in the cylindrical lens 3a positioned in the center of the lenticular lens 3. γ and δ refer, respectively, to the angles of incidence and excidence with regard to light in the cylindrical lens 3a positioned on the edge of the lenticular lens 3 in the X-axis direction. C refers to the difference between the distance WL and the distance WP. 2m refers to the number of pixels in the region of distance WP.

The pitch L at which the cylindrical lenses 3a are arranged and the pitch P at which the pixels are arranged are related to each other; therefore, each of the pitch values is determined in association with the other. However, lenticular lenses are normally often designed in association with the display panel, for which reason the pixel arrangement pitch P is treated as a constant. Selecting the material of the lenticular lens 3 will determine the refractive index n. Conversely, the observational distance OD between the lens and the observer and the period e of the pixel enlarged projected image at the observational distance OD are set using desired values. These values are used to determine the distance H between the lens and the pixels as well as the lens pitch L. Formulae 1 through 6 below are derived from Snell's Law and geometric relationships. Formulae 7 through 9 below are also derived.

$$n \times \sin \alpha = \sin \beta \quad \text{[Formula 1]}$$

$$OD \times \tan \beta = e \quad \text{[Formula 2]}$$

$$H \times \tan \alpha = P \quad \text{[Formula 3]}$$

$$n \times \sin \gamma = \sin \delta \quad \text{[Formula 4]}$$

$$H \times \tan \gamma = C \quad \text{[Formula 5]}$$

$$OD \times \tan \delta = WL \quad \text{[Formula 6]}$$

$$WP - WL = C \quad \text{[Formula 7]}$$

$$WP = 2 \times m \times P \quad \text{[Formula 8]}$$

$$WL = m \times L \quad \text{[Formula 9]}$$

As has been described above, a case is being considered for when the image allocation effect is demonstrated at a maximum, and this relates to the distance H between the pixels and the apex of the lenticular lens being set equal to the focal distance f of the lenticular lens. Formula 10 is thereby established. If r is taken as the radius of curvature of the lens, then r is determined using Formula 11 below.

$$f = H \quad \text{[Formula 10]}$$

$$r = H \times (n-1)/n \quad \text{[Formula 11]}$$

If a complete calculation is made using the above parameters, the pixel arrangement pitch P is a value determined according to the display panel, while the period e of the enlarged image projected from the pixels and the observation distance OD are values determined according to the configuration of the display device. The distance H between the lens and the pixels and the lens arrangement pitch L derived from these values are parameters used to determine the position at which the light from the pixels is projected on the observation surface. The parameter for changing the image allocation effect is the lens curvature radius r. Specifically, in the case that the distance H between the lens and the pixels is fixed, then when the radius of lens curvature is changed from an ideal state, the left and right pixel images will become fuzzy, preventing distinct separation. In other words, it is desirable to determine a range for the radius of curvature at which the images can be effectively separated.

Figure 7:
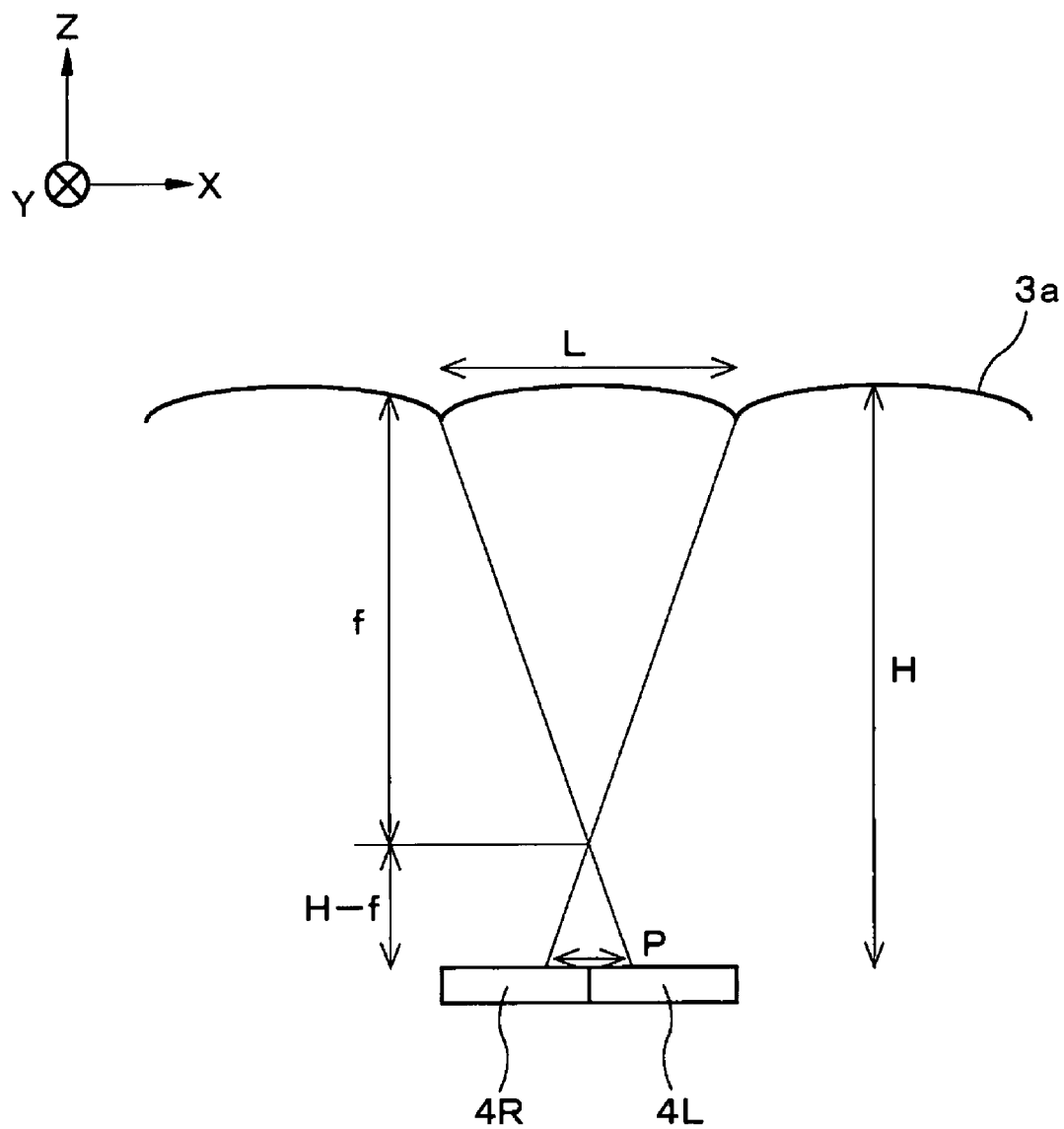
FIG. 7 is an optical model diagram showing an instance when the curvature radius is at a minimum, in order to compute the image separation conditions of the lenticular lens.

First, a calculation is made of the minimum value for the curvature radius range at which the lens separation action will be in effect. In order for the lens separation action to be in effect, an analogous relationship may be established as shown in FIG. 7 between a triangular form whose bottom edge is the lens pitch L and whose height is the focal distance f, and a triangular form whose bottom edge is the pixel pitch P and whose height is H−f. Formula 12 is derived therefrom, and the minimum focal distance value fmin can be determined.

$$f\text{min} = H \times L / (L+P) \quad \text{[Formula 12]}$$

The radius of curvature is then calculated from the focal distance. Using Formula 11, the minimum radius of curvature rmin can be determined as shown in Formula 13.

$$r\text{min} = H \times L \times (n-1) / (L+P) / n \quad \text{[Formula 13]}$$

Figure 8:
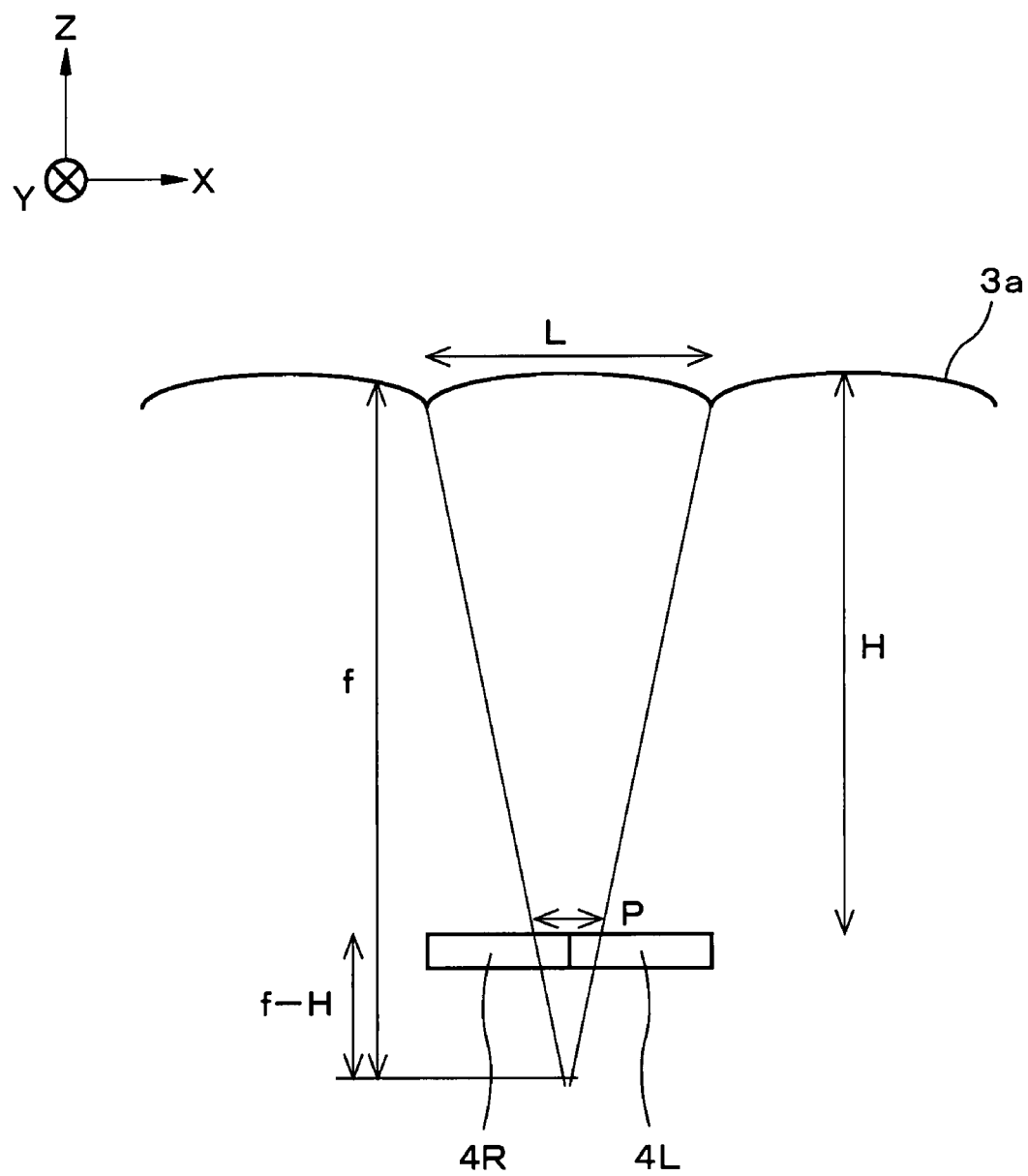
FIG. 8 is an optical model diagram showing an instance when the curvature radius is at a maximum, in order to compute the image separation conditions of the lenticular lens.

The maximum value is then calculated. In order for the lens separation action to be in effect, an analogous relationship may be established as shown in FIG. 8 between a triangular form whose bottom edge is the lens pitch L and whose height is the focal distance f, and a triangular form whose bottom edge is the pixel pitch P and whose height is f−H. Formula 14 is derived therefrom, and the maximum focal distance value fmax can be determined.

$$f\text{max} = H \times L / (L-P) \quad \text{[Formula 14]}$$

The radius of curvature is then calculated from the focal distance. Using Formula 11, the maximum radius of curvature rmax can be determined as shown in Formula 15.

$$r\text{max} = H \times L \times (n-1) / (L-P) / n \quad \text{[Formula 15]}$$

When the complete calculations are performed as indicated above, then in order for the lens to demonstrate the image allocation effect, the lens radius of curvature must fall within the range of Formula 16 below, which is indicated using Formulae 13 and 15.

$$H \times L \times (n-1)/(L+P)/n \leq r \leq H \times L \times (n-1)/(L-P)/n \quad \text{[Formula 16]}$$

A description has been provided above of a two-viewpoint three-dimensional image display device having left eye pixels and right eye pixels; however, this arrangement is not provided by way of limitation in the present invention. For example, the invention may be similarly used for a display device whose format involves N viewpoints. In such cases, the number of pixels contained in the regions relating to the distance WP may be changed from 2m to N×m in the definition of the distance WP indicated hereinabove.

A description shall now be provided of a desirable position of the anisotropic scattering structures along the Z-axis direction. In the case that the anisotropic scattering structures have no scattering components in the X-axis direction, no major problems will be presented if they are positioned at indeterminate positions along the Z-axis direction. However, typically, some scattering components will be present along the X-axis direction as well. No major problems will be presented as long as the structures that generate scattering in the X-axis direction are uniformly present. However, in the case that scattering structures in the X-axis direction are present in some regions along the X-axis direction but not in others, then their position in the Z-axis direction becomes an extremely significant parameter affecting image quality.

Figure 9:
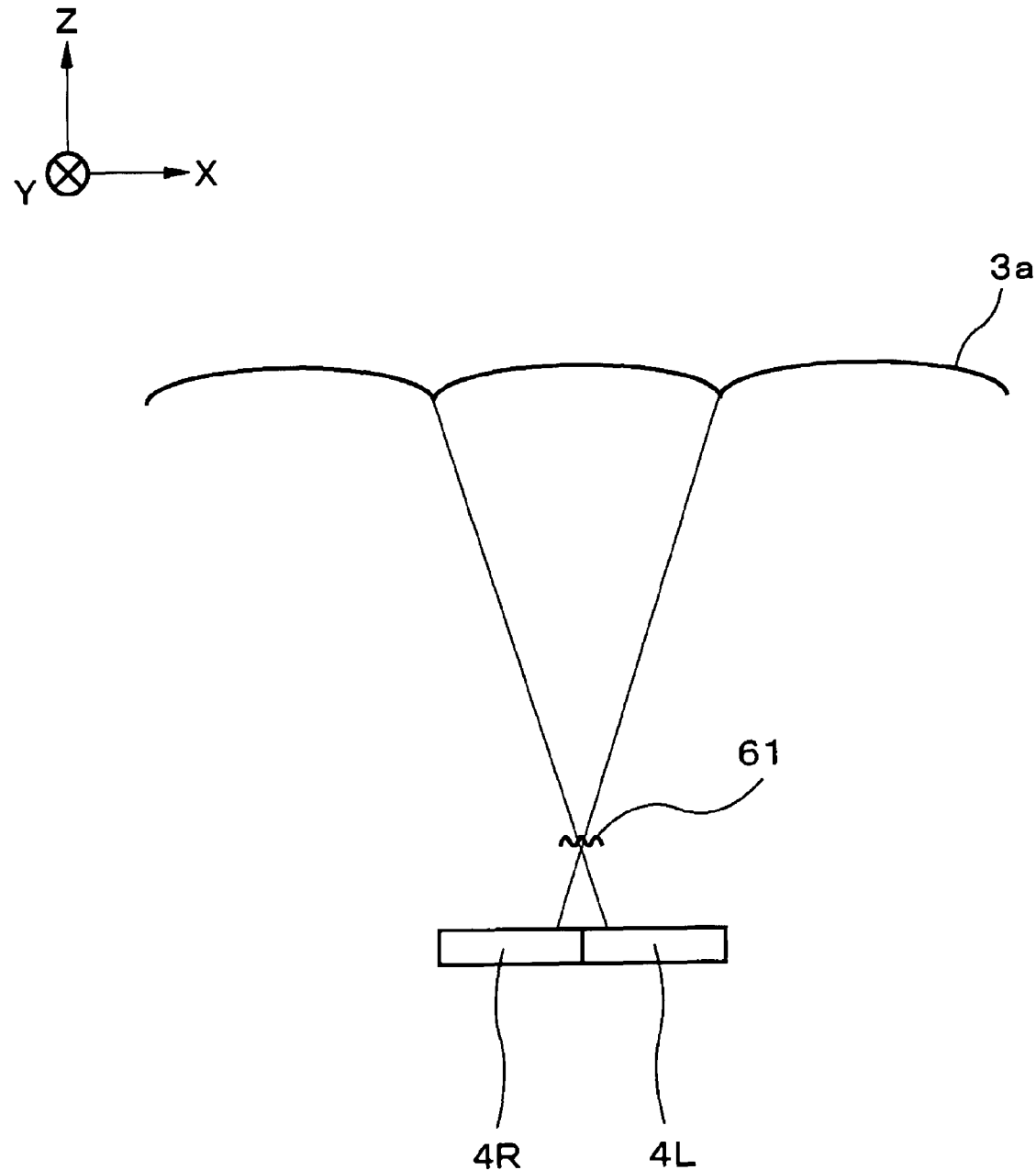
FIG. 9 is a sectional view showing an instance when the anisotropic scattering structure is present in the vicinity of the focus of a cylindrical lens; and shows in particular an instance where the structure has a major effect.
Figure 10:
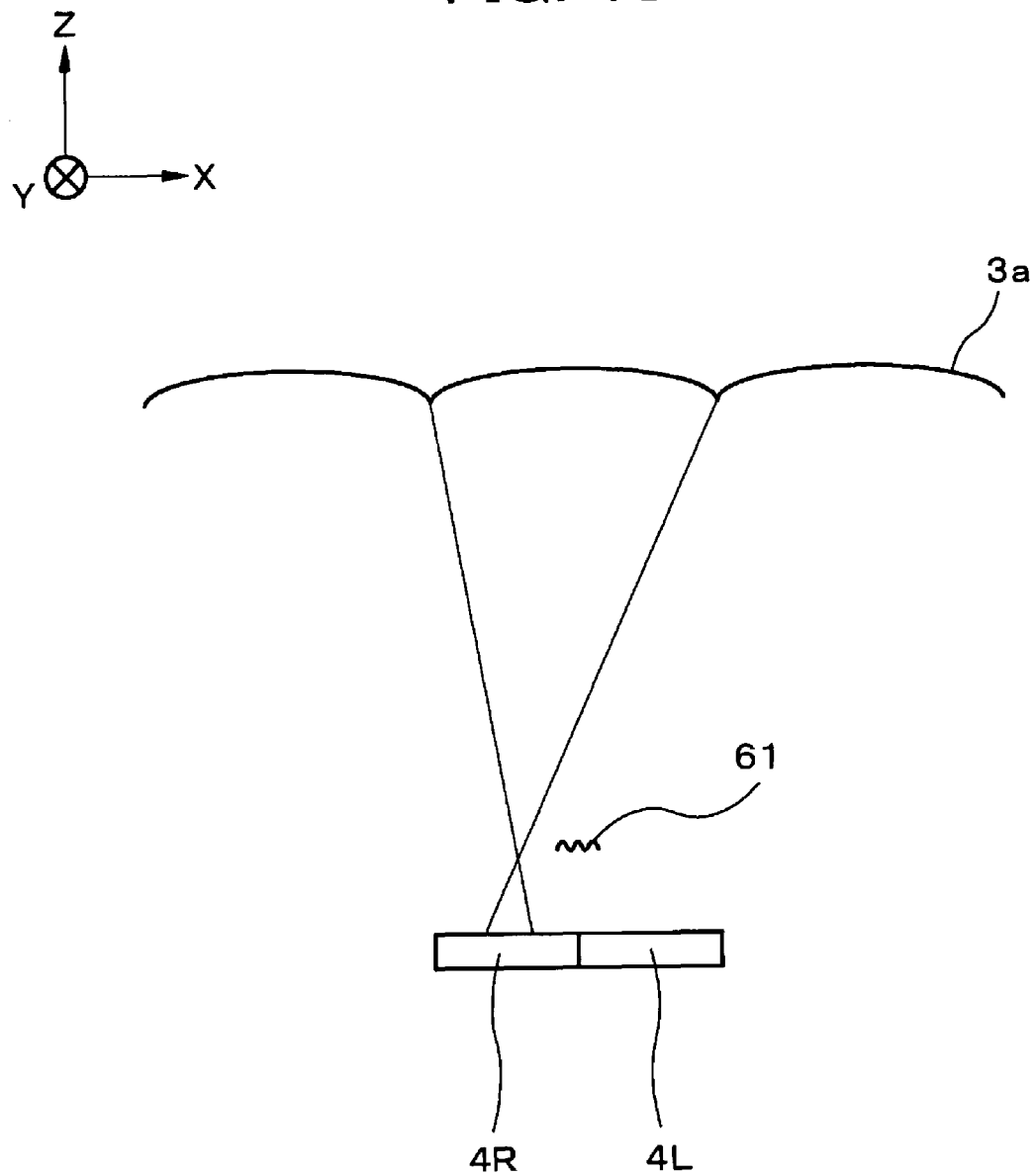
FIG. 10 is a sectional view showing an instance when the anisotropic scattering structure is present in the vicinity of the focus of a cylindrical lens; and shows in particular an instance where the structure has a minor effect.
Figure 11:
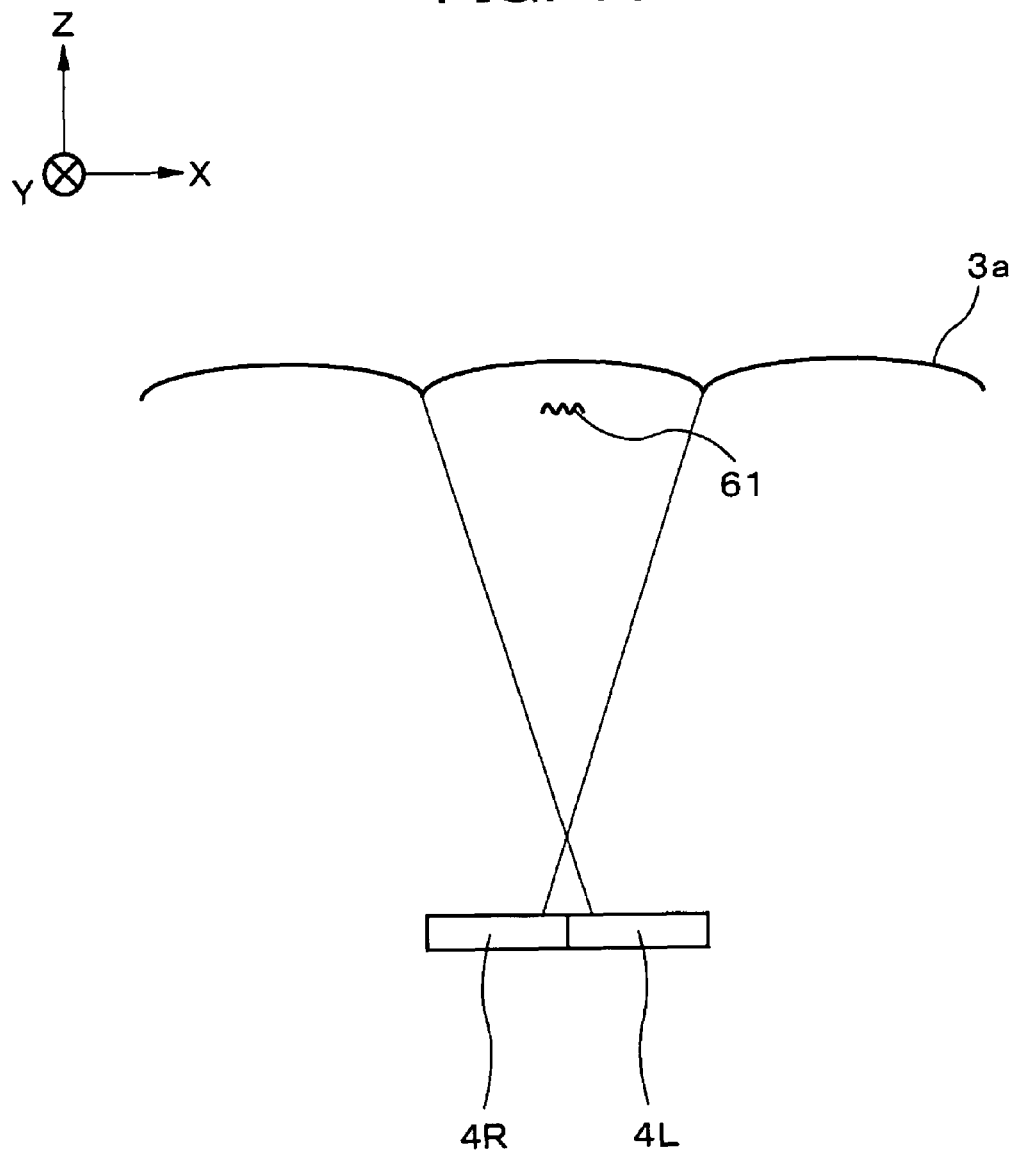
FIG. 11 is a sectional view showing an instance when the anisotropic scattering structure is present in a position that is adequately separated from the focus of the cylindrical lens.

This phenomenon is described with reference made to FIGS. 9 through 11. FIG. 9 is a sectional view showing a case where anisotropic scattering structures are present in the vicinity of the focal point of the cylindrical lens, and have a particularly dramatic effect; FIG. 10 shows a case where the effect of the anisotropic scattering structures is minor; FIG. 11 is a sectional view showing a case where the anisotropic scattering structures are present in positions that are adequately removed from the focal point of the cylindrical lens. The direction in which the scattering performance of the anisotropic scattering structures is at a maximum is the Y-axis direction; however, some scattering occurs in the X-axis direction as well. Only some of the anisotropic scattering regions also cause scattering in the X-axis direction. Since particular attention is focused herein on X-axis direction scattering, only those portions having scattering regions in the X-axis direction are depicted in FIGS. 9 through 11 as the anisotropic scattering structures 61.

As shown in FIG. 9, in the case that the anisotropic scattering structures 61 that scatter in the X-axis direction are present in the vicinity of the focal point of the cylindrical lenses 3a, most of the light emitted from the cylindrical lenses 3a will be affected by the anisotropic scattering structures 61. However, as shown in FIG. 10, in the case that a slight change is made to the angle of the light emitted from the cylindrical lenses 3a; i.e., the observations performed by the observer are made from a slightly inclined direction, the effect of the anisotropic scattering structures 61 will decline. The effect of the anisotropic scattering structures thus increases or decreases depending on the angle at which the observer views the display device. In the case that the anisotropic scattering structures have a major effect, X-axis direction scattering is dramatic, whereas when the effect is minor, scattering is also minimal. The observer will accordingly perceive deterioration in image quality.

By contrast, when the anisotropic scattering structures 61 are present in a position that is adequately removed from the focal point of the cylindrical lenses 3a, as shown in FIG. 11, the effect produced by the anisotropic scattering structures 61 will be consistent, for which reason the observer will have no perception of a deterioration in image quality. The anisotropic scattering structures are thus preferably situated away from the focal point of the lens.

A description shall next be provided in regard to the degree to which the anisotropic scattering structures should be situated apart from the focal point. As has been described in the foregoing, the anisotropic scattering structures that scatter in the X-axis direction are preferably uniformly present in the X-axis direction, in which case no significant problems will be presented. Specifically, the anisotropic scattering structures are preferably arranged densely, since problems will be magnified if they are arranged sparsely. For example, in the case that the spacing between the anisotropic scattering structures in the X-axis direction is greater than the lens arrangement pitch L, the anisotropic scattering structures will be present on some cylindrical lenses and not on others. The observer will have a perception of reduced image quality in such cases; therefore, in cases where a plurality of anisotropic scattering structures that scatter in the X-axis direction are present, the interval therebetween is preferably equal to or less than the lens arrangement pitch L. It shall therefore be considered that the anisotropic scattering structure interval is L, and a single anisotropic scattering structure corresponds to a single cylindrical lens. In addition, uniformity is more readily achieved, and preferably so, when the anisotropic scattering structures are of large width in the X-axis direction, for which reason a case shall also be considered of the X-axis direction width being zero as a boundary condition. Moreover, the anisotropic scattering structures are less readily situated away from the lens focal-point when the lens focal point distance is short; therefore, consideration shall also be given with regard to the minimum focal distance condition indicated by Formulae 12 and 13.

As a precondition, a case shall also be considered wherein the anisotropic scattering structures function not just in the main lobe but in the primary side lobe. As has been described in the foregoing, display units comprising left and right pixels are disposed correspondingly with lenses in the present embodiment. In general, "main lobe" refers to light that is emitted from a given display unit and passes through the corresponding lens. "Primary side lobe" refers to light that is emitted from a given pixel pair and passes through a lens corresponding to another pixel pair disposed adjacently with regard to the emitting pixel pair. The main lobe is present in the front direction of the display device, and the primary side lobe is present in a direction that is inclined slantwise with regard to the lens arrangement direction.

Figure 12:
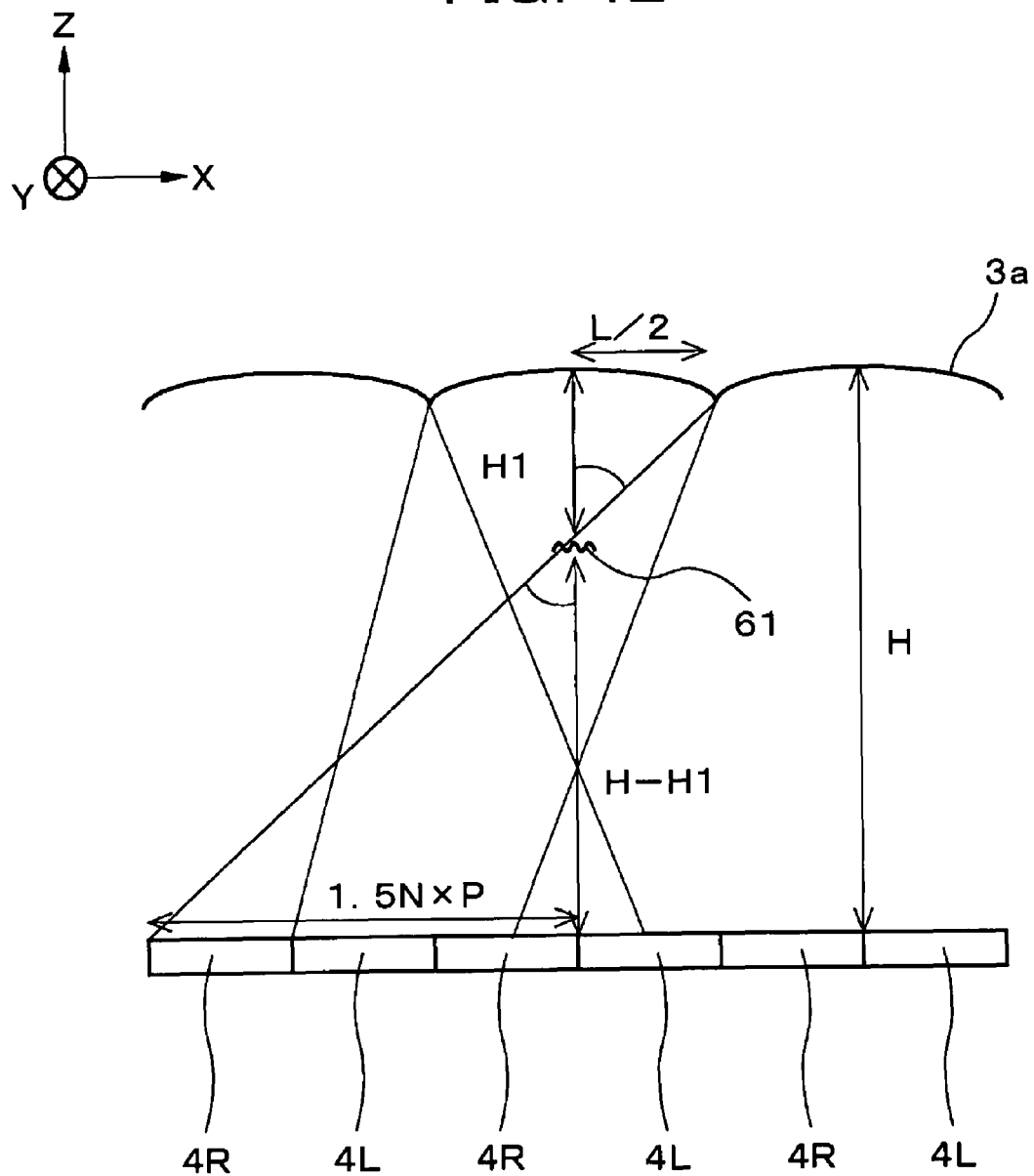
FIG. 12 is an optical model diagram used to compute a position along the Z axis direction of the anisotropic scattering structure.

As shown in FIG. 12, in the case that the anisotropic scattering structures are present in the vicinity of the optical axis of the lens, then when they are distanced to a certain degree from the focal point of the lens, the anisotropic scattering structures can be actuated in the primary side lobe as well as the main lobe. Taking H1 as the distance from the principal point; i.e., apex, of the lens to the anisotropic scattering structures, then the distance from the anisotropic scattering structures to the pixel surface is H−H1. Accordingly, if a case is considered wherein the light emitted from adjoining pixel pairs passes through the anisotropic scattering structures 61 and enters an end of a cylindrical lens 3a, then an analogous relationship will be established between a triangular form whose bottom edge is L/2 (half of the lens arrangement pitch) and whose height is H1, and a triangular form whose bottom edge is a distance of 1.5N×P (corresponding to 1.5N pixels (N=2 in regard to left and right pixels)) and whose height is H−H1. Formula 17 can also be established.

$$L/2 : H1 = 1.5N \times P : H - H1 \qquad \text{[Formula 17]}$$

If Formula 17 is re-arranged with respect to H1, then Formula 18 is obtained.

$$H1 = L \times H/(L + 3N \times P) \qquad \text{[Formula 18]}$$

The value computed by Formula 18 is a boundary condition; therefore, as indicated by Formula 19, no problems will be presented with a range of less than this value. The lower limit of H1 is zero, and this case relates to when anisotropic scattering structures are formed on the lens surface.

$$H1 \leq L \times H/(L + 3N \times P) \qquad \text{[Formula 19]}$$

As a precondition, it is assumed that the anisotropic scattering structures are present on the optical axis of the lens; however, as described above, the consideration extends to the main lobe and the adjacent primary side lobe. Therefore, even when the structures are present in places other than along the optical axis, this condition will be applicable.

Providing an arrangement whereby the distance between the apex of the lens and the anisotropic scattering structures will be equal to or less than L×H/(L+3N×P) once the calculations above are all performed enables the present invention to be used and image quality improved, even in cases where the anisotropic scattering structures having scattering characteristics along the X-axis direction are not disposed in an adequately compact arrangement.

A description shall now be provided of conditions allowing a parallax barrier to demonstrate an image allocation action in an effective manner, when the parallax barrier is used as the image allocation means. A description shall first be provided of a parallax barrier system, with reference being made to FIG. 13.

A parallax barrier 7 is a light-blocking plate on which are formed numerous small, vertically striped openings; i.e., slits 7a. In other words, the parallax barrier is an optical member on which are formed slits extending in a second direction that is orthogonal to a first direction (the allocation direction), the slits being formed so that a plurality thereof are arranged along the first direction. Light emitted from the left eye pixels 4L towards the parallax barrier 7 passes through the slits 7a, and then forms a beam that propagates towards a region EL. Similarly, light emitted from the right eye pixels 4R towards the parallax barrier 7 passes through the slits 7a, and then forms a beam that propagates towards a region ER. The observer is able to perceive three-dimensional images once they position their left eye 552 on the region EL and their right eye 551 on the region ER.

Figure 13:
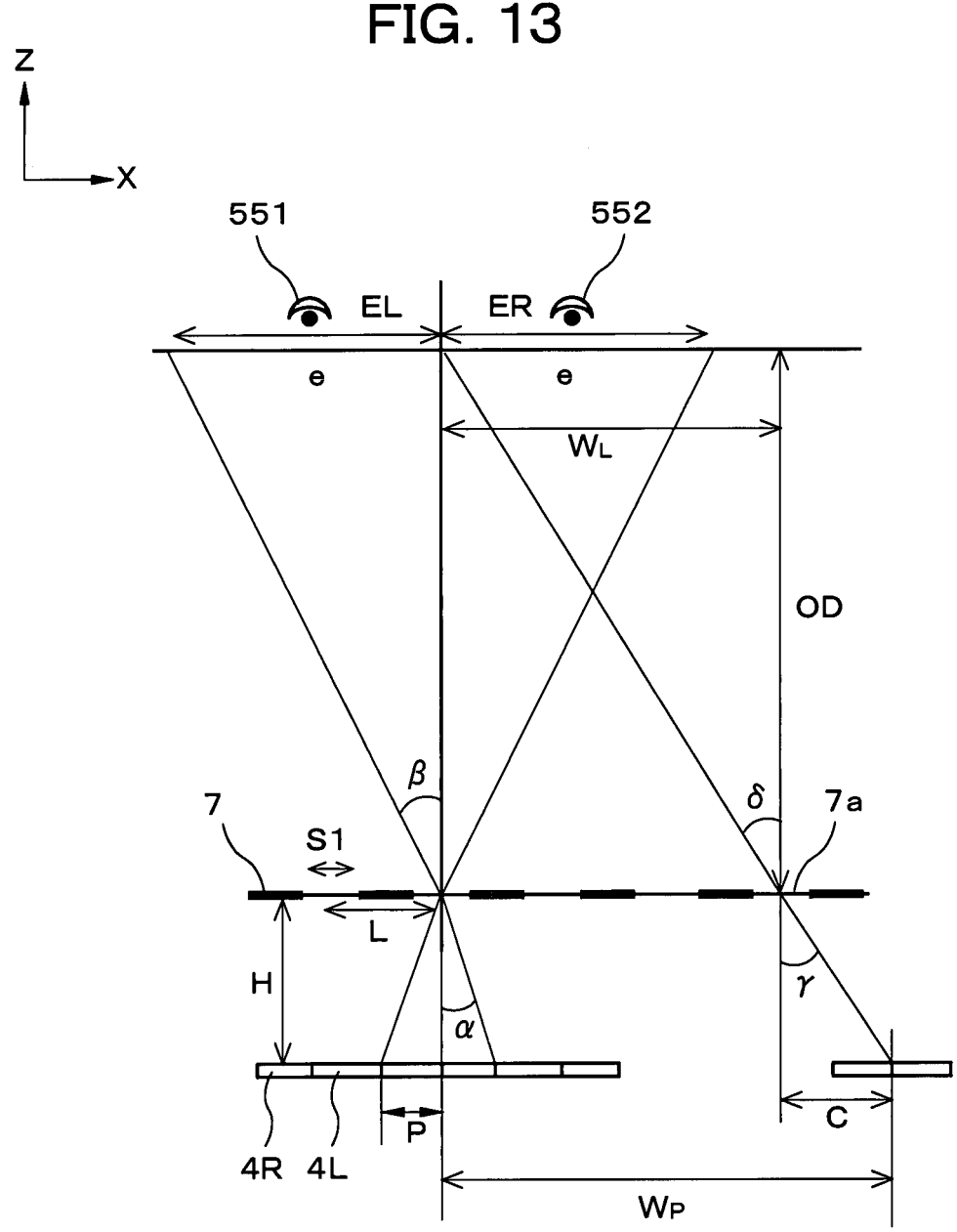
FIG. 13 is a sectional view showing an optical model when a parallax barrier is used.

A detailed description shall next be provided of the size of the components used in a three-dimensional image display device in which a parallax barrier having slit-shaped openings has been disposed on the front surface of a display panel. As shown in FIG. 13, L refers to the pitch at which the slits 7a of the parallax barrier 7 are arranged, and H refers to the distance between the pixels and the parallax barrier 7. The optimal observation distance OD refers to the distance between the observer and the parallax barrier 7. WL refers to the distance from the center of the slits 7a positioned in the center of the parallax barrier 7 to the center of the slits 7a positioned on an end of the parallax barrier 7 in the X-axis direction. The parallax barrier 7 is a light-blocking plate, and therefore prevents the passage of light entering anywhere besides via the slits 7a. However, the parallax barrier 7 is provided with a substrate for supporting the barrier layer, and the refractive index of the substrate is defined as n. Should the supporting substrate not be present, the refractive index n may be set to 1, which is the refractive index of ambient air. To provide a definition in such circumstances, when the light emitted via the slits 7a is emitted from the substrate that supports the barrier layer, refraction occurs according to Snell's law. Therefore, α and β refer, respectively, to the angles of incidence and excidence with regard to light in the slit 7a positioned in the center of the parallax barrier 7. γ and δ refer, respectively, to the angles of incidence and excidence with regard to light in the slit 7a positioned on the edge of the parallax barrier 7 in the X-axis direction. S1 refers to the width of the opening of the slit 7a. The pitch L at which the slits 7a are arranged and the pitch P at which the pixels are arranged are interrelated, so that each pitch value can be determined in association with the other. However, in general, parallax barriers are often designed in combination with the display panel, for which reason the pixel arrangement pitch P is treated as a constant. The refractive index n is determined by selecting the material to be used for the substrate for supporting the barrier layer. Conversely, the observational distance OD between the parallax barrier and the observer and the period e of the pixel enlarged projected image at the observational distance OD are set using desired values. These values are used to determine the distance H between the barrier and the pixels and the lens pitch L. Formulae 20 through 25 below are derived from Snell's Law and geometric relationships. Formulae 26 through 28 below are also derived.

$$n \times \sin \alpha = \sin \beta \quad \text{[Formula 20]}$$

$$OD \times \tan \beta = e \quad \text{[Formula 21]}$$

$$H \times \tan \alpha = P \quad \text{[Formula 22]}$$

$$n \times \sin \gamma = \sin \delta \quad \text{[Formula 23]}$$

$$H \times \tan \gamma = C \quad \text{[Formula 24]}$$

$$OD \times \tan \delta = WL \quad \text{[Formula 25]}$$

$$WP - WL = C \quad \text{[Formula 26]}$$

$$WP = 2 \times m \times P \quad \text{[Formula 27]}$$

$$WL = m \times L \quad \text{[Formula 28]}$$

A description has been provided above of a two-viewpoint three-dimensional image display device having left eye pixels and right eye pixels; however, this arrangement is not provided by way of limitation in the present invention. For example, the invention may be similarly used for a display device whose format involves N viewpoints. In such cases, the number of pixels contained in the regions relating to the distance WP may be changed from 2m to N×m in the definition of the distance WP indicated hereinabove.

If a complete calculation is made using the above parameters, the pixel arrangement pitch P is a value determined according to the display panel, while the period e of the enlarged image projected from the pixels and the observation distance OD are values determined according to the configuration of the display device. The refractive index n is determined according to the material used for the supporting substrate or the like. The slit arrangement pitch L derived from these values and the distance H between the parallax barrier and the pixels are parameters used to determine the position at which the light from the pixels is projected on the observation surface. The parameter for changing the image allocation effect is the slit opening width S1. Specifically, in the case that the distance H between the barrier and the pixels is fixed, then a smaller slit opening width S1 will enable the left and right pixel images to be more distinctly separated. The principle is the same as that used for a pinhole camera. As the opening width S1 gets larger, the left and right pixel images will become fuzzy, preventing distinct separation.

Figure 14:
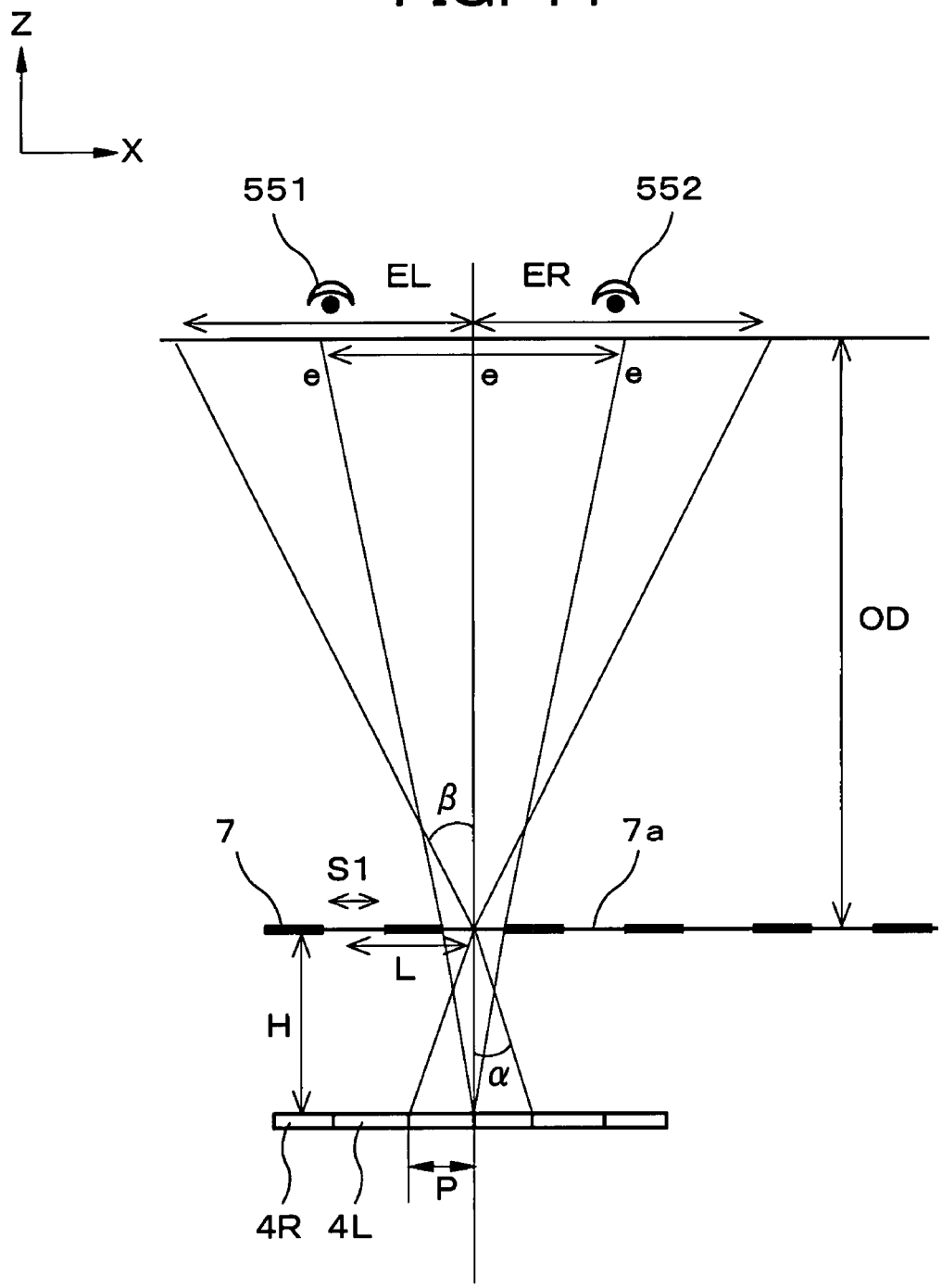
FIG. 14 is an optical model diagram showing an instance when the slit opening width is at a maximum, in order to compute the image separation conditions of the parallax barrier.

The range of widths in the parallax barrier slits at which separation will occur can be more intuitively calculated than when a lens system is used. As shown in FIG. 14, when light emitted from the boundary between the left eye pixels 4L and the right eye pixels 4R passes through the slits 7a, the width of the light is reduced to width S1, which is the slit opening width. The light propagates across distance OD before reaching the observation plane, but the width at the observation plane must be equal to or less than e in order for separation to occur. In the case that the light exceeds this width, the left/right pixel projection period will be exceeded, and separation will accordingly not occur. The width S1 of the slit opening is half that of the slit pitch L. Specifically, the range of widths in the parallax barrier slits at which separation will occur is equal to or less than one-half the slit pitch.

Figure 15:
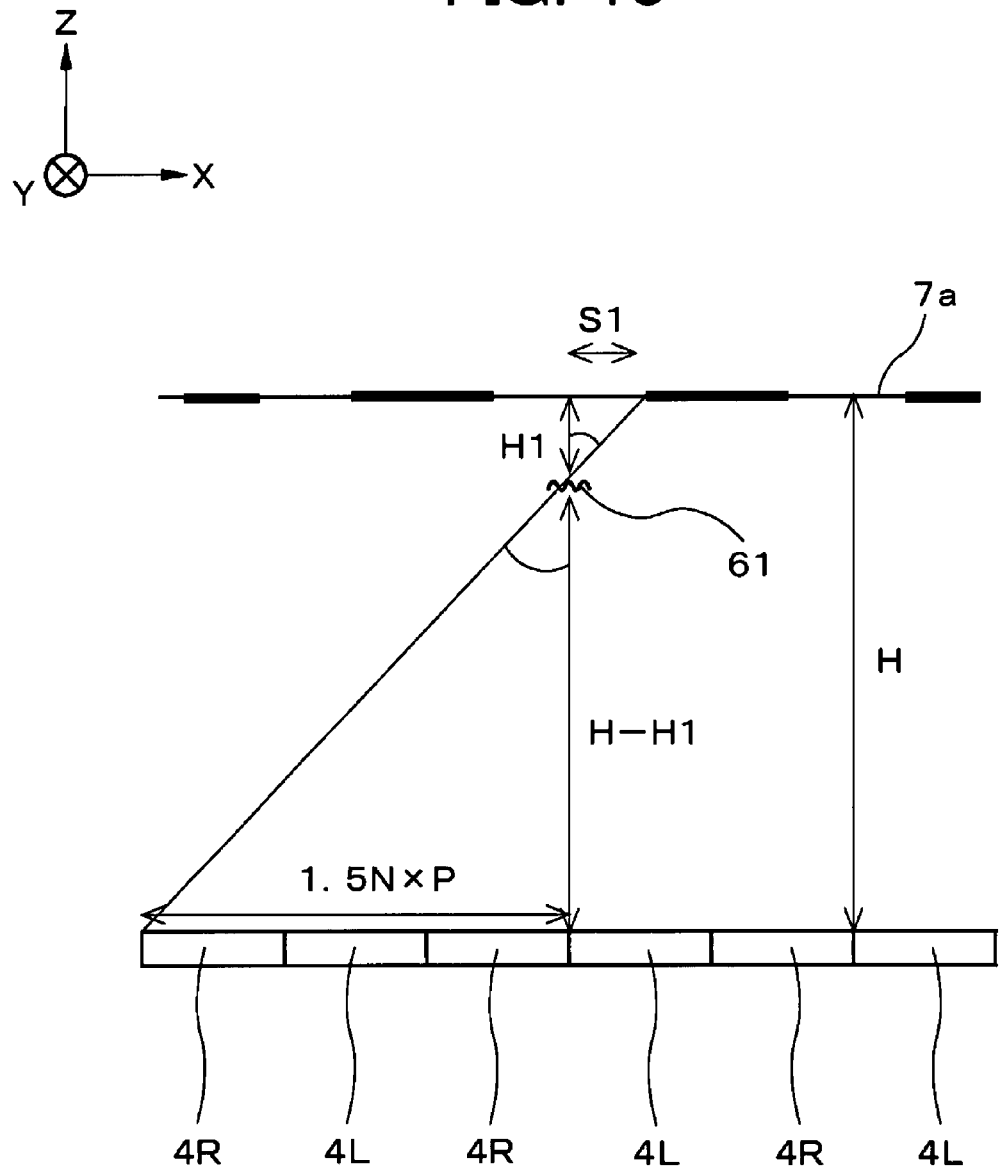
FIG. 15 is an optical model diagram for computing a position along the Z axis direction of the anisotropic scattering structure.

A description shall next be provided of a preferred position of the anisotropic scattering structures in the Z-axis direction, using a parallax barrier system. As shown in FIG. 15, the lens system can be regarded as being similar to the parallax barrier system. Accordingly, the lens arrangement pitch L is used as the width S1 of the opening of the slits 7a, and using S1 in Formula 19 above allows Formula 29 below to be obtained.

$$H1 \leq S1 \times H / (S1 + 3N \times P) \quad \text{[Formula 29]}$$

Providing an arrangement so that the distance between the parallax barrier and the anisotropic scattering structures will be equal to or less than S1×H/(S1+3N×P) when the above calculations have been performed enables the present invention to be used and image quality improved, even in cases where the anisotropic scattering structures having scattering characteristics along the X-axis direction are not disposed in an adequately compact arrangement.

Furthermore, a mobile telephone was described as an example of the terminal device in the present embodiment, but the present invention is not limited by this configuration, and may be applied to PDAs, personal TVs, gaming devices, digital cameras, digital video cameras, notebook personal computers, and various other types of mobile terminal devices. The present invention is also applicable not only to mobile terminal devices, but also to cash dispensers, automatic vending machines, monitors, television receivers, and various other types of fixed terminal devices.

Figure 6:
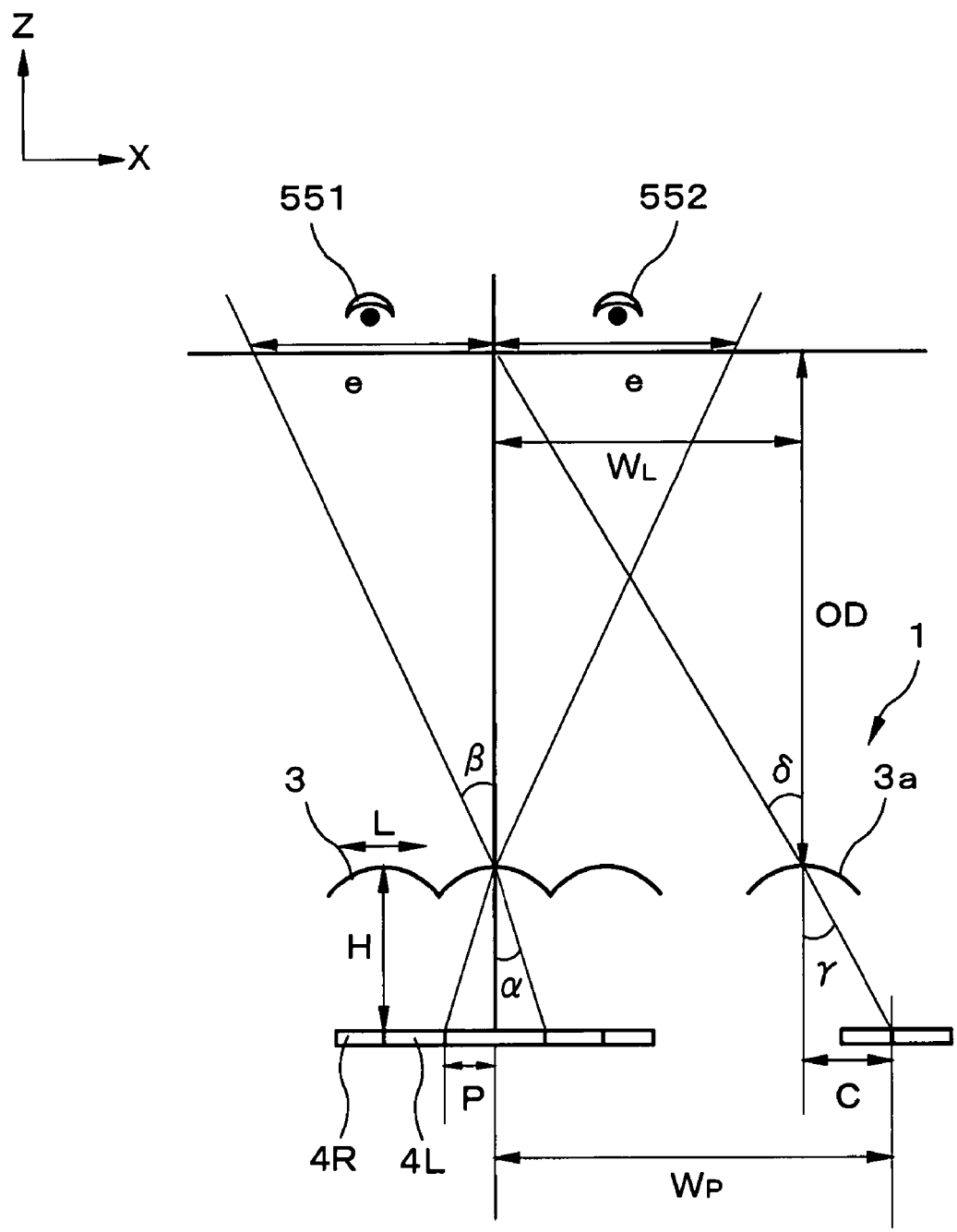
FIG. 6 is a sectional view showing an optical model when a lenticular lens is used.

Embodiment 2 of the present invention will next be described. FIG. 6 is a sectional view showing the terminal device according to the present embodiment. In Embodiment 1 of the present invention, the anisotropic scattering sheet as the anisotropic scattering part was disposed between the reflective liquid crystal display panel and the lenticular lens as the image allocation part. Embodiment 2 differs from Embodiment 1 in that the anisotropic scattering structures are provided on the surface opposite the surface on which the lens surface of the lenticular lens as the image allocation part is formed, and the anisotropic scattering structures are integrally formed with the lenticular lens.

Figure 16:
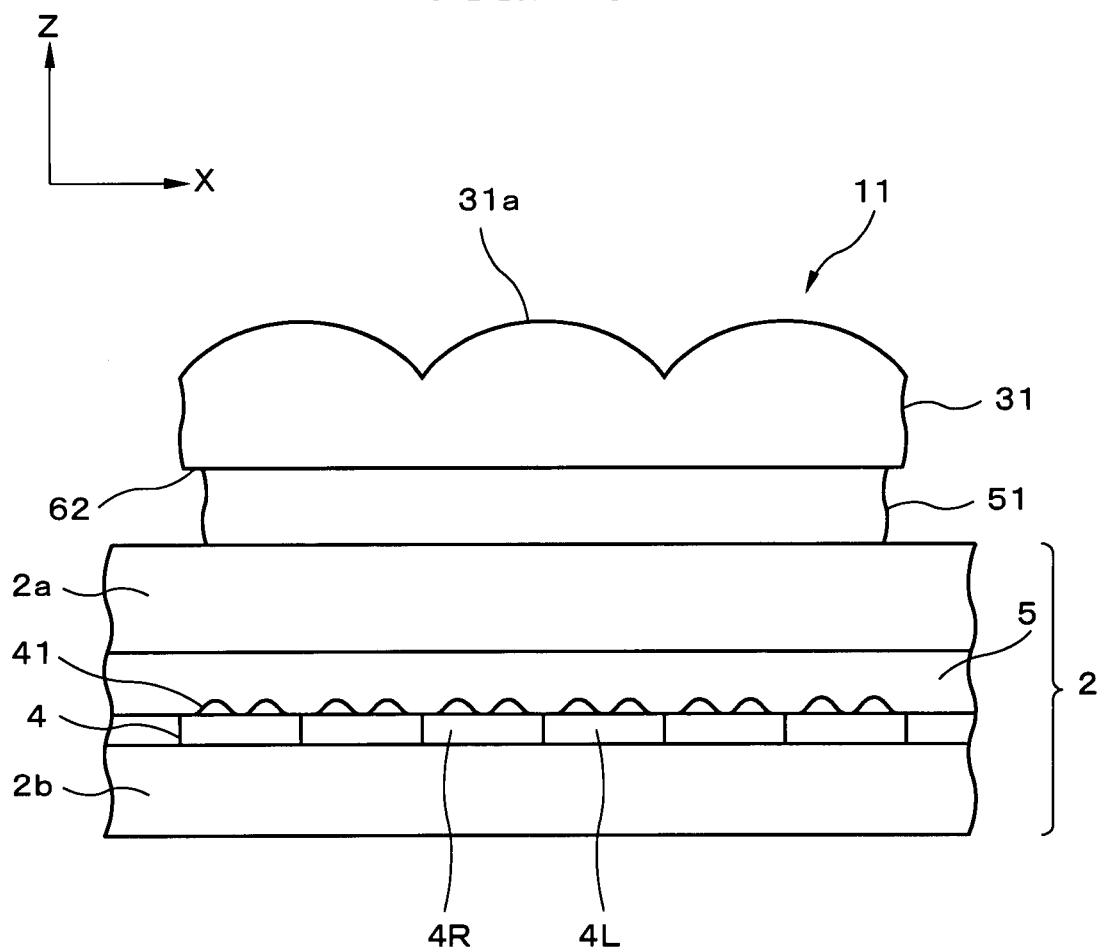
FIG. 16 is a sectional view showing the display device according to Embodiment 2 of the present invention.

Specifically, in the reflective liquid crystal display device 11 of the present embodiment as shown in FIG. 16, a lenticular lens 31 as the image allocation part is provided to the +Z side as the outermost surface of the reflective liquid crystal display device 11, and numerous cylindrical lenses 31a are formed on the +Z surface of the lenticular lens 31 that faces the user. An anisotropic scattering structure 62 as the anisotropic scattering part is formed on the −Z side of the lenticular lens 31, which is the surface that faces the reflective liquid crystal display panel 2. For example, using a hot embossing method, the anisotropic scattering structure 62 can be formed at the same time as the lens surface by setting a die used for the anisotropic scattering structure on the back surface of the lenticular lens 31 and pressing when the lens surface of the lenticular lens 31 is formed. Techniques other than this method preferably include using an anisotropic blaster, such as a diagonal blaster, to apply a pattern extending in one direction, and a rubbing technique whereby rubbing is performed in a single direction. The lenticular lens 31 and the reflective liquid crystal display panel 2 are fixed together by an adhesive material 51, and a material having a different refractive index than the lenticular lens 31 is used as the adhesive material 51. Aspects of the present embodiment other than those described above are the same as in Embodiment 1.

In the present embodiment, the use of the anisotropic scattering part makes it possible to prevent a reduction in display quality due to the lenticular lens and the concavo-convex structures of the reflecting panel without significantly compromising the image allocation effects of the lenticular lens, in the same manner as in Embodiment 1. Relative to Embodiment 1 described above, since the anisotropic scattering part is integrally formed with the lenticular lens, there is no need for a component for supporting the anisotropic scattering structure of the anisotropic scattering part, and the profile of the device can therefore be reduced. Since the anisotropic scattering part and the image allocation part can be integrally formed rather than formed separately and combined, the number of members can be reduced, and the number of assembly steps can be reduced. The cost can therefore be reduced. Since it is also possible to eliminate fluctuation in the relative positioning of the anisotropic scattering part and the image allocation part during assembly, unevenness can also be reduced. In the present embodiment, it is necessary to prepare a special lenticular lens in which the anisotropic scattering part and the image allocation part are integrally formed, but there is no need to change the pitch or curvature of the lens, and a conventional die may be used. The cost can therefore be reduced. Moreover, the surface on which the anisotropic scattering structures are formed can be situated apart from the focal point of the lenticular lens, and excellent image quality can be obtained. Effects of the present embodiment other than those described above are the same as those of Embodiment 1.

Figure 17:
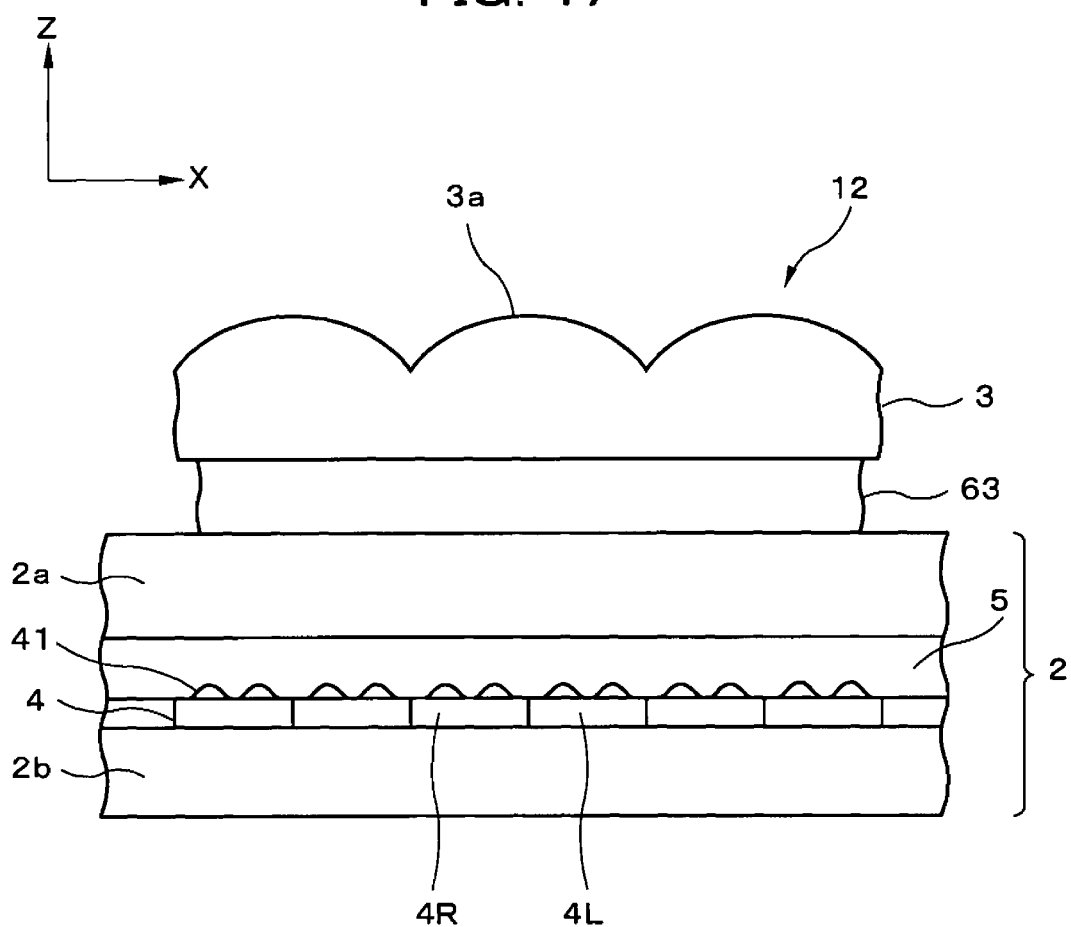
FIG. 17 is a sectional view showing the display device according to Embodiment 3 of the present invention.

Embodiment 3 of the present invention will next be described. FIG. 17 is a sectional view showing the display device according to the present embodiment. In Embodiment 2 of the present invention, the anisotropic scattering structure as the anisotropic scattering part was formed on the surface opposite the surface on which the lens surface of the lenticular lens as the image allocation part was formed. Embodiment 3 differs from Embodiment 2 in that the reflective liquid crystal display panel and the lenticular lens as the image allocation part are affixed to each other using anisotropic scattering glue 63 that has anisotropic scattering capability.

Specifically, in the reflective liquid crystal display device 12 of the present embodiment as shown in FIG. 17, the anisotropic scattering glue 63 is applied to the surface opposite the surface on which the cylindrical lenses 3a of the lenticular lens 3 are formed, and the lenticular lens 3 and the reflective liquid crystal display panel 2 are affixed together by the anisotropic scattering glue 63. The anisotropic scattering glue 63 is a glue in which materials that are worked into fibers or rod shapes are oriented and dispersed, and the materials each have different refractive indices, for example. Aspects of the present embodiment other than those described above are the same as in Embodiment 2.

In the present embodiment, the use of the anisotropic scattering part makes it possible to prevent a reduction in display quality due to the lenticular lens and the concavo-convex structures of the reflecting panel without significantly compromising the image allocation effects of the lenticular lens, in the same manner as in Embodiment 2. Relative to Embodiment 2, since there is no need for a die for molding the anisotropic scattering structure, or a process for transferring the anisotropic scattering structure, the cost can be reduced. Moreover, the fiber- or rod-shaped materials present in the anisotropic scattering glue have extremely fine structures, which results in highly uniform scattering within the plane. The image quality is therefore dramatically improved. Effects of the present embodiment other than those described above are the same as in Embodiment 2.

Figure 18:
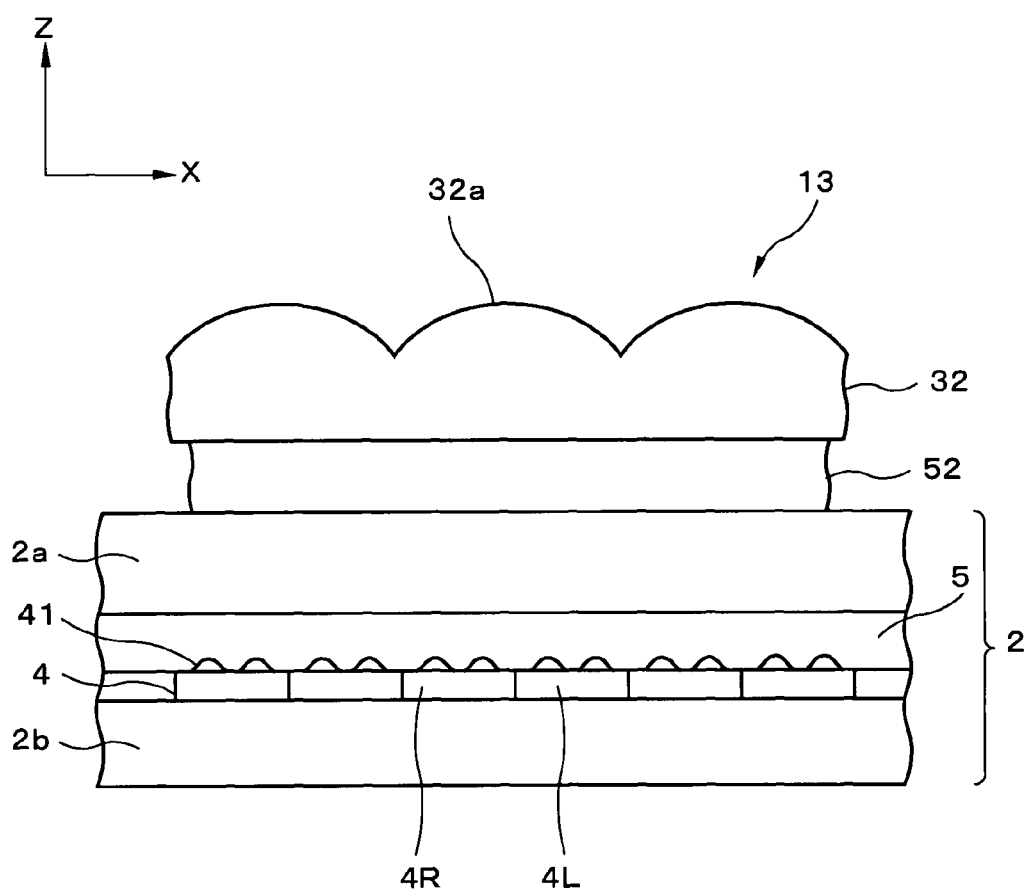
FIG. 18 is a sectional view showing the display device according to Embodiment 4 of the present invention.

Embodiment 4 of the present invention will next be described. FIG. 18 is a sectional view showing the display device according to the present embodiment. In Embodiment 3, the reflective liquid crystal display panel and the lenticular lens as the image allocation part were affixed to each other using anisotropic scattering glue 63 that has anisotropic scattering capability. Embodiment 4 differs from Embodiment 3 in that the anisotropic scattering structure is formed inside the lenticular lens itself as the image allocation part.

Specifically, in the reflective liquid crystal display device 13 of the present embodiment as shown in FIG. 8, the base material of the lenticular lens 32 has anisotropic scattering, whereby the lenticular lens 32 itself has anisotropic scattering capability. Suitable methods that can be used to fabricate a base material having anisotropic scattering capability include a method for orienting and dispersing fibrous or rod-shaped materials having different refractive indices when the base material is fabricated, a method for extending a base material that has isotropic scattering so as to make the scattering anisotropic, and other methods. A hot embossing method, for example, may be used to transfer a lens shape to a base material having anisotropic scattering capability that is fabricated according to the aforementioned methods in order to fabricate a lenticular lens 32 that has anisotropic scattering.

The lenticular lens 32 is fixed to the reflective liquid crystal display panel 2 by an adhesive material 52. Aspects of the present embodiment other than those described above are the same as in Embodiment 3.

In the present embodiment, the use of the anisotropic scattering part makes it possible to prevent a reduction in display quality due to the lenticular lens and the concavo-convex structures of the reflecting panel without significantly compromising the image allocation effects of the lenticular lens, in the same manner as in Embodiment 3. In comparison to Embodiment 2, there is no need to use an adhesive material whose refractive index differs from that of the lenticular lens. Furthermore, in comparison to Embodiment 3, there is no need to use an anisotropic scattering glue. Specifically, in comparison to Embodiments 2 and 3, since the adhesive materials and glues that can be used can be selected from a significantly wider range, even further cost reduction can be obtained in addition to the characteristics of Embodiments 2 and 3. Moreover, the surface on which the anisotropic scattering structures are formed can be situated apart from the focal point of the lenticular lens, and excellent image quality can be obtained.

In the present embodiment, the lenticular lens as the image allocation part was described as having an anisotropic scattering structure in the interior thereof, but the present invention is not limited by this configuration, and another constituent member may have anisotropic scattering capability in the interior thereof. For example, a plastic base panel may be used in the display panel, and the plastic base panel may have anisotropic scattering capability. A polarizing panel or a phase difference panel used in the liquid crystal display panel may also have anisotropic scattering. Furthermore, an adhesive layer for fixing an optical film provided to the display panel to the base panel of the display panel may be an anisotropic scattering adhesive layer. Effects of the present embodiment other than those described above are the same as in 3.

Figure 19:
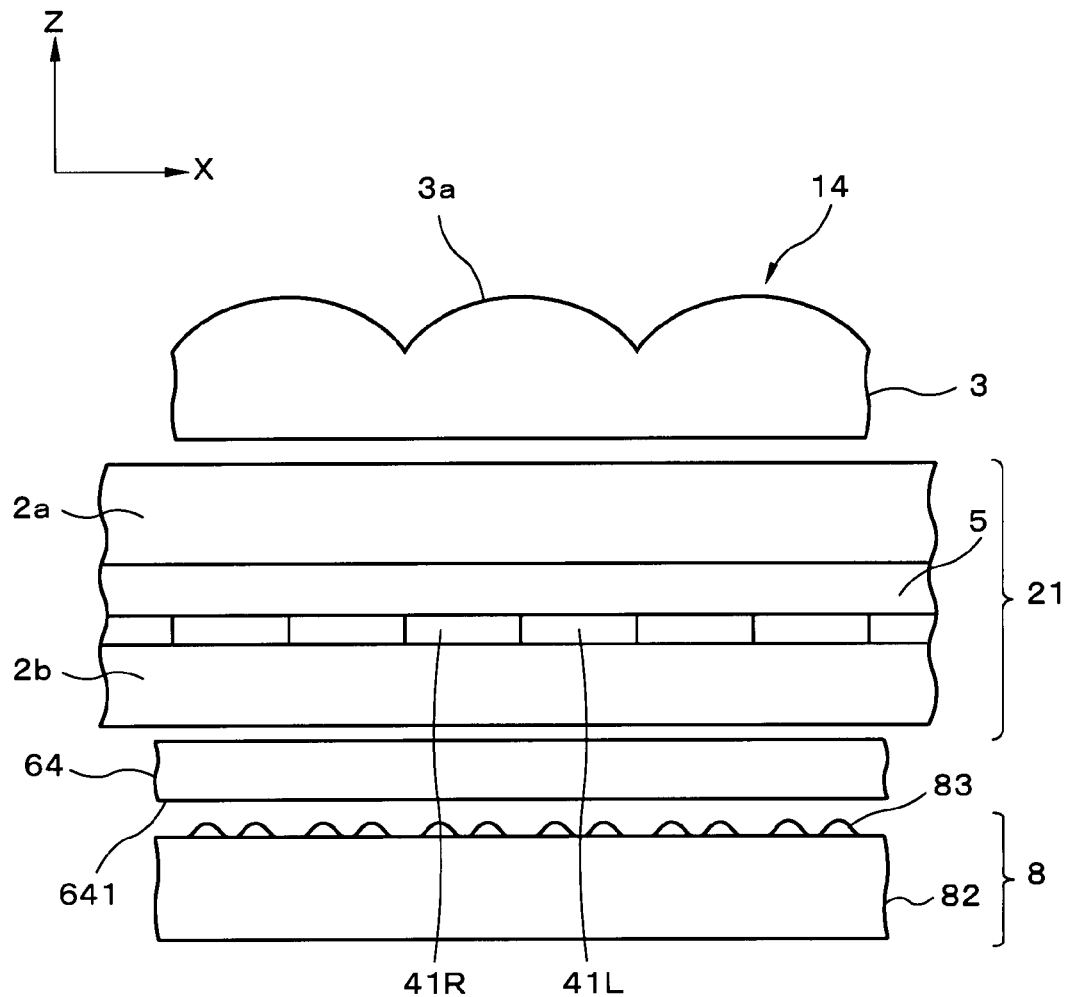
FIG. 19 is a sectional view showing the display device according to Embodiment 5 of the present invention.
Figure 20:
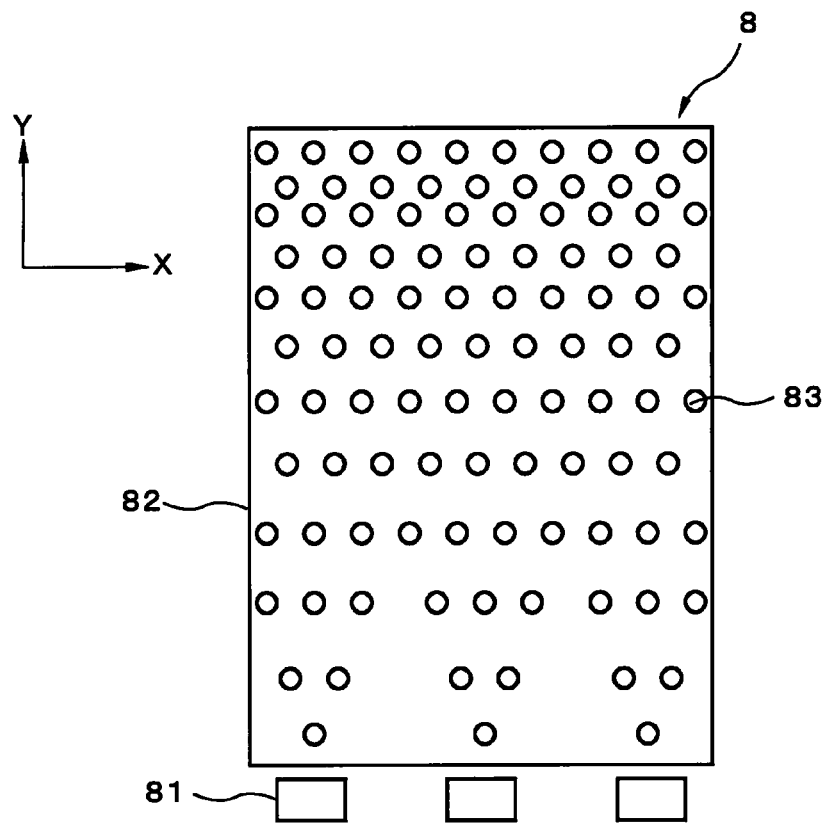
FIG. 20 is a top view showing the light-guide panel and LED shown in FIG. 19.
Figure 21:
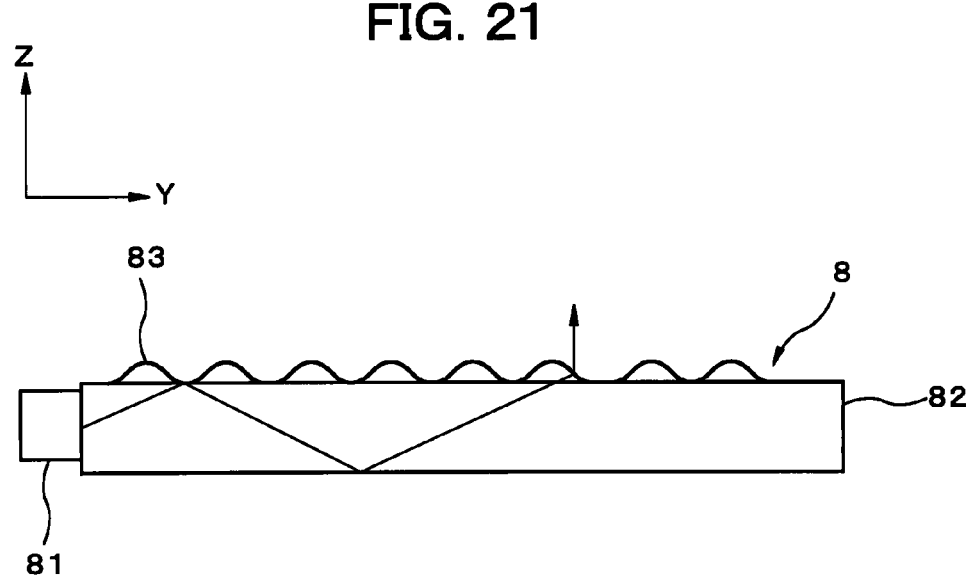
FIG. 21 is a sectional view showing the light-guide panel and LED shown in FIG. 19.

Embodiment 5 of the present invention will next be described. FIG. 19 is a sectional view showing the display device according to the present embodiment; FIG. 20 is a top view showing the light-guide panel and LED shown in FIG. 19; and FIG. 21 is a sectional view showing the light-guide panel and LED shown in FIG. 19.

As shown in FIG. 19, the lenticular lens 3, a transmissive liquid crystal display panel 21, an anisotropic scattering sheet 64, and a backlight unit 8 are provided in sequence in the direction from the user in the transmissive liquid crystal display device 14 of the present embodiment. In the transmissive liquid crystal display panel 21, the display pixels of the display panel are composed of left-eye pixels 41L and right-eye pixels 41R adjacent to each other in the same manner as the reflective liquid crystal display panel 2 in Embodiment 1 of the present invention. The display pixels are also arranged along the longitudinal direction of the cylindrical lenses 3a, and the lenticular lens 3 is disposed so that a single cylindrical lens 3a corresponds to a row of arranged display pixels, the same as in Embodiment 1. Specifically, in the transmissive liquid crystal display device 14 of the present embodiment, the lenticular lens as the image allocation part, and the basic structure of the display panel are the same as in Embodiment 1 of the present invention, but the present embodiment differs from Embodiment 1 in that the display panel is a transmissive display panel that requires a backlight planar light source. The focal distance of the cylindrical lenses 3a that constitute the lenticular lens 3 is set to the distance between the principal points of the cylindrical lenses 3a, i.e., the apexes of the lenses, and the left-eye pixels 41L or the right-eye pixels 41R.

The backlight unit 8 is composed of LEDs 81 as a light source, and a light-guide panel 82 for propagating the light emitted from the light source so as to create a planar light source. As shown in FIG. 20, the LEDs 81 are provided on the −Y side of the light-guide panel 82. The light emitted from the LEDs 81 enters the light-guide panel 82 from the −Y side of the light-guide panel 82 and propagates through the light-guide panel while undergoing total reflection.

As shown in FIG. 20, numerous dots 83 (concavo-convex structures) are provided to the surface on the +Z side of the light-guide panel 82. The dots 83 are formed on the light-guide panel 82 by printing, for example, and have the functions of disrupting the total reflection conditions for the light propagated in the light-guide panel and redirecting the light to the +Z direction. As shown in FIG. 21, when light emitted from the LED 81 disposed on the −Y side of the light-guide panel 82 enters the light-guide panel, the light propagates in the light-guide panel while undergoing total reflection as previously mentioned, but this process occurs when the light enters a portion in which the dots 83 are not formed. When the light that propagates while undergoing total reflection enters a portion in which a dot 83 is present, the total reflection conditions are disrupted by the shape of the dot. The light propagated in the light-guide panel is thereby redirected to the outside of the light-guide panel, and the light-guide panel acts as a planar light source. Light is thus redirected from the dot portions in the light-guide panel in which the dots are formed. In other words, when the planar light source in which dots are formed is viewed microscopically, the dot portions are brighter than the other portions. Such a microscopic difference in brightness is not created merely by the light-guide panel in which dots are formed, but is a phenomenon that is also common to a case in which total reflection conditions are disrupted by providing minute grooves or other structures to a light-guide panel, and the light is redirected from the light-guide panel. Specifically, in a light-guide panel that has minute concavo-convex shapes, the emitted light has a microscopic in-plane distribution due to the concavo-convex structures.

The anisotropic scattering sheet 64 in the present embodiment has the same basic structure as the anisotropic scattering sheet 6 in Embodiment 1 of the present invention, but differs from Embodiment 1 in that the direction of maximum scattering is set to the X-axis direction, and the direction of minimum scattering is set to the Y-axis direction. Furthermore, the anisotropic scattering structure 641 is formed on the −Z side of the anisotropic scattering sheet 64. Aspects of the present embodiment other than those described above are the same as in Embodiment 1.

Figure 22:
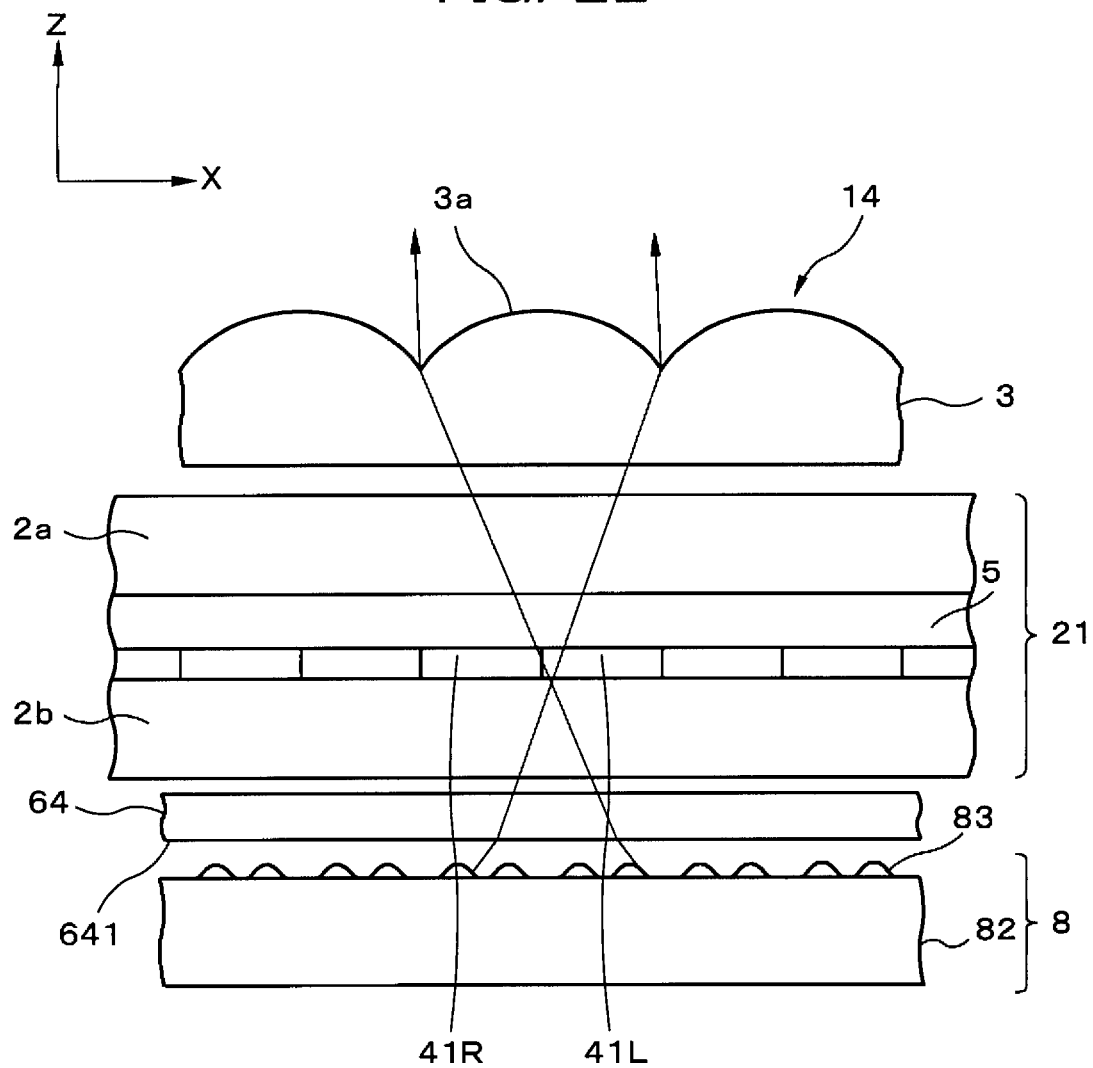
FIG. 22 is a diagram showing the optical model in a cross-section created by a line segment that is parallel to the X-axis direction in the transmissive liquid crystal display device of the present embodiment.

Following is a description of the operation of the transmissive liquid crystal display device of the present embodiment configured as described above. FIG. 22 is a diagram showing the optical model in a cross-section of the transmissive liquid crystal display device created by a line segment that is parallel to the X-axis direction in the transmissive liquid crystal display device shown in FIG. 19. As shown in FIG. 22, since the display device in the present embodiment is transmissive, a display is created using light that is emitted from the light-guide panel 82 into the display panel 21. In the case of light that passes through a point of a display pixel of the transmissive liquid crystal display panel 21 and enters the cylindrical lens that corresponds to the pixel, the group of light rays entering the cylindrical lens 3a form a triangle in which the bottom side is the lens pitch, and the focal distance is the height. The focal distance of the cylindrical lens is set to the distance between the pixel and the apex of the lens, as described above. The light emitted from the cylindrical lens is therefore collimated light.

In a case in which there is no anisotropic scattering sheet 64, a group of light rays emitted from the light-guide panel 82 toward a certain point of the aforementioned display pixel forms a triangle. As previously mentioned, the light emitted from the light-guide panel 82 is emitted mainly from the dots 83. Therefore, when a dot is not included in the bottom side of the triangle that is formed by the group of light rays emitted from the light-guide panel 82 toward a certain point of the aforementioned display pixel, there is no light that passes through the certain point of the display pixel. When a dot is included, there is light that passes through the certain point of the display pixel. The point on the display pixel varies according to the angle at which the user views the display panel, and the position of the bottom side of the triangle formed by the group of light rays directed at the point also varies in conjunction with this viewing angle. Therefore, when there is no anisotropic scattering sheet, bright regions and dark regions occur in the display according to the position of the user. Differences in brightness are therefore superimposed in the display image, and a reduction in image quality is observed.

However, since the anisotropic scattering sheet 64 is present in the present embodiment, the aforementioned group of light rays directed at a certain point of the display pixel are emitted from a wider range than in the case in which there is no anisotropic scattering sheet 64. This configuration can reduce the likelihood that a portion in which a dot 83 is not formed will correspond to the certain point of the display pixel. Specifically, a reduction in image quality due to the lenticular lens as the image allocation part, the backlight unit, and other structural elements of the planar light source can be prevented.

The effect of the present embodiment will next be described. In the present embodiment described above, an anisotropic scattering sheet is provided between the lenticular lens and the backlight unit, and the direction of maximum scattering by the anisotropic scattering sheet is set to the image allocation direction of the lenticular lens. The anisotropic scattering sheet is also disposed between the display panel and the backlight unit. According to this configuration, a reduction in display quality due to the concavo-convex structures of the backlight unit and the lenticular lens can be prevented without compromising the image allocation effects of the lenticular lens. When an isotropic scattering sheet is used instead of an anisotropic scattering sheet as the scattering sheet, since the light emitted from the backlight unit 8 is scattered in various directions, the problem of reduced frontal luminance occurs. However, since the scattering directions can be limited through the use of an anisotropic scattering sheet according to the present embodiment, a reduction in frontal luminance can be prevented.

In the present embodiment, the surface on which the anisotropic scattering structure of the anisotropic scattering sheet was formed was disposed towards the backlight unit 8, but the present invention is not limited by this configuration, and the surface on which the anisotropic scattering structure is formed may be disposed towards the display panel 21. However, since the anisotropic scattering structure has an effect when the anisotropic scattering structure is disposed in the vicinity of the focal point of the lenticular lens 3, the anisotropic scattering structure is preferably distanced from the focal point. Specifically, a reduction in image quality can be further reduced by disposing the surface on which the anisotropic scattering structure is formed so as to face the backlight unit 8.

An example of a light-guide panel 82 in which a pattern of dots 83 was formed on the surface was described in the present embodiment, but the present invention is not limited by this configuration, and the present invention can be applied in the same manner in a case in which an optical element having minute structures is used as described above. The dot pattern was formed on the surface of the light-guide panel 82 that faces the lenticular lens 3 in the example described above, but the present invention can be applied in the same manner in a case in which minute structures are formed on the opposite surface, i.e., the −Z surface of the light-guide panel. Specifically, the present invention can be applied insofar as minute structures are formed, and the structures cause the emitted light to have a microscopic in-plane distribution. Specific examples of such a configuration may include a system for providing minute grooves in the light-guide panel to redirect light to the outside, a hologram system for providing minute structures to control the directivity of emitted light, and other systems. The optical element having minute structures is not limited to a light-guide panel, and an optical sheet for controlling the light emitted from the light-guide panel may also be applied in the same manner. Examples of such an optical sheet include an upward prism sheet in which numerous prisms are formed on the +Z surface, and refraction by the prism structures is used to increase the directivity of emitted light; and a downward prism sheet in which numerous prisms are formed on the −Z side, and total reflection and refraction by the prism structures are used to increase the directivity of emitted light. In the present embodiment, the range of options for selecting these prism sheets can be increased, and cost can be reduced. The present invention may also be applied in the same manner in a system in which a light-guide panel and an optical sheet are adhered via numerous minute dots, and the adhesive dot structure is used to redirect light from the light-guide panel.

In the present embodiment, the direction of maximum scattering by the anisotropic scattering sheet was disposed parallel to the image allocation direction of the lenticular lens as the image allocation part, but the present invention is not limited by this configuration, and the direction of maximum scattering by the anisotropic scattering sheet may be placed at a prescribed angle.

Furthermore, an anisotropic scattering sheet was used as the anisotropic scattering part in the present embodiment, but the present invention is not limited by this configuration, and the anisotropic scattering part of another embodiment of the present invention may also be suitably used. Effects of the present embodiment other than those described above are the same as in Embodiment 1.

A transmissive liquid crystal display panel was also used as the display panel in the present embodiment, but the present invention is not limited by this configuration, and may be effectively applied to a display panel that uses a backlight. For example, the present invention can be applied in the same manner when a transmissive display panel other than a liquid crystal display panel is used.

Moreover, the invention can be used in the same manner not only in cases where a lenticular lens is used, but also in cases where a parallax barrier is used.

Limitations are present in regard to the uniformity of emitted light within the surface as well as other optical characteristics in the light-guiding panel, optical sheet, or other optical member that is a structural element of the backlight used as illuminating means. Limitations are therefore also present in regard to the pitch and other structural aspects. Accordingly, even if a compact arrangement is preferred when image allocation means is also used, complications are encountered in making such a compact arrangement. Conversely, the anisotropic scattering structures can be arranged in a compact configuration independently of the backlight structure, allowing placement in the vicinity of the image allocation means and enabling excellent image quality to be obtained.

Figure 23:
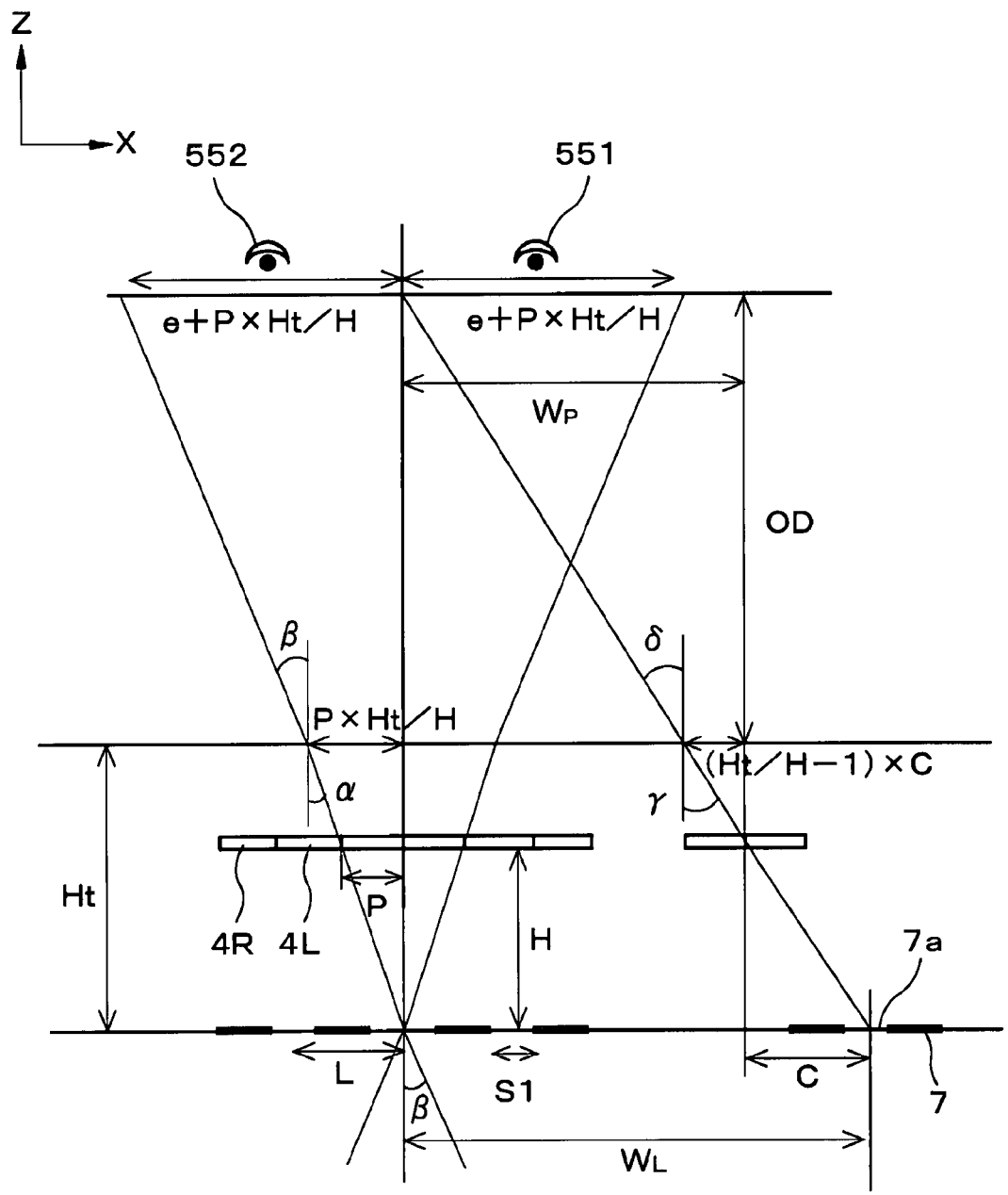
FIG. 23 is a sectional view showing an optical model for an instance where the parallax barrier is arranged on a rear side of the display panel.

A detailed description shall now be provided of a particular case in which a parallax barrier is used as the image allocation means, and the parallax barrier is disposed on the light source side of the display panel. First, a description shall be provided of a case in which a parallax barrier is disposed on the rear side of the display panel, as shown in FIG. 23. As shown in the drawing, L refers to the pitch in which slits 7a of a parallax barrier 7 are arranged, and H refers to the distance between the parallax barrier 7 and the pixels. Ht refers to the thickness of the display panel, including the parallax barrier 7, and the optimal observation distance OD refers to the distance between the display panel and the observer. WL refers to the distance from the center of the slit 7a positioned in the center of the parallax barrier 7, to the center of the slit 7a positioned at an end of the parallax barrier 7 in the X-axis direction. The parallax barrier 7 is a light-blocking plate, and therefore prevents light from entering anywhere besides the slits 7a. However, the parallax barrier 7 is provided with a substrate for supporting the barrier layer, and the refractive index of the substrate is defined as n. Should the supporting substrate not be present, the refractive index n may be set to 1, which is the refractive index of ambient air. To provide a definition in such circumstances, when the light emitted via the slits 7a and passing through the pixels is emitted from the display panel, refraction occurs according to Snell's law. Therefore, attention is focused on the light emitted from the slits 7a positioned in the center of the parallax barrier 7, and α and β refer, respectively, to the angles of incidence and excidence on the end surface of the display panel on the side of the observer. Similarly, γ and δ refer, respectively, to the angles of incidence and excidence with regard to light in the slits 7a positioned on the edge of the parallax barrier 7 in the X-axis direction. S1 refers to the width of the opening of the slit 7a. The pitch L at which the slits 7a are arranged and the pitch P at which the pixels are arranged are interrelated, so that each of the pitch values is determined in association with the other. However, in general, parallax barriers are often designed in combination with the display panel, for which reason the pixel arrangement pitch P is treated as a constant. By selecting the material to be used for the substrate for supporting the barrier layer, the refractive index n is determined. Conversely, the observational distance OD between the parallax barrier and the observer and the period e of the pixel enlarged projected image at the observational distance OD are set using desired values. These values are used to determine the distance H between the barrier and the pixels and the lens pitch L. Formulae 30 through 35 below are established using Snell's Law and geometric relationships. Formulae 36 through 38 below are also established.

$$n \times \sin \alpha = \sin \beta \quad \text{[Formula 30]}$$

$$OD \times \tan \beta = e + P \times Ht/H \quad \text{[Formula 31]}$$

$$H \times \tan \alpha = P \quad \text{[Formula 32]}$$

$$n \times \sin \gamma = \sin \delta \quad \text{[Formula 33]}$$

$$H \times \tan \gamma = C \times Ht/H \quad \text{[Formula 34]}$$

$$OD \times \tan \delta = WP - (Ht/H - 1) \times C \quad \text{[Formula 35]}$$

$$WP - WL = C \quad \text{[Formula 36]}$$

$$WP = 2 \times m \times P \quad \text{[Formula 37]}$$

$$WL = m \times L \quad \text{[Formula 38]}$$

A description has been provided above of a two-viewpoint three-dimensional image display device having left eye pixels and right eye pixels; however, this arrangement is not provided by way of limitation in the present invention. For example, the invention may be similarly used for a display device whose format involves N viewpoints. In such cases, the number of pixels contained in the regions relating to the distance WP may be changed from 2m to N×m in the definition of the distance WP indicated hereinabove.

The range of slit widths at which image separation occurs in rear-type parallax barriers is also one-half of the slit pitch L, as with front-type formats.

Figure 24:
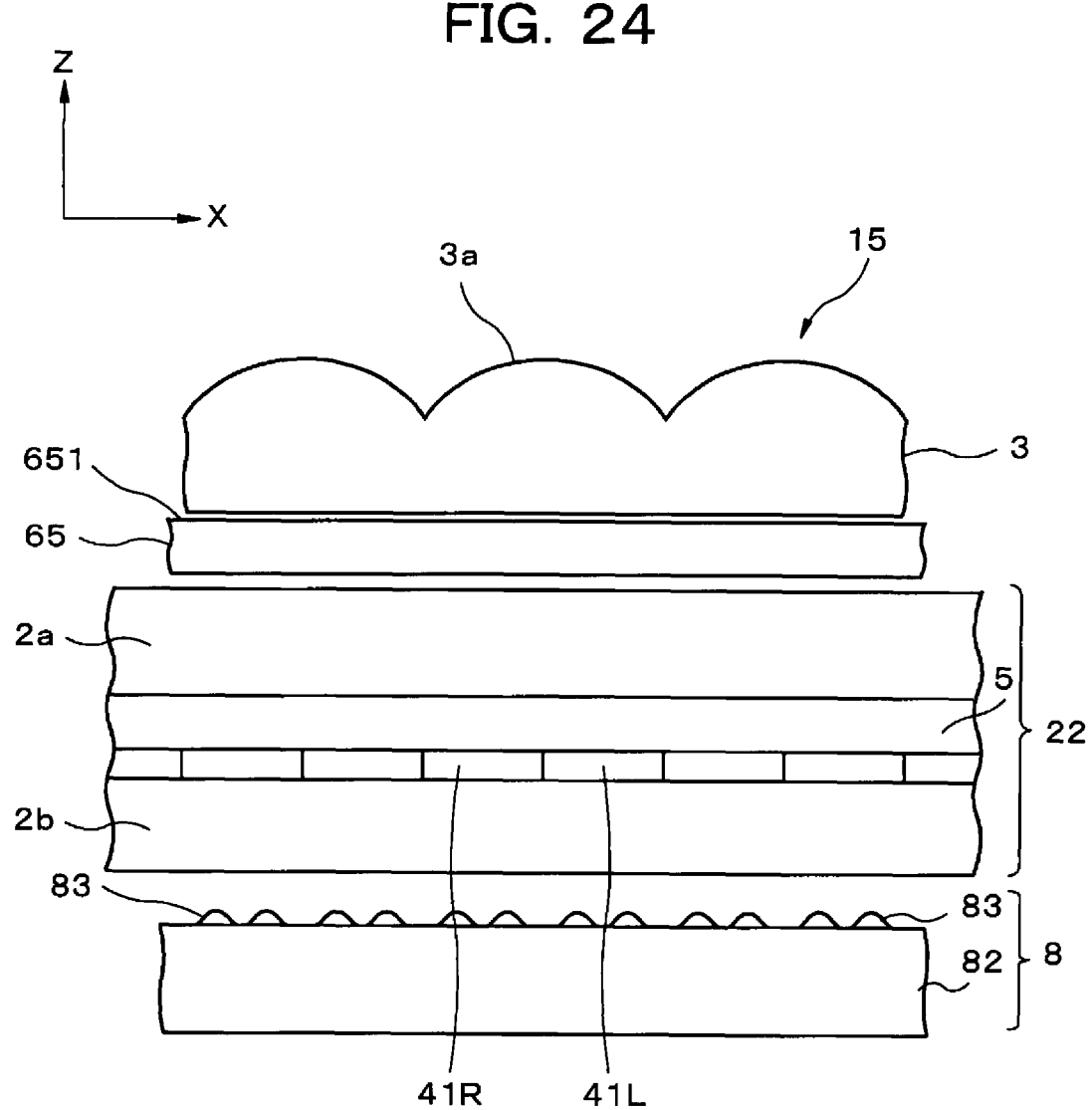
FIG. 24 is a sectional view showing the display device according to Embodiment 6 of the present invention.

Embodiment 6 of the present invention will next be described. FIG. 24 is a sectional view showing the display device according to the present embodiment. In Embodiment 5 of the present invention, the anisotropic scattering sheet as the anisotropic scattering part was disposed between the transmissive liquid crystal display panel and the backlight unit, the direction of maximum scattering by the anisotropic scattering sheet was disposed parallel to the image allocation direction of the lenticular lens as the image allocation part, and the anisotropic scattering structure of the anisotropic scattering sheet was formed on the side of the anisotropic scattering sheet facing the backlight unit. Embodiment 6 differs from Embodiment 5 in that a semi-transmissive liquid crystal display panel having a display region for transmission and a display region for reflection in each pixel is used as the display panel, the anisotropic scattering sheet is disposed between the lenticular lens and the semi-transmissive liquid crystal display panel, and the direction of maximum scattering by the anisotropic scattering sheet is the direction orthogonal to the image allocation direction of the lenticular lens. The anisotropic scattering structure of the anisotropic scattering sheet is also formed on the surface of the anisotropic scattering sheet facing the lenticular lens.

Specifically, as shown in FIG. 24, the lenticular lens 3, an anisotropic scattering sheet 65, a semi-transmissive liquid crystal display panel 22, and the backlight unit 8 are provided in sequence in the direction away from the user in the semi-transmissive image display device 15 of the present embodiment. Furthermore, the direction of maximum scattering by the anisotropic scattering sheet 65 is set to the Y-axis direction, which is orthogonal to the X-axis direction as the image allocation direction of the lenticular lens. The anisotropic scattering structure 651 of the anisotropic scattering sheet 65 is also formed on the +Z surface of the anisotropic scattering sheet 65. Aspects of the present embodiment other than those described above are the same as in Embodiment 5.

In the present embodiment, a reduction in display quality due to the lenticular lens and the concavo-convex structures of the backlight unit can be prevented without significantly compromising the image allocation effect of the lenticular lens, and since the scattering direction can be limited through the use of the anisotropic scattering sheet, a reduction in frontal luminance can be prevented, in the same manner as in Embodiment 5. In contrast with Embodiment 5, the anisotropic scattering part is disposed between the lenticular lens and the semi-transmissive liquid crystal display panel, whereby a reduction in display quality due to the lenticular lens and the concavo-convex structures of the reflecting panel during reflective display can be prevented. Specifically, it is possible to simultaneously prevent a reduction in display quality due to the concavo-convex structures of the backlight unit, and a reduction in display quality due to the concavo-convex structures of the reflecting panel.

The surface on which the anisotropic scattering structure of the anisotropic scattering sheet was formed was described as being disposed towards the lenticular lens in the present embodiment. However, since the anisotropic scattering structure can be distanced from the focal point of the lenticular lens in comparison to a case in which this surface is disposed toward the display panel, a reduction in image quality can be further reduced. Effects of the present embodiment other than those described above are the same as in Embodiment 5.

Figure 25:
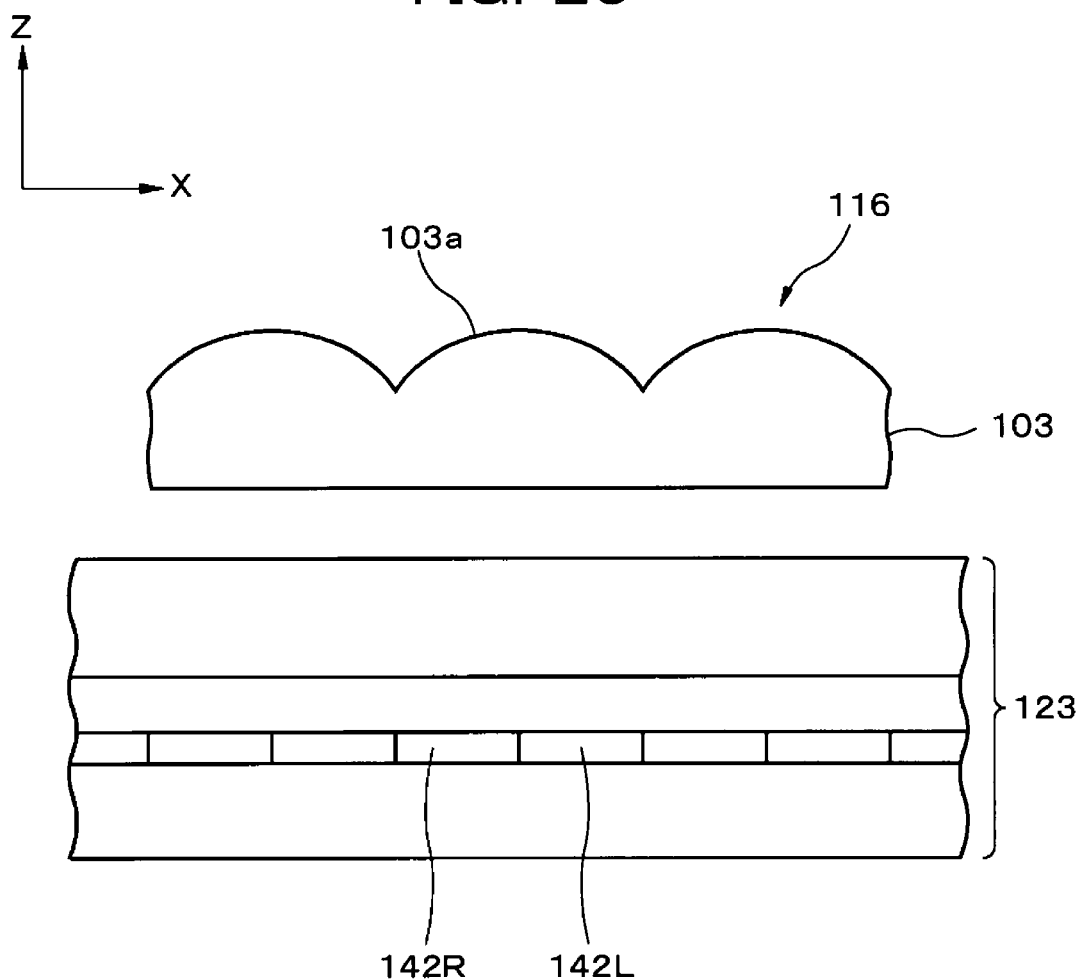
FIG. 25 is a sectional view showing the display device according to Comparative Example 1 of the present invention.
Figure 26:
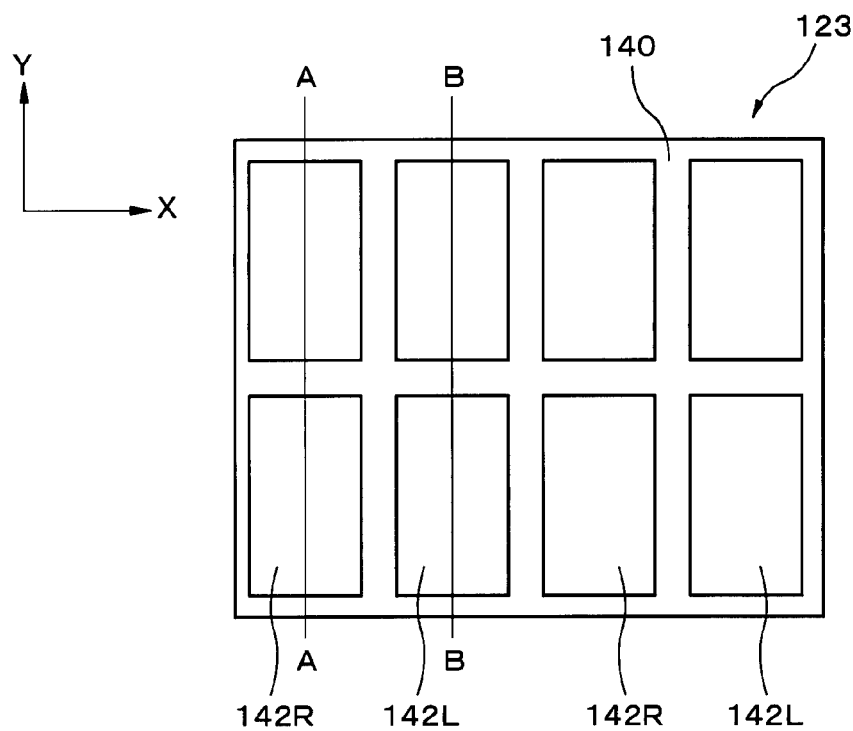
FIG. 26 is a top view showing pixels in the display panel according to Comparative Example 1.
Figure 27:
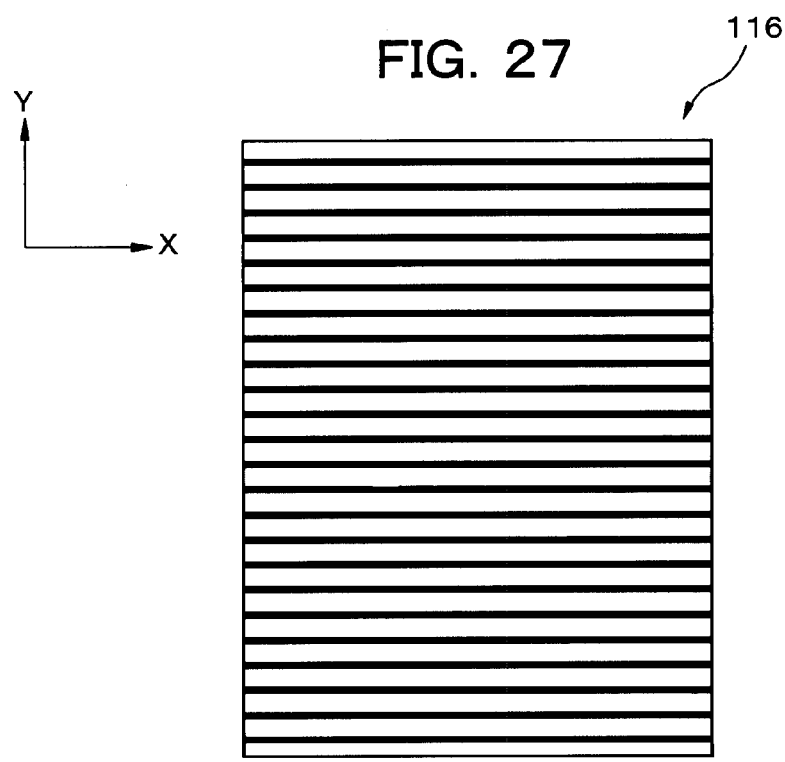
FIG. 27 is a diagram showing the visible image of the display screen when the display device according to Comparative Example 1 is viewed by an observer.

Before additional embodiments are described, a problem newly discovered by the inventors that is common to Embodiments 7 through 10 of the present invention will first be described. This problem is specifically that the pattern of boundary regions between adjacent pixels or other regions that do not contribute to the display in a display device provided with a lenticular lens or other image allocation part is observed as parallel lines in the arrangement direction of the lenses or slits, and image quality is reduced. The inventors performed concentrated investigations aimed at improving the image quality of a display device provided with an image allocation part. As a result, the inventors discovered that a striped pattern extending in the image allocation direction over the display image is more noticeable than in a conventional display device that does not have an image allocation part, and obtained the findings described below. These findings will therefore be described using the diagrams. FIG. 25 is a sectional view showing the display device according to Comparative Example 1 of the present invention; FIG. 26 is a top view showing pixels in the display panel shown in FIG. 25; and FIG. 27 is a diagram showing the visible image of the display screen when the display device shown in FIG. 25 is viewed by an observer.

As shown in FIG. 25, in the transmissive liquid crystal display device 116 of Comparative Example 1, a lenticular lens 103 and a transmissive liquid crystal display panel 123 are provided in sequence from the direction of the user. In the transmissive liquid crystal display panel 123, the display pixels of the display panel are composed of adjacent left-eye pixels 142L and right-eye pixels 142R, the same as the transmissive liquid crystal display panel 21 in Embodiment 5 of the present invention. The lenticular lens 103 is arranged so that a single cylindrical lens 103a corresponds to a row of display pixels, in the same manner as Embodiment 5.

As shown in FIG. 26, the left-eye pixels 142L and the right-eye pixels 142R in the transmissive liquid crystal display panel 123 of Comparative Example 1 have a light-blocking region 140 on the periphery of the pixel regions that transmit light. The light-blocking region 140 is formed for the purposes of eliminating the effects of adjacent pixels and protecting the regions in which wiring is provided. In Comparative Example 1, since the display pixels are arranged in the X-axis direction and the Y-axis direction, the light-blocking region 140 has a shape in which numerous lines extending in the X-axis direction are combined with numerous lines extending in the Y-axis direction. Such a shape for the light-blocking region is often found in common liquid crystal display panels.

When a lenticular lens as an image allocation part is provided to a display panel whose light-blocking region is thus shaped, an observer in the frontal direction sees A-A lines and B-B lines in the left-eye pixels 142L and the right-eye pixels 142R, respectively. As a result, the observer is unable to see the lines extending in the Y-axis direction, and sees only the lines extending in the X-axis direction as regions in which the light is blocked, a shown in FIG. 27. Specifically, only the light-blocking regions extending in the image allocation direction are visible, and the light-blocking regions in the direction orthogonal to the image allocation direction are not visible. A lattice pattern in the longitudinal and transverse directions is visible to the user when a lenticular lens is provided, but providing the lenticular lens makes only the light-blocking regions in the image allocation direction visible to the observer, and a striped pattern extending in the image allocation direction is observed. In the case of Comparative Example 1, for example, since the image allocation direction corresponds to the left-right direction, a striped pattern in the transverse direction is observed in superposition on the display image. The quality of the display image is reduced by the striped pattern.

The inventors further investigated the striped pattern and learned that the problem is more significant when the display panel has low resolution. The reason for this is considered to be that the width of the stripes and the size of the spaces between the stripes increases as the resolution decreases, and the stripes are easily visible to the user. The inventors discovered that the problem is particularly significant when the vertical and horizontal resolutions of the display image are the same in the case of a three-dimensional image display device. The reason for this is considered to be that although the difference in the vertical and horizontal resolutions is visible to the observer as a superimposed striped pattern in the horizontal direction when the vertical and horizontal resolutions are different, the difference in the vertical and horizontal resolutions is a more significant problem than the horizontally directed striped pattern, and the problem of the striped pattern is therefore relatively insignificant. The inventors also discovered that the problem is more significant when a lenticular lens is used than when a parallax barrier is used as the image allocation part. The reason for this is considered to be that since a striped pattern that extends in the direction orthogonal to the image allocation direction is formed by the slits and the regions other than the slits when a parallax barrier is used, the striped pattern is a more significant problem. In general, the pattern that occurs in the case of a parallax barrier does not occur when a lenticular lens is used, and a striped pattern in the direction parallel to the image allocation direction is a problem.

Figure 28:
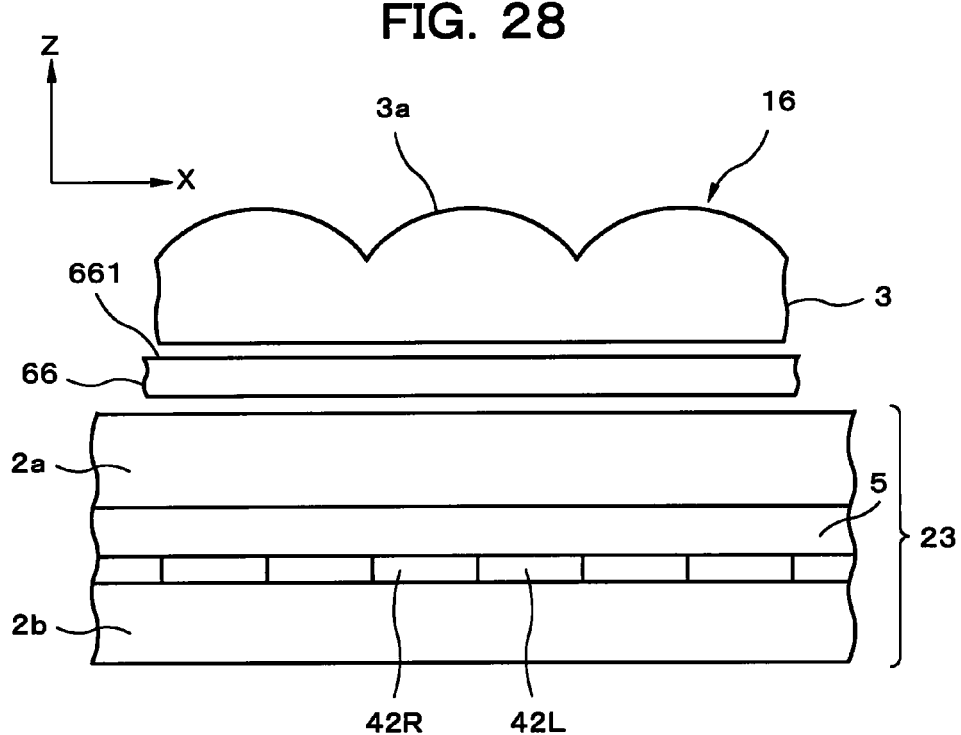
FIG. 28 is a sectional view showing the display device according to Embodiment 7 of the present invention.

Embodiment 7 of the present invention is capable of overcoming the problems described above. FIG. 28 is a sectional view showing the display device according to the present embodiment, and FIG. 29 is a top view showing pixels of the display panel shown in FIG. 28.

As shown in FIG. 28, the lenticular lens 3, an anisotropic scattering sheet 66, and a transmissive liquid crystal display panel 23 are provided in sequence from the direction of the user in the transmissive liquid crystal display device 16 of Embodiment 7. The transmissive liquid crystal display panel 23 is the same as the transmissive liquid crystal display panel 123 shown in FIGS. 25 and 26. Specifically, the display pixels of the display panel are composed of adjacent left-eye pixels 42L and right-eye pixels 42R. The lenticular lens 3 is arranged so that a single cylindrical lens 3a corresponds to a row of display pixels, in the same manner as Embodiment 5. The anisotropic scattering sheet 66 in the present embodiment is disposed in the same manner as in Embodiment 1 of the present invention, so that the direction of maximum scattering is the direction orthogonal to the image allocation direction of the lenticular lens 3, and the direction of minimum scattering is parallel to the image allocation direction. The anisotropic scattering structure 661 of the anisotropic scattering sheet 66 is formed on the +Z side of the anisotropic scattering sheet 66, i.e., the side facing the lenticular lens.

Figure 29:
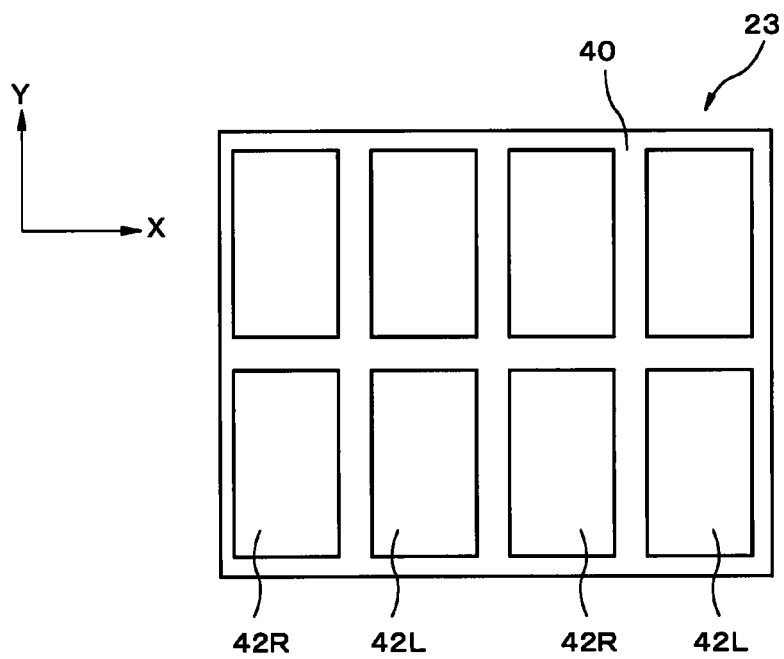
FIG. 29 is a top view showing pixels of the transmissive liquid crystal display panel according to the present embodiment.

As shown in FIG. 29, the left-eye pixels 42L and the right-eye pixels 42R in the transmissive liquid crystal display panel 23 of Embodiment 7 have a light-blocking region 40 on the periphery of the pixel regions that transmit light. In the same manner as in Comparative Example 1 of the present invention, since the display pixels are arranged in the X-axis direction and the Y-axis direction, the light-blocking region 40 has a shape in which numerous lines extending in the X-axis direction are combined with numerous lines extending in the Y-axis direction. Aspects of the present embodiment other than those described above are the same as in Embodiment 1.

The operation and effects of the transmissive liquid crystal display device according to the present embodiment configured as described above will next be described. In the aforementioned transmissive liquid crystal display device provided with a lenticular lens, the light-blocking region extending in the direction parallel to the image allocation direction of the lenticular lens was visible as a striped pattern. However, since an anisotropic scattering sheet having significant scattering in the direction perpendicular to the image allocation direction of the lenticular lens is provided in the present embodiment, the striped pattern in the direction parallel to the image allocation direction is reduced by the anisotropic scattering sheet. Since the direction of minimum scattering by the anisotropic scattering sheet is disposed parallel to the image allocation direction, adverse effects on the image allocation effect can be kept to a minimum.

In the present embodiment, the effects can be more significantly demonstrated for a display panel in which the width of the light-blocking region extending in the image allocation direction of the image allocation part is large with respect to the applied pixel pitch. An example of such a display panel is a horizontal stripe display panel in which red, green, and blue color filters extend in the direction parallel to the image allocation direction to create a color display. This is because in such horizontal stripe display panels, wherein the direction in which the stripes are arranged runs orthogonal to the image allocation direction, the boundaries of the different colors are disposed in a direction that is orthogonal to the image allocation direction, resulting in a greater proportion of the light-blocking region extending in the image allocation direction. The present invention can be suitably used and the effect of the light-blocking region extending in the image allocation direction can be reduced, allowing excellent image quality to be obtained. It is apparent that a display panel having a larger pixel pitch enables more effective application. The reason for this is that in a display panel that has a large pixel pitch, the striped pattern has a larger pitch, and is easily visible to the user.

In a display device having a lenticular lens, a parallax barrier, and other image allocation parts, the present embodiment is particularly suitable for application to a case in which the vertical and horizontal resolutions of the left-eye image, the right-eye image, and other display images are the same, and significant effects can be demonstrated. This is because in cases where the horizontal and vertical resolution differs, the striped pattern becomes obscured by the difference between the resolutions, and becomes relatively hard to notice. Specifically, the striped pattern in the direction parallel to the image allocation direction is made relatively noticeable by the matching of the vertical and horizontal resolutions of the display image, and the striped pattern can be effectively reduced by the present invention. Furthermore, the effects can be demonstrated more significantly when a lenticular lens is used than when a parallax barrier is used as the image allocation part. The reason for this is that a high-quality display that is free of a barrier pattern can be created when a lenticular lens is used, and the striped pattern in the direction parallel to the image allocation direction is therefore noticeable, and the striped pattern can be effectively reduced. Effects of the present embodiment other than those described above are the same as in Embodiment 1 or Embodiment 5.

A detailed description shall now be provided in regard to the visibility of the striped pattern; i.e., the light-blocking region extending in a direction parallel to the image allocation direction of the lenticular lens. The visibility depends on the eyesight of the person as well as the observation distance. Three-dimensional displays have a three-dimensional viewing region; therefore, the observation distance presumes use within that viewing region. A description will accordingly be provided of the three-dimensional viewing region first.

Figure 30:
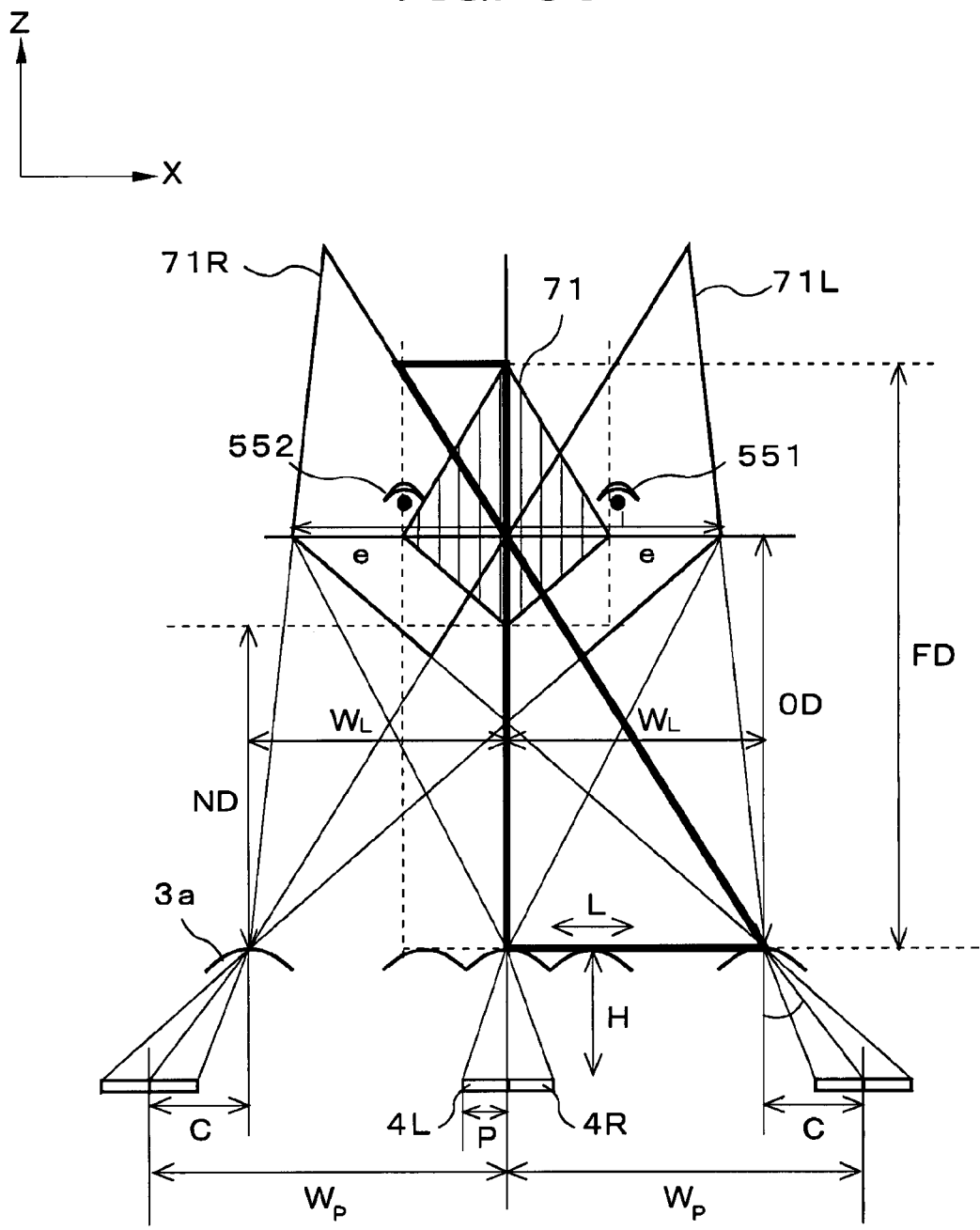
FIG. 30 is a sectional view showing an optical model used to compute the maximum observation distance.

FIG. 30 is a sectional view showing an optical model used to calculate the maximum observation distance in a display device having a lenticular lens system. Light emitted from the desired left eye pixels of the display panel is polarized towards a prescribed region by the lenticular lens. This region is referred to as left eye region 71L. Similarly, light emitted from the right eye pixels is polarized towards a right eye region 71R. The viewer places their left eye 551 on the left eye region 71L, and their right eye on the right eye region 71R, whereupon different images can be directed at their left and right eyes. If these images are parallax images, the viewer will be able to view a three-dimensional image.

However, the viewer cannot place their eyes in every position in the left eye region 71L and right eye region 71R. This is because limitations are imposed by the interpupillary distance. According to the literature, the human interpupillary distance is typically a fixed value. For example, the average interpupillary distance of an adult male is 65 mm, with the standard deviation being ±3.7 mm. The average interpupillary distance of an adult female is 62 mm, with the standard deviation being ±3.6 mm (Neil A. Dodgson, "Variation and Extrema of Human Interpupillary Distance", *Proc. SPIE* vol. 5291). Accordingly, when a three-dimensional display device is being designed, the value used for the interpupillary distance is suitably set within a range of 62 to 65 mm, with a value of approximately 63 mm being adopted. The three-dimensional viewing region must be calculated with this interpupillary distance limitation applied to the size of the left and right eye regions.

A description shall next be provided of the width of the left and right eye region. As has been described in the foregoing, e refers to the period of the enlarged image projected from the pixels over the optimal observation distance OD; however, this value is preferably set to be equivalent to the interpupillary distance. If the period e is smaller than the interpupillary distance, then the width of the three-dimensional viewing region will be limited by the period e, and will be reduced. If the period e is larger than interpupillary distance, then the width of the three-dimensional viewing region will not be limited by the period e, but will be limited by the interpupillary distance. Viewing using the side lobe generated in the slant direction will also be made more difficult. Accordingly, even if the period e is increased, the width of the three-dimensional region will not increase. For the reasons stated above, the period e is made equal to the interpupillary distance.

The maximum observation distance in the three-dimensional viewing region is therefore the intersection between the trajectory of the light emitted from the display units positioned on the end of the display panel in the X-axis direction and the central line of the left or right eye region in the X-axis direction. Accordingly, attention is directed to the light beams emitted from the center of the display units positioned on the end of the display panel in the X-axis direction. An analogous relationship is therefore established between a triangular form whose bottom is WL and whose height is the optimal observation distance OD, and a triangular form whose bottom is e/2 and whose height is FD−OD. Formula 39 is established as a result, and re-arranging the formula enables the maximum observation distance FD to be obtained, as shown in Formula 40.

$$WL:OD=e/2:FD-OD \quad \text{[Formula 39]}$$

$$FD=OD\times(WL+e/2)/WL \quad \text{[Formula 40]}$$

Figure 31:
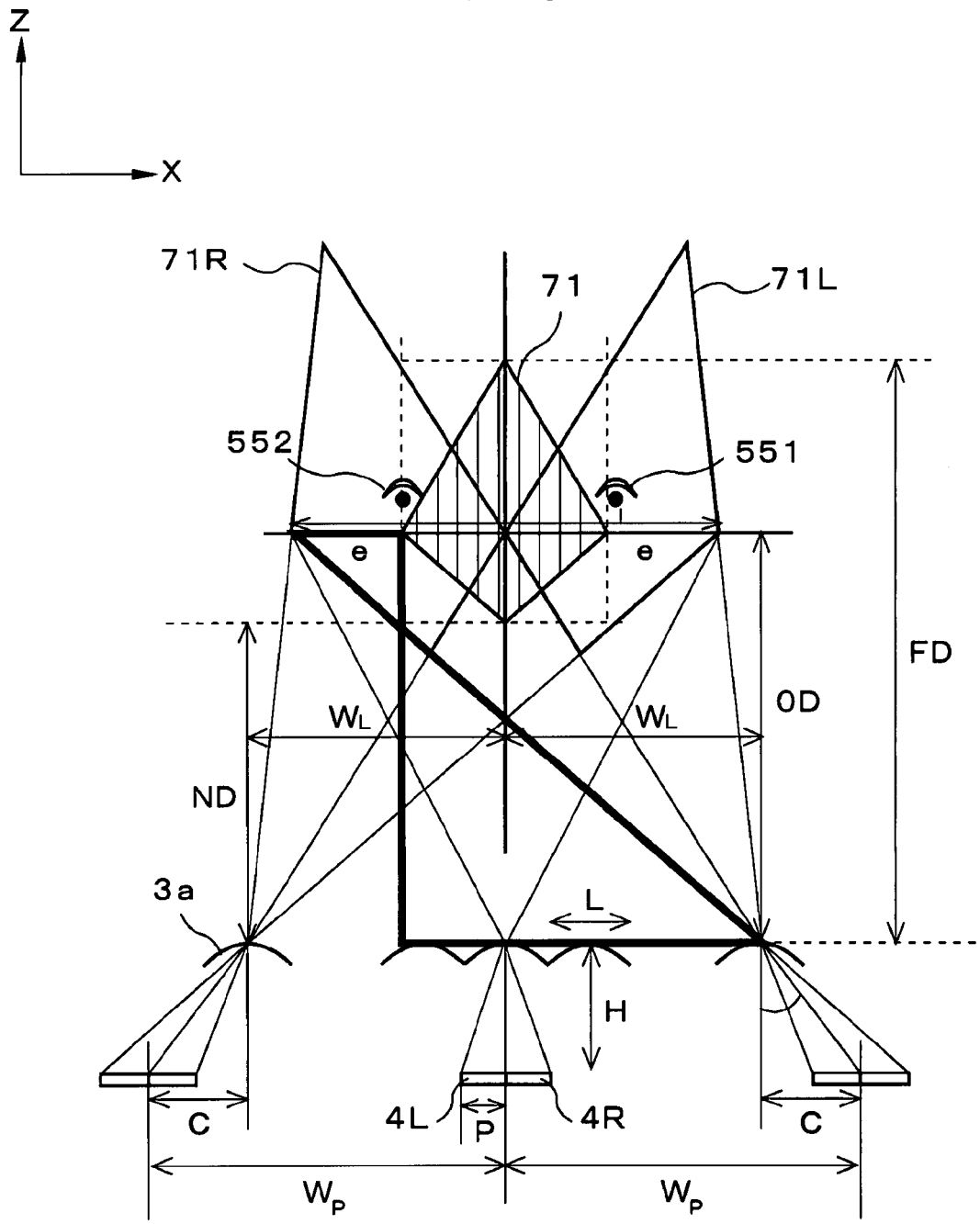
FIG. 31 is a sectional view showing an optical model used to compute the minimum observation distance.

The minimum observation distance shall next be calculated. FIG. 31 is a sectional view showing an optical model used to compute the minimum observation distance in a display device having a lenticular lens system. The minimum observation distance in the three-dimensional viewing region is the intersection between the trajectory of the light emitted from the end of the display panel in the X-axis direction and the central line of the left or right eye region in the X-axis direction. Accordingly, attention is directed to the light beams emitted from the end (on the right of the drawing) of the display units positioned on the end of the display panel in the X-axis direction. An analogous relationship is therefore established between a triangular form whose bottom is WL+e/2 and whose height is the minimum observation distance ND, and a triangular form whose bottom is e/2 and whose height is OD−ND. Formula 41 is established as a result, and re-arranging the formula enables the minimum observation distance ND to be obtained, as shown in Formula 42.

$$e/2:OD-ND=WL+e/2:ND \quad \text{[Formula 41]}$$

$$ND=OD\times(WL+e/2)/(WL+e) \quad \text{[Formula 42]}$$

A three-dimensional visual region 71 is calculated using the above formulae. This region takes the form of a diamond-shaped quadrangle, as shown in FIGS. 30 and 31. The width of the region in the X-axis direction is one half of the period e of the pixel enlarged projected image. The width in the Y-axis direction is the difference between the maximum observation distance FD and the minimum observation distance ND.

The viewer will preferably be unaware of the light-blocking region when positioned in the three-dimensional viewing region. For example, when in the three-dimensional viewing region, the viewer must be unable to see [the light-blocking region] from the maximum observation distance FD, which is the end furthest from the display panel, and preferably unable to see [the light-blocking region] from the optimal observation distance OD. In an optimal arrangement, the viewer will be unable to see [the light-blocking region] from the minimum observation distance ND.

Figure 32:
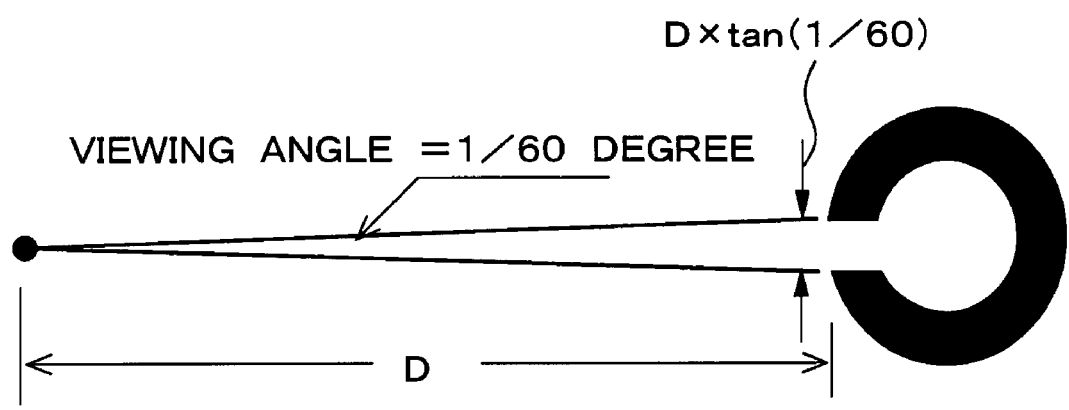
FIG. 32 is a schematic view showing a definition of visual acuity.

A detailed description shall now be provided in regard to the visibility of the light-blocking region; i.e., the relationship between the viewing distance and the width of the light-blocking region. In order for the viewer to be prevented from seeing the light-blocking region, the width of the light-blocking region must be set equal to or less than the resolution determined according to the eyesight of the viewer. As shown in FIG. 32, the relationship between the viewer eyesight and the minimum viewing angle at which identification is possible is determined according to Formula 43.

$$\text{Eyesight}=1/\text{viewing angle (min)} \quad \text{[Formula 43]}$$

The eyesight value is typically 1.0, and the minimum viewing angle of an observer having an eyesight of 1.0 is calculated to be 1 min; i.e., $1/60°$, according to Formula 43. The resolution of the eye of the observer at observation distance D (mm) will thus be $D\times\tan(1/60)$ (mm). Degrees are used as the tan angular unit, and the specific value of $\tan(1/60)$ is 0.00029. Accordingly, if the width of the light-blocking region; i.e., the region that does not contribute to the display, is made smaller than $D\times\tan(1/60)$ (mm), the width of the light-blocking region can be made smaller than the resolution of the eye, and the viewer can be prevented from seeing the light-blocking region.

When the above is taken into consideration, the width of the light-blocking region must be made smaller than $FD\times\tan(1/60)$, and preferably smaller than $OD\times\tan(1/60)$. If the width of the light-blocking region is made smaller than $ND\times\tan(1/60)$, then the viewer can be prevented from seeing the light-blocking region in the entirety of the three-dimensional viewing region.

According to the present embodiment in particular, even in the case that the above limitations are relaxed and the width of the light-blocking region is enlarged, the ability of the viewer to see the light-blocking region will be reduced, and the quality of the display can be improved. Specifically, the present invention can be effectively used in the case that the width of the light-blocking region, which extends in a direction parallel to the image allocation direction of the image allocation means, is $ND\times\tan(1/60)$.

The above description pertains to a case involving the use of a lens that maximizes the ability for the left and right pixel images to be separated; however, the same description can be used in cases involving the use of a pinhole-shaped barrier that maximizes the image-separating performance. When a lens is used, the three-dimensional viewing region will be made smaller than described above when defocusing is set; i.e., when the lens focal plane is offset from the pixel plane. The same will result when the barrier openings are made larger. However, when the three-dimensional viewing region is reduced, the optimal observation distance OD will remain unchanged, the maximum observation distance FD will decrease to approximately the optimal observation distance OD, and the minimum observation distance ND will increase to approximately the optimal observation distance OD. Consequently, the conditions used above when the calculations were performed to maximize the separation performance can also be used in cases where the separation performance is to be lowered.

The configuration of the present embodiment makes it possible to reduce the effect of the light-blocking region extending in a direction orthogonal to the image allocation direction of the image allocation means. In a three-dimensional display device, the non-display region extending in the vertical direction; i.e., the Y-axis direction, is enlarged and projected on the observation surface by the lens or other image allocation means. In the present embodiment, light is scattered in the X-axis direction (image allocation direction) to such an extent that the separation performance is not dramatically compromised, whereby the effect can be minimized.

Figure 33:
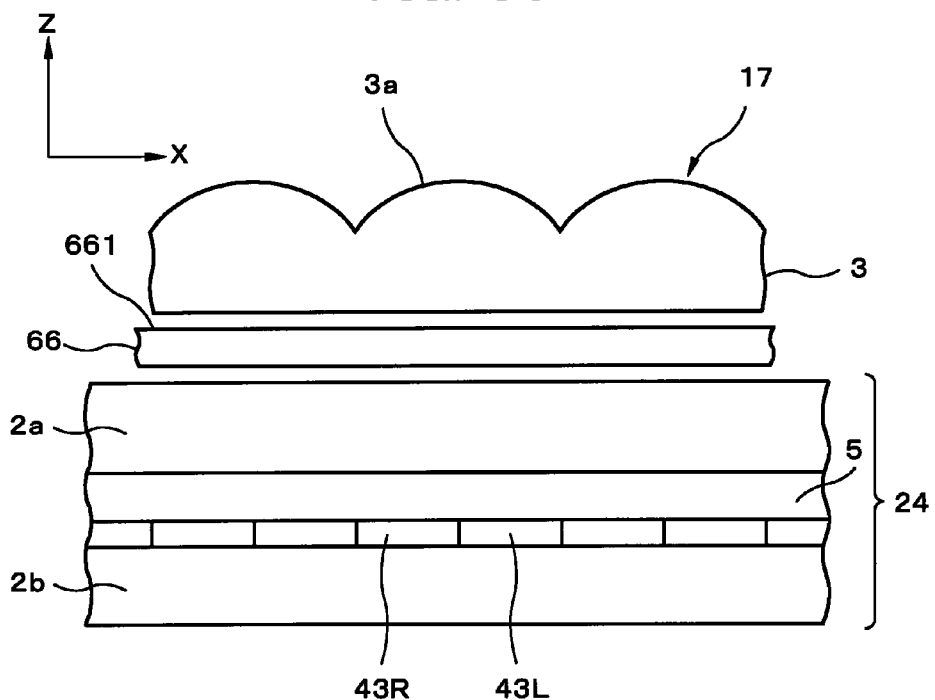
FIG. 33 is a sectional view showing the display device according to Embodiment 8 of the present invention.
Figure 34:
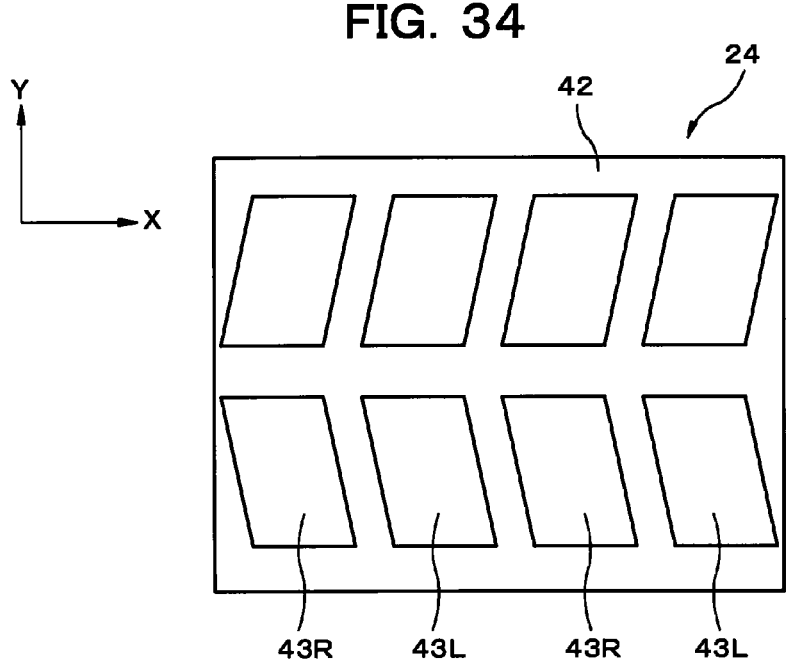
FIG. 34 is a top view showing pixels of the transmissive liquid crystal display panel according to the present embodiment.

Embodiment 8 of the present invention will next be described. FIG. 33 is a sectional view showing the display device according to the present embodiment, and FIG. 34 is a top view showing pixels of the display panel shown in FIG. 33. In Embodiment 7, the light-blocking region of the transmissive liquid crystal display panel had a shape in which numerous lines extending in the X-axis direction were combined with numerous lines extending in the Y-axis direction.

Embodiment 8 differs from Embodiment 7 in that the light-blocking region of the transmissive liquid crystal display panel as a different shape. Specifically, the lines extending in the X-axis direction are linear, but the lines extending in the Y-axis direction are tilted in relation to the Y-axis.

Specifically, as shown in FIG. 33, the transmissive liquid crystal display device 17 in the present embodiment differs from the transmissive liquid crystal display device 16 of Embodiment 7 of the present invention in that the transmissive liquid crystal display panel 24 is used. The lenticular lens 3 and the anisotropic scattering sheet 66 as other constituent elements are the same as in Embodiment 7.

As shown in FIG. 34, the left-eye pixels 43L and the right-eye pixels 43R in the transmissive liquid crystal display panel 24 of Embodiment 8 have a light-blocking region 42 on the periphery of the pixel regions that transmit light. The direction of the lines in which the light-blocking region 42 extends with respect to the X-axis direction as the direction in which the left-eye pixels 43L and the right-eye pixels 43R are adjacent is parallel to the X-axis direction. In contrast, the lines of the light-blocking region 42 extending in the Y-axis direction are an aggregate of lines tilted in relation to the Y-axis direction. As a result, the pixel regions for transmitting light have a substantially parallelogram shape. The light-transmitting regions of pixels that are adjacent to each other in the Y-axis direction have a substantially parallelogram shape that are linearly symmetrical about the X-axis. As a result, among the lines of the light-blocking region 42 extending in the Y-axis direction, the lines that are tilted from the Y-axis direction to the +X direction, and the lines that are tilted from the Y-axis direction to the −X direction form an alternating zigzag pattern that repeats for each pixel in the Y-axis direction. Aspects of the present embodiment other than those described above are the same as in Embodiment 7.

In the present embodiment, the anisotropic scattering effects of the anisotropic scattering sheet enable the striped pattern in the direction parallel to the image allocation direction of the lenticular lens to be reduced, and image quality to be increased without compromising the image allocation effects of the lenticular lens as the image allocation part, in the same manner as in Embodiment 7. Particularly in the present embodiment, since the lines of the light-blocking region extending in the Y-axis direction form a zigzag pattern, the light-blocking region extending in the Y-axis direction is magnified to the user by the image allocation effects of the lenticular lens, and a region of reduced luminance at the boundary between the left-eye image and the right-eye image can be prevented from occurring. In this case, since the image is visible in a wider range than in Embodiment 7 in the X-axis direction as the image allocation direction, a more significant problem occurs when the striped pattern in the X-axis direction cannot be reduced, but since the striped pattern can be reduced using the anisotropic scattering part in the present embodiment, more significant effects than those of Embodiment 7 can be demonstrated.

In the present embodiment, the lines of the light-blocking region extending in the Y-axis direction were described as forming a zigzag pattern that repeats for each pixel with respect to the Y-axis direction, but the present invention is not limited by this configuration. For example, a plurality of zigzags may be formed within a single pixel, or a zigzag pattern may be formed with a period of multiple pixels. The zigzag pattern was described as being formed from lines that are tilted from the Y-axis direction to the +X direction or the −x direction, but this configuration is not limiting, and the pattern may be formed from curved lines. Furthermore, the pixel regions for transmitting light were described as having a substantially parallelogram shape, but this configuration is not limiting. Each pixel may have a substantially trapezoidal shape, for example, and the substantially trapezoidal openings may be arranged with rotational symmetry in adjacent pixels.

Figure 35:
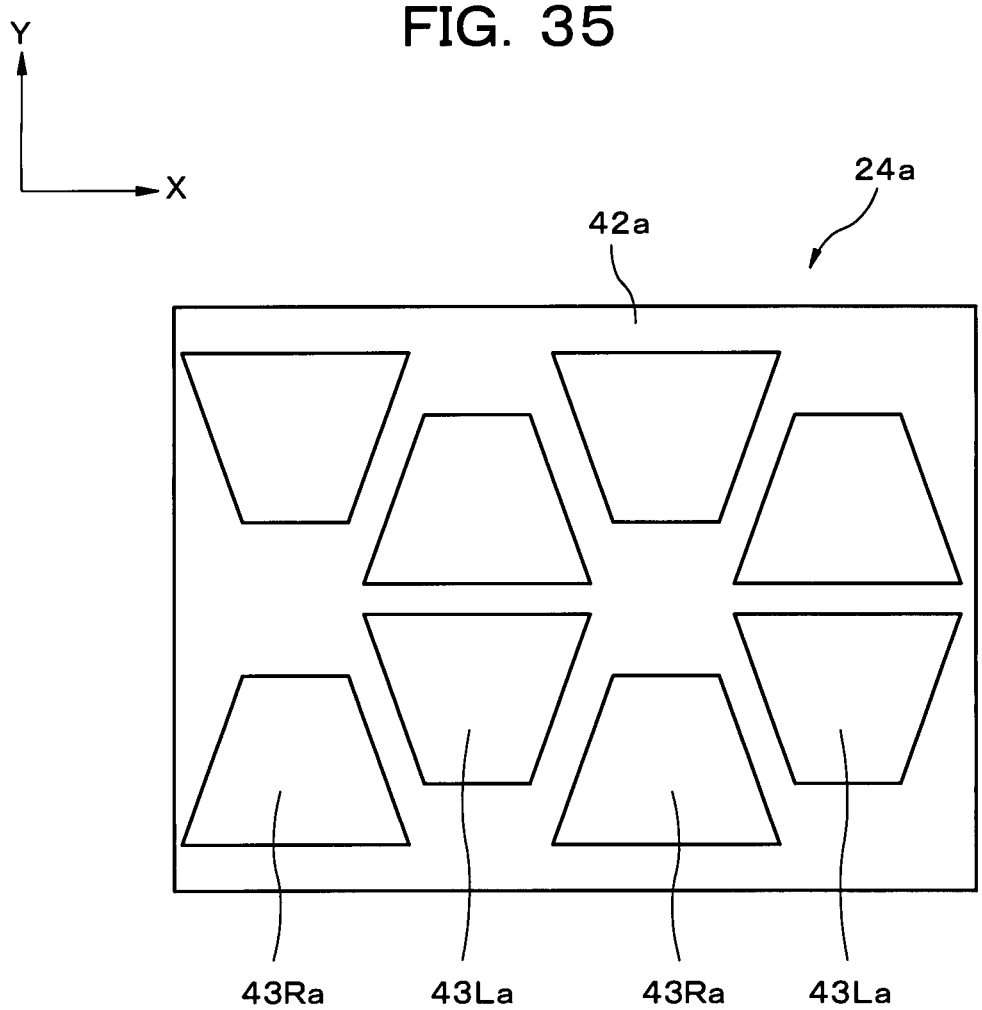
FIG. 35 is a top view showing another example of a pixel of the transmissive liquid crystal display panel according to the present embodiment.

FIG. 35 is a top view showing another example of the pixels of the display panel that can be applied in the present embodiment. As shown in FIG. 35, in the transmissive liquid crystal display panel 24a, left-eye pixels 43La and right-eye pixels 43Ra have a light-blocking region 42a on the periphery of the pixel regions for transmitting light, and the light-transmitting regions surrounded by the light-blocking region 42a have a substantially trapezoidal shape. The left-eye pixels 43La and the right-eye pixels 43Ra are also arranged in a rotationally symmetrical relationship. The light-transmitting regions of adjacent pixels in the Y-axis direction are also arranged in a rotationally symmetrical relationship. As a result, in the case of a single line of the light-blocking region 42a extending in the Y-axis direction, lines that are tilted from the Y-axis direction to the +X direction, and lines that are tilted from the Y-axis direction to the −X direction form a zigzag pattern that repeats for each pixel in the Y-axis direction, and the zigzag pattern is symmetrical about the Y-axis for other lines of the light-blocking region 42a extending in the Y-axis direction that are adjacent in the X-axis direction. In the present example, in addition to the aforementioned effects, this configuration can be suitably applied to an active matrix display panel that uses thin-film transistors in particular, and an increased open area ratio can be obtained. Effects of the present embodiment other than those described above are the same as in Embodiment 1 or Embodiment 5.

Figure 36:
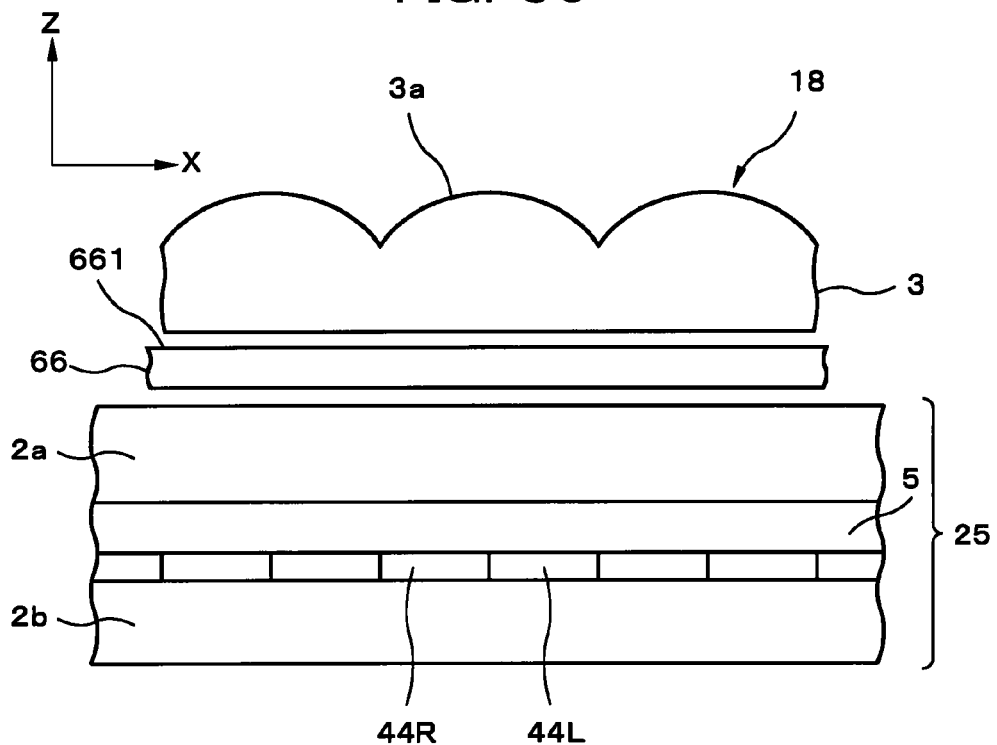
FIG. 36 is a sectional view showing the display device according to Embodiment 9 of the present invention.
Figure 37:
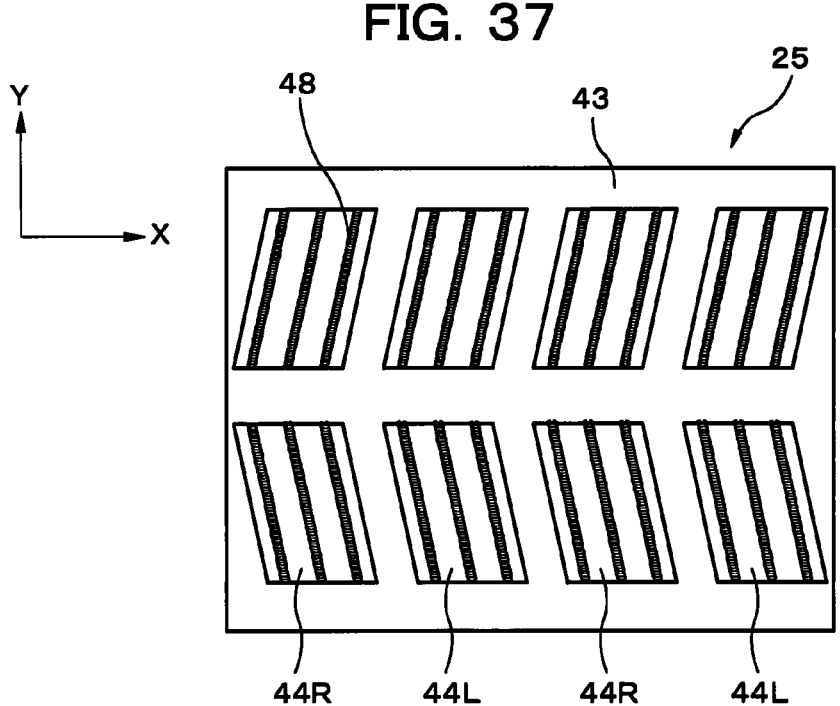
FIG. 37 is a top view showing pixels of the transmissive liquid crystal display panel according to the present embodiment.

Embodiment 9 of the present invention will next be described. FIG. 36 is a sectional view showing the display device according to the present embodiment; and FIG. 37 is a top view showing pixels of the display panel shown in FIG. 36. Embodiment 9 differs from Embodiment 8 in that a horizontal-field-mode transmissive liquid crystal display panel is used.

The transmissive liquid crystal display device 18 of the present embodiment as shown in FIG. 36 differs from the transmissive liquid crystal display device 17 of Embodiment 8 of the present invention in that a horizontal-field-mode transmissive liquid crystal display panel 25 is used. The lenticular lens 3 and the anisotropic scattering sheet 66 as other constituent elements are the same as in Embodiment 8.

As shown in FIG. 37, the transmissive liquid crystal display panel 25 of Embodiment 9 is a horizontal-field-mode liquid crystal display panel, and comb electrodes 48 for generating a horizontal electric field in the XY plane are formed in the left-eye pixels 44L and the right-eye pixels 44R. The left-eye pixels 44L and the right-eye pixels 44R also have a light-blocking region 43 on the periphery of the pixel regions that transmit light. The basic shape of the light-blocking region 43 is the same as in Embodiment 8 shown in FIG. 34. However, the present embodiment differs from Embodiment 8 in that the display panel of the present embodiment is a horizontal-field-mode display panel, and the light-blocking region has a larger width in order to reduce the effects of the horizontal field from adjacent pixels, and to facilitate placement of the comb electrodes 48. Specifically, the direction of the lines in which the light-blocking region 43 extends is parallel to the X-axis direction, which is the direction in which the left-eye pixels 44L and the right-eye pixels 44R are adjacent. In contrast, the lines of the light-blocking region 43 extending in the Y-axis direction are an aggregate of lines tilted in relation to the Y-axis direction. As a result, the pixel regions for transmitting light have a substantially parallelogram shape. The light-transmitting regions of pixels that are adjacent to each other in the Y-axis direction have substantially parallelogram shapes that are linearly symmetrical about the X-axis. As a result, among the lines of the light-blocking region 43 extending in the Y-axis direction, the lines that are tilted from the Y-axis direction to the +X direction, and the lines that are tilted from the Y-axis direction to the −X direction form an alternating zigzag pattern that repeats for each pixel in the Y-axis direction. The comb electrodes 48 are formed parallel to the zigzag pattern of the light-blocking region 43, and have a prescribed angle in the Y-axis direction. Since the width of the light-blocking region 43 formed in the zigzag pattern reduces the effects of the horizontal field of adjacent pixels, this width is greater than in Embodiment 8. The lines of the light-blocking region 43 extending in the X-axis direction are formed with a greater width than in Embodiment 8, and the reason for this is that regions occur at the root portions of the comb electrodes at which a horizontal field cannot be generated due to the wiring of the comb portions of the comb electrodes in a horizontal field mode, and light must be blocked in these regions. Aspects of the present embodiment other than those described above are the same as in Embodiment 8.

In the present embodiment, the anisotropic scattering effects of the anisotropic scattering sheet make it possible to reduce a striped pattern in the direction parallel to the image allocation direction of the lenticular lens and improve image quality without compromising the image allocation effects of the lenticular lens as the image allocation part, in the same manner as in Embodiment 8. The present embodiment is particularly suitable for use in driving of a liquid crystal display panel in an in-plane switching mode, and a striped pattern due to the light-blocking region formed at the root portions of the comb electrodes can be effectively reduced. The horizontal field is weak above the comb electrodes, and inadequate driving of the liquid crystal molecules leads to decreased transmittance, and display quality is reduced by uneven transmittance, but the anisotropic scattering effects of the anisotropic scattering sheet in the present embodiment make it possible to prevent this reduction of display quality without significantly compromising the image allocation effects of the lenticular lens.

The present embodiment can be suitably used in the driving of a liquid crystal display panel in an in-plane switching mode, and wide-viewing-angle display can be achieved that is free of contrast inversion across a wide range of angles. Other examples of such a liquid crystal mode include fringe field switching modes and advance fringe field switching modes as horizontal field modes the same as the in-plane switching mode, and these modes can be applied in the same manner. The comb electrodes may be non-transparent electrodes that are formed from aluminum or another metal material, or may be transparent electrodes that are formed from ITO (Indium Tin Oxide) or the like, but the same effects are obtained in either case.

Furthermore, in the present embodiment, the liquid crystal display panel is not limited to a horizontal field mode, and may be suitably used in a liquid crystal mode in which a distribution of transmittance is generated within a single pixel due to the electrode structure, concavo-convex structure, or other structure of the display pixels. Besides the modes described above, examples of such a liquid crystal mode include a multi-domain vertical alignment mode as a multi-domained vertical alignment mode, a patterned vertical alignment mode, an advanced super V mode, and the like. The reason for this is that a region in which light is not transmitted occurs at the boundary between domains in the case of the multi-domained vertical alignment mode. Effects of the present embodiment other than those described above are the same as in Embodiment 8.

The display units of the display panel have a striped color pixel alignment in order to create a color display, but the arrangement direction of the color stripes may be the aforementioned second direction in the present invention. The display units may also be formed in a square.

Figure 38:
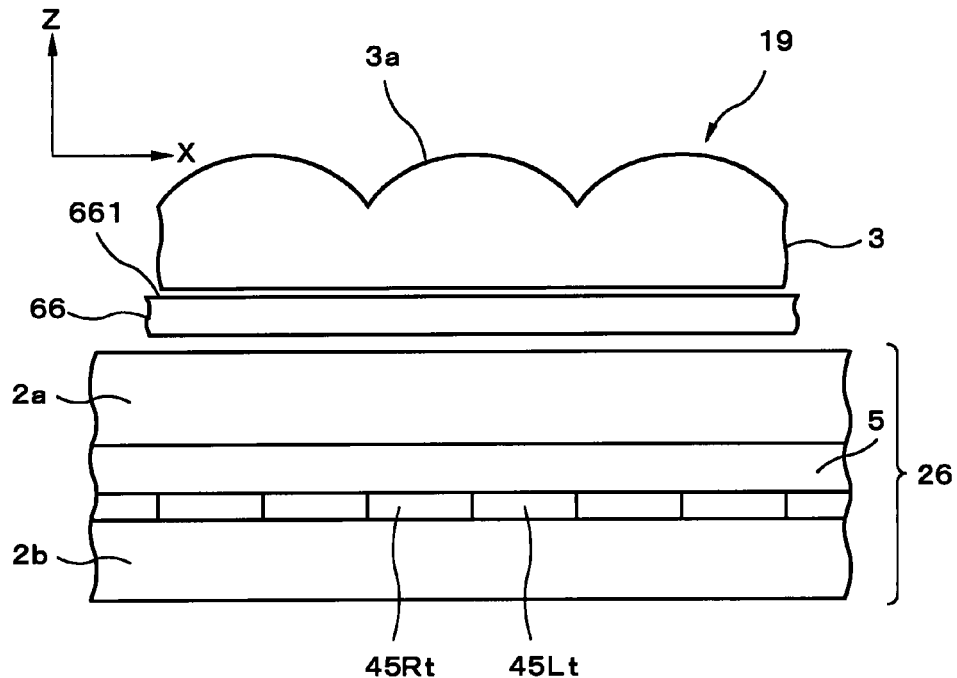
FIG. 38 is a sectional view showing the display device according to Embodiment 10 of the present invention.
Figure 39:
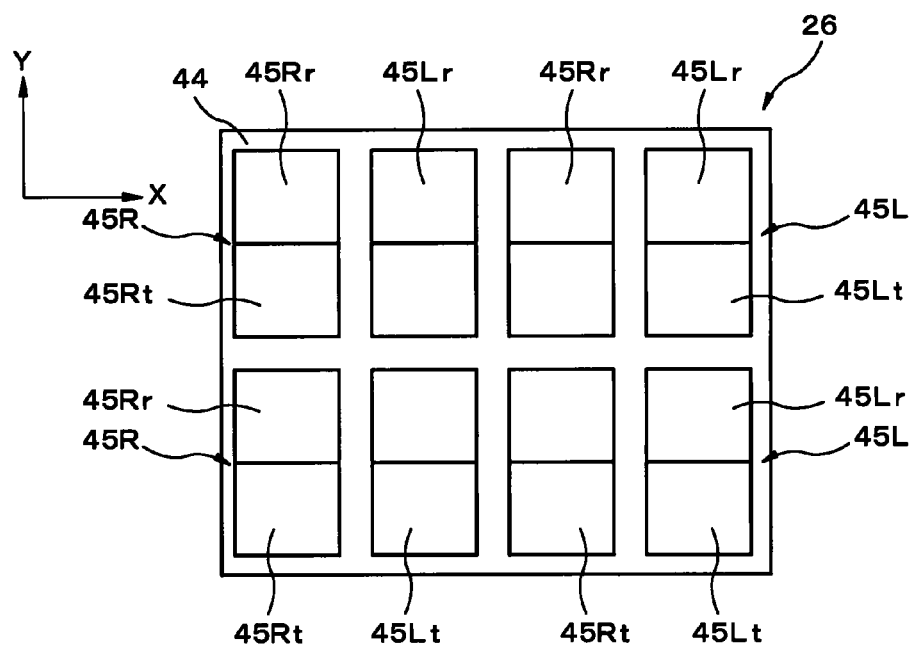
FIG. 39 is a top view showing pixels of the transmissive liquid crystal display panel according to the present embodiment.

Embodiment 10 of the present invention will next be described. FIG. 38 is a sectional view showing the display device according to the present embodiment, and FIG. 39 is a top view showing pixels of the display panel shown in FIG. 38. Embodiment 10 differs from Embodiment 7 in that a semi-transmissive liquid crystal display panel is used in which a region for transmissive display and a region for reflective display are both provided in the display region of each pixel.

Specifically, as shown in FIG. 38, the transmissive liquid crystal display device 19 in the present embodiment differs from the transmissive liquid crystal display device 16 in Embodiment 7 of the present invention in that a semi-transmissive liquid crystal display panel 26 is used. The lenticular lens 3 and the anisotropic scattering sheet 66 as other constituent elements are the same as in Embodiment 7.

As shown in FIG. 39, the left-eye pixels 45L and the right-eye pixels 45R in the semi-transmissive liquid crystal display panel 26 of Embodiment 10 have a light-blocking region 44 on the periphery of display region of each pixel. The light-blocking region 44 has a shape in which numerous lines extending in the X-axis direction are combined with numerous lines extending in the Y-axis direction. A transmissive display region and a reflective display region are formed in the display region of each pixel that is surrounded by the light-blocking region 44. Specifically, a transmissive display region 45Lt and a reflective display region 45Lr are formed in each left-eye pixel 45L, and the display regions are arranged so as to divide each pixel into two portions that are arranged in the Y-axis direction. A transmissive display region 45Rt and a reflective display region 45Rr are formed in each right-eye pixel 45R in the same manner. Specifically, the transmissive display regions and the reflective display regions extend in horizontal lines in the X-axis direction when multiple pixels are viewed at once. Aspects of the present embodiment other than those described above are the same as in Embodiment 7.

In the present embodiment, the anisotropic scattering effects of the anisotropic scattering sheet make it possible to reduce a striped pattern in the direction parallel to the image allocation direction of the lenticular lens and improve image quality without compromising the image allocation effects of the lenticular lens as the image allocation part, in the same manner as in Embodiment 7. In the present embodiment in particular, a striped pattern in the image allocation direction that occurs during transmissive display and reflective display can be reduced. For example, the reflective display regions appear the same as the light-blocking region in the case of transmissive display, and particularly when the surrounding area is dark, and external light does not contribute to the display. Consequently, when there is no anisotropic scattering part, not only does the light-blocking region create a striped pattern, but the reflective display regions appear as a striped pattern, and the display quality is significantly reduced. During transmissive display in the present embodiment, the anisotropic scattering part reduces the striped pattern caused by the light-blocking region, as well as the striped pattern caused by the reflective display regions, and the quality of transmissive display can therefore be enhanced. In the same manner, the transmissive display regions appear the same as the light-blocking region in the case of reflective display, and particularly when the surrounding area is bright, and the reflective display dominates so as to make the transmissive display invisible. Consequently, when there is no anisotropic scattering part, not only does the light-blocking region create a striped pattern, but the transmissive display regions appear as a striped pattern, and the display quality is significantly reduced. During reflective display in the present embodiment, the anisotropic scattering part can reduce the striped pattern caused by the light-blocking region, as well as the striped pattern caused by the transmissive display regions, and the quality of reflective display can therefore be enhanced. Specifically, the quality of transmissive display and reflective display in the semi-transmissive liquid crystal display device can be enhanced. Effects of the present embodiment other than those described above are the same as in Embodiment 7.

Figure 40:
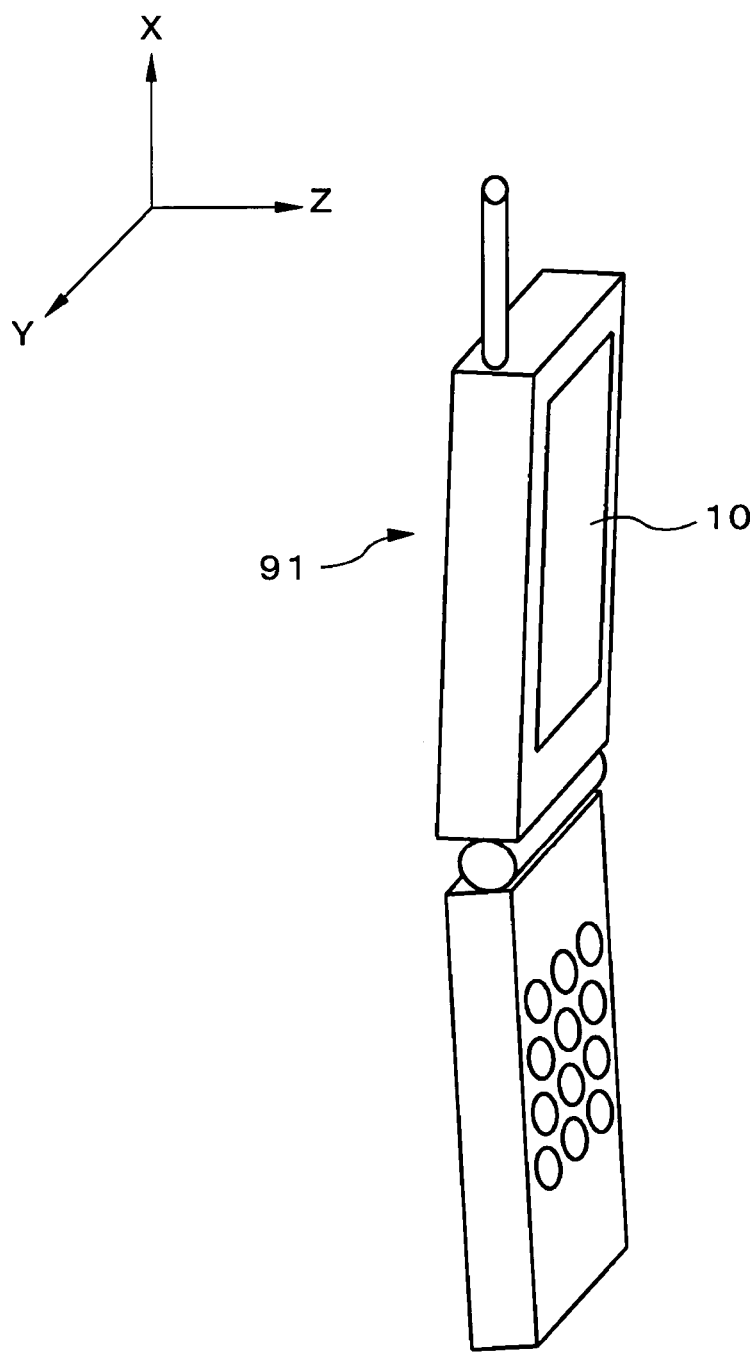
FIG. 40 is a perspective view showing the terminal device according to Embodiment 11 of the present invention.

Embodiment 11 of the present invention will next be described. FIG. 40 is a perspective view showing the terminal device according to the present embodiment, and FIG. 41 is a sectional view showing the display device according to the present embodiment.

Figure 41:
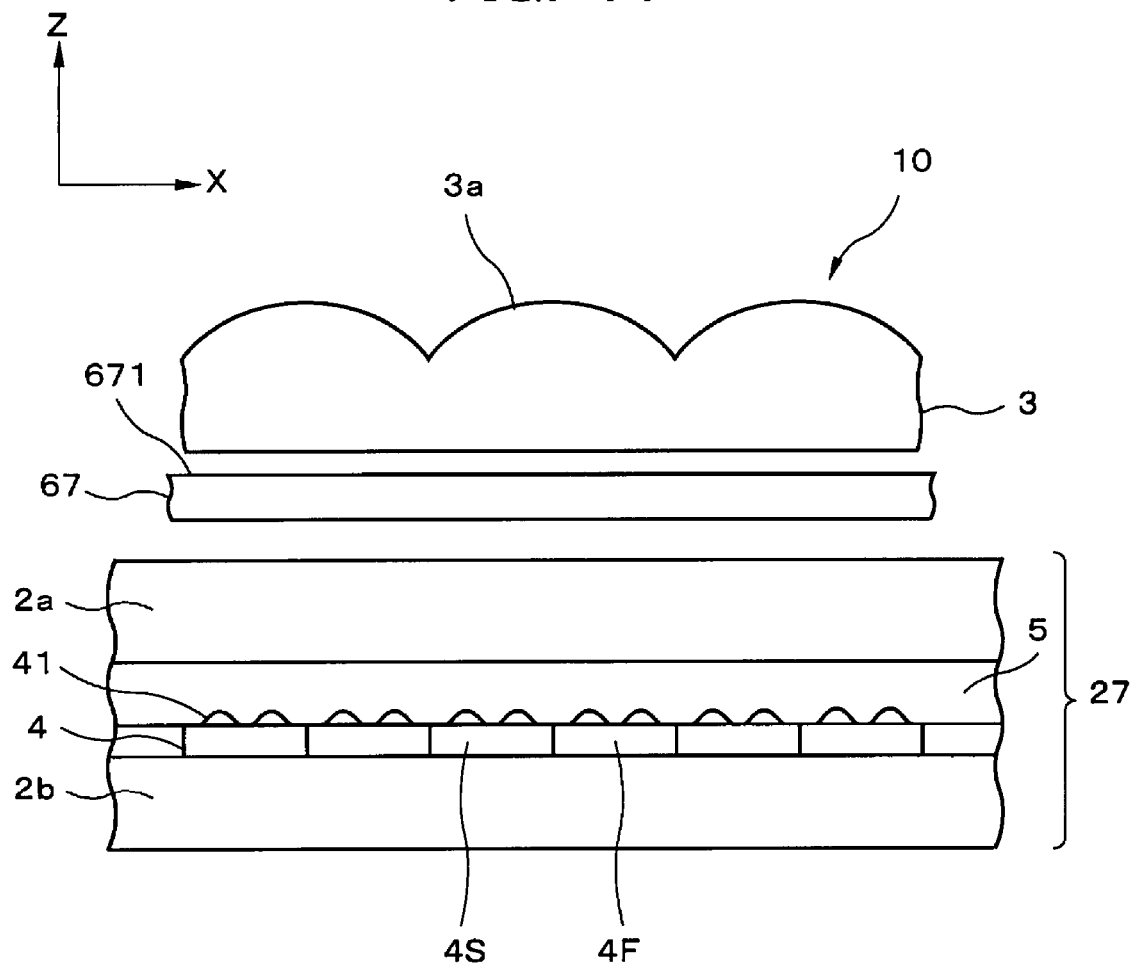
FIG. 41 is a sectional view showing the display device according to the present embodiment.

As shown in FIGS. 40 and 41, the reflective image display device 10 of the present embodiment is incorporated into a mobile telephone 91 as the terminal device. The present embodiment differs from Embodiment 1 in that the longitudinal direction of the cylindrical lenses 3*a* that constitute the lenticular lens 3, i.e., the Y-axis direction, is the transverse direction of the image display device, i.e., the horizontal direction of the image, and the arrangement direction of the cylindrical lenses 3*a*, i.e., the X-axis direction, is the longitudinal direction, i.e., the vertical direction of the image.

As shown in FIG. 40, a plurality of pixel pairs each composed of a first-viewpoint pixel 4F and a second-viewpoint pixel 4S is arranged in a matrix in a reflective liquid crystal display panel 27. The arrangement direction of the first-viewpoint pixel 4F and the second-viewpoint pixel 4S in a single pixel pair is the X-axis direction as the arrangement direction of the cylindrical lenses 3*a*, and is the longitudinal direction (vertical direction) of the screen. The pixels 4F and 4S have the same structure as described in Embodiment 1. Furthermore, the direction of maximum scattering by the anisotropic scattering sheet 67 is set to the X-axis direction, and the direction of minimum scattering is set to the Y-axis direction. Aspects of the present embodiment other than those described above are the same as in Embodiment 1.

The operation of the image display device of the present embodiment will next be described, and although the basic operation is the same as in Embodiment 1, the displayed image differs. The first-viewpoint pixels 4F of the reflective liquid crystal display panel 27 display an image for a first viewpoint, and the second-viewpoint pixels 4S display an image for a second viewpoint. The image for the first viewpoint, and the image for the second viewpoint are planar images having different displayed content, and are not a three-dimensional image having a parallax difference. The images may also be independent of each other, or may show related information.

Advantages of the present embodiment are that not only can a reduction in image quality due to the lenticular lens and the concavo-convex structure of the reflecting panel be prevented without significantly compromising the image allocation effects of the lenticular lens, but the observer can selectively view the first-viewpoint image or the second-viewpoint image merely by varying the angle of the mobile telephone 91. Convenience is enhanced particularly when the first-viewpoint image and the second-viewpoint image are related, because it is possible to switch between the images by the simple method of varying the viewing angle. When the first-viewpoint image and the second-viewpoint image are arranged in the transverse direction, different images may be observed by the right eye and the left eye according to the viewing position. In this case, the observer becomes confused and unable to recognize the image of each viewpoint. However, as shown in the present embodiment, when images for a plurality of viewpoints are arranged in the longitudinal direction, the observer is always able to see the image for each viewpoint with both eyes, and the images are therefore easily recognizable. Effects of the present embodiment other than those described above are the same as in Embodiment 1. The present embodiment may also be combined with any of Embodiments 2 through 10.

In Embodiments 1 through 11, examples were described of an image display device mounted in a mobile telephone or the like that displays a three-dimensional image by providing an image that has a parallax difference with respect to the left and right eyes of a single observer, or that simultaneously provides multiple types of images to a single observer. However, the present invention is not limited by this configuration, and a large-sized display panel may be provided for supplying multiple different images to multiple observers. This is also true for all of the remaining embodiments from Embodiment 12 onwards, as described below.

Figure 42:
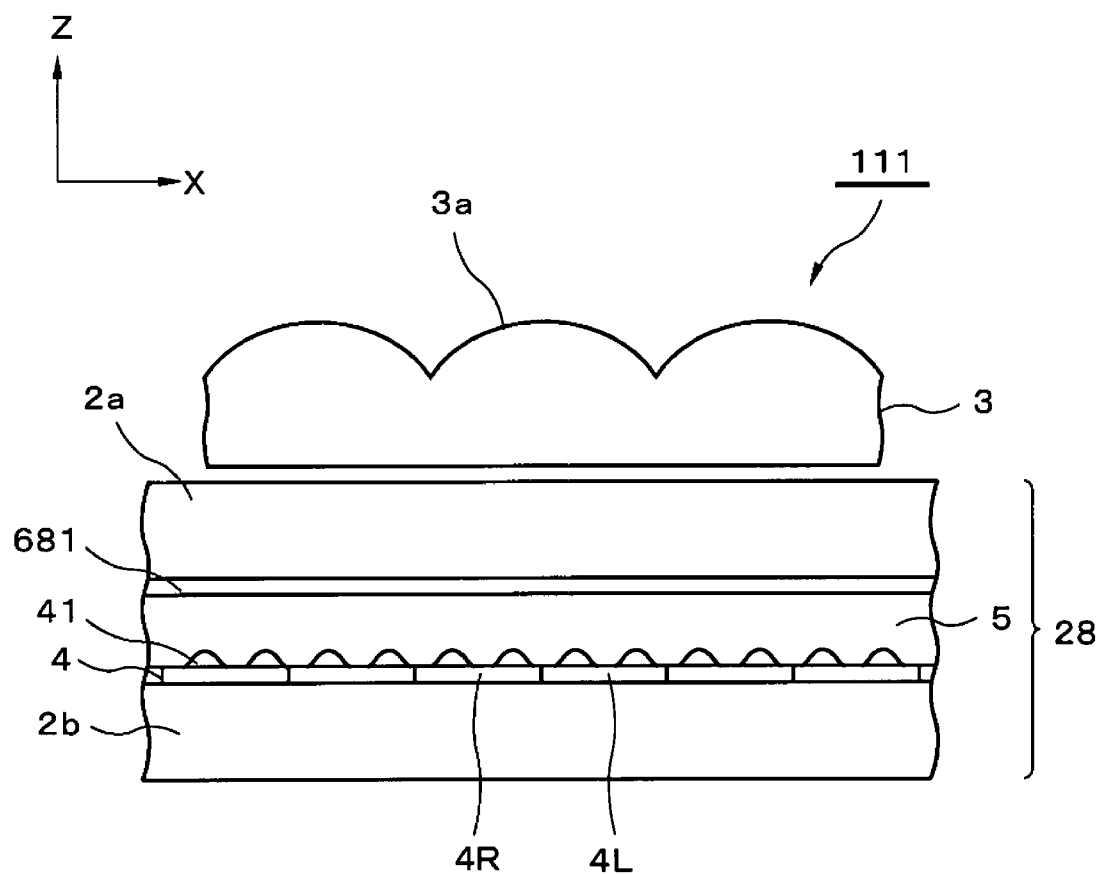
FIG. 42 is a sectional view showing the display device according to Embodiment 12.

A description shall now be provided of Embodiment 12 of the present invention. FIG. 42 is a sectional view showing a display device according to Embodiment 12. Embodiment 12 differs dramatically from Embodiment 1 of the present invention in that an anisotropic scattering layer 681 and not an anisotropic scattering sheet is provided within the substrate 2*a*. Specifically, Embodiment 12 is an "in-cell" type display panel wherein the anisotropic scattering layer is built into the panel.

As shown in FIG. 42, a reflective liquid crystal display panel 28 is used in a reflective liquid crystal display device 111 according to the present embodiment. A reflective panel 4 is not formed in the substrate constituting the reflective liquid crystal display panel 28, and the anisotropic scattering layer 681 is disposed on a liquid crystal layer 5 of the substrate 2*a* disposed on the +z direction side, which is the observer side. Except as indicated above, the structure of the present embodiment is the same as that of Embodiment 1.

An anisotropic scattering layer is used in the present embodiment, as in Embodiment 1, thereby making it possible to minimize any deterioration in the display quality due to the combined use of a lenticular lens with the concavo-convex structure of the reflecting panel, without dramatically compromising the image allocation effect of the lenticular lens. It is also possible to use a glass substrate or lenticular lens similar to those that are conventionally used, without requiring an anisotropic scattering glue or anisotropic scattering sheet. It is accordingly possible to use fewer members, reduce cost, and provide a thinner profile. It is also possible to locate the anisotropic scattering layer near the reflecting panel, thereby enabling positioning precision to be improved within the display surface and in the thickness direction, reducing error, and improving image quality.

The anisotropic scattering layer of the present embodiment can be formed using photolithographic techniques as well as the 2P method. Instead of the anisotropic scattering layer, an anisotropic scattering structure may also be provided to the surface of the substrate 2*a* on the liquid crystal layer. An overcoat layer may be provided to the liquid crystal side of the anisotropic scattering structure. This will smoothen out any irregularity caused by the anisotropic scattering structure, and improve the orientability of the liquid crystal molecules. The anisotropic scattering layer may be included in the color layer of a color filter used to provide a colored display. Except as indicated above, the structure of the present embodiment is the same as that of Embodiment 1.

Figure 43:
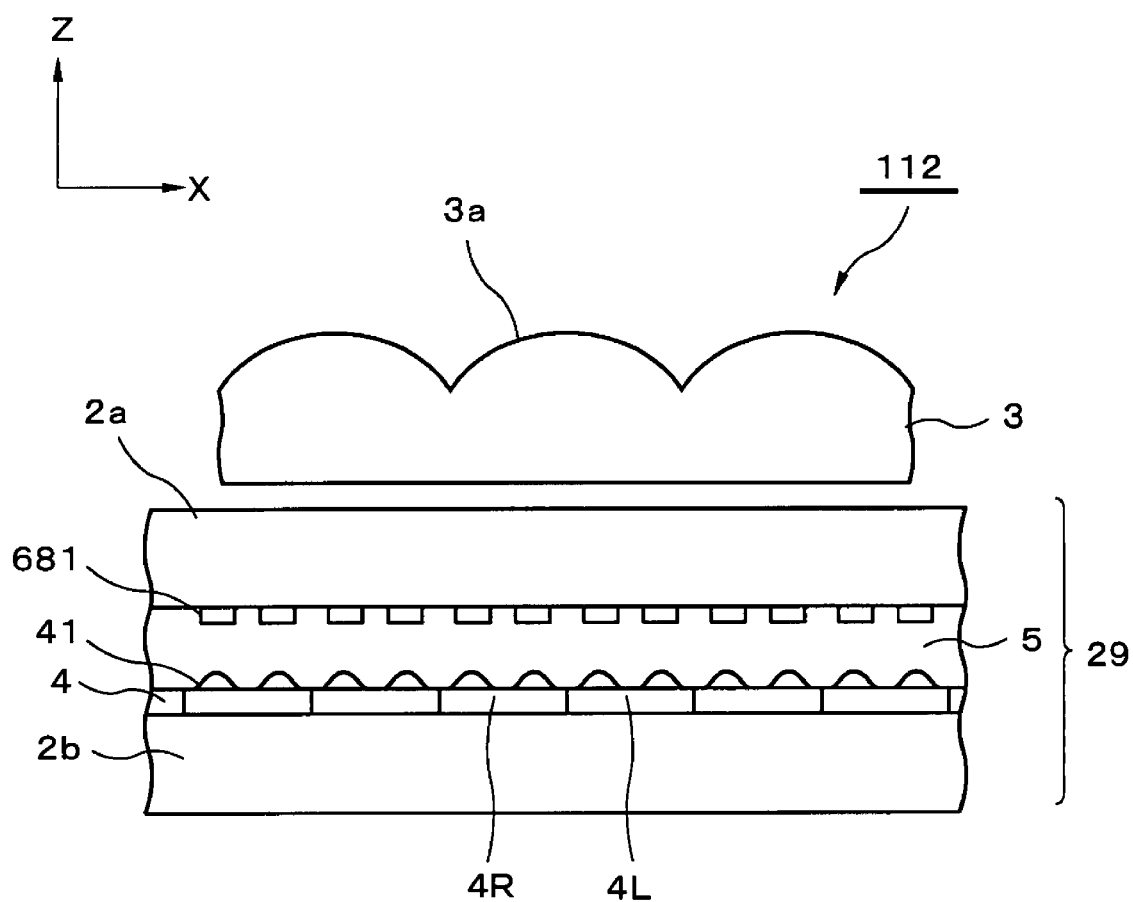
FIG. 43 is a sectional view showing the display device according to Embodiment 13.

A description shall now be provided for Embodiment 13 of the present invention. FIG. 43 is a sectional view showing a display device according to Embodiment 13. Embodiment 13 differs from Embodiment 12 in that a pattern is provided to the anisotropic scattering layer 681.

Specifically, as shown in FIG. 43, a reflective liquid crystal display panel 29 is used in a reflective liquid crystal display device 112 according to the present embodiment. The anisotropic scattering layer 681 is disposed on the liquid crystal layer 5 side of the substrate 2a. A so-called "in-cell" configuration is adopted. The anisotropic scattering layer 681 is disposed within the display surface in parts but not the entirety thereof. The anisotropic scattering layer 681 is positioned correspondingly with regard to the position of the concavo-convex structure of the reflecting panel. For example, the position of the concavo-convex structure in the display surface is the same as the position of the anisotropic scattering layer 681 in the display surface. Except as indicated above, the structure of the present embodiment is the same as that of Embodiment 12.

In the present embodiment, the anisotropic scattering layer is disposed correspondingly with regard to the concavo-convex structure of the reflecting plate, thereby minimizing any deterioration in display quality due to the combined use of the lenticular lens with the concavo-convex structure of the reflecting plate. Since the anisotropic scattering layer can be placed solely in regions in which problems are likely to occur, the effect on other regions can be minimized. For example, [the embodiment] can be suitably used with semi-transmissive liquid crystal display panels, and the anisotropic scattering layer may be disposed solely in the reflecting display region so that the transmitting display region will not be adversely affected.

The fact that the anisotropic scattering effect has a distribution within the display plane is important in the present embodiment. Accordingly, the anisotropic scattering effect of the anisotropic scattering layer has a distribution within the surface without a pattern being applied, and may be present solely in the necessary areas. Specifically, the scattering effect of the scattering layer is imparted with an in-plane distribution, and the layer is effective in improving the anisotropic scattering effect only near the concavo-convex structures of the reflecting panel. Except as indicated above, the structure of the present embodiment is the same as that of Embodiment 12.

Figure 44:
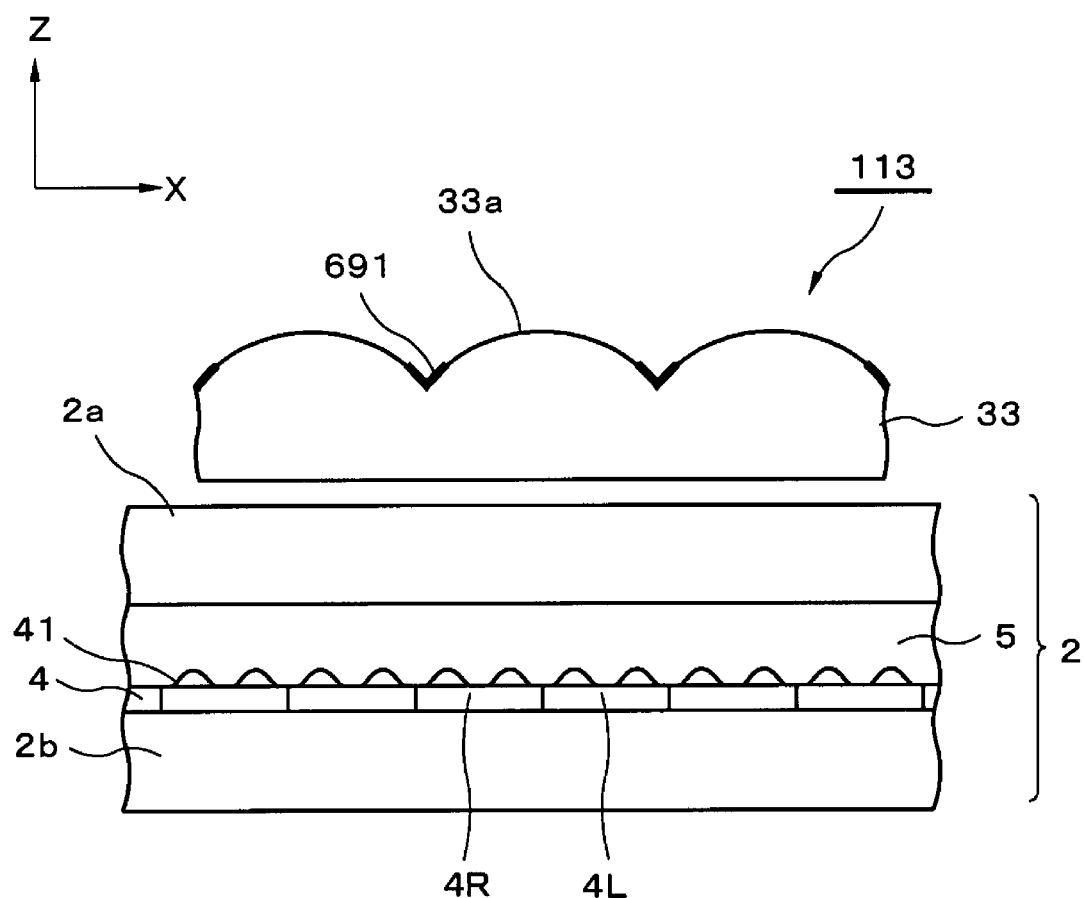
FIG. 44 is a sectional view showing the display device according to Embodiment 14.

A description shall now be provided for Embodiment 14 of the present invention. FIG. 44 is a sectional view showing a display panel according to Embodiment 14. Embodiment 14 differs dramatically from Embodiment 1 of the present invention in that instead of an anisotropic scattering sheet an anisotropic scattering structure is provided to the curved surface part of the lens.

Specifically, as shown in FIG. 44, a lenticular lens 33 having numerous cylindrical lenses 33a is used in a reflective liquid crystal display panel 113 according to the present embodiment. Anisotropic scattering structures 691 are provided to the lenticular lens 33 in the valley regions between adjoining cylindrical lenses 33a. Except as indicated above, the structure of the present embodiment is the same as that of Embodiment 1.

Anisotropic scattering structures are provided to the curved surface regions of the lens in the present embodiment, thereby making it possible to minimize any deterioration in display quality due to the combined use of the lenticular lens and the concavo-convex structures of the reflecting panel. The surface on which the anisotropic scattering structures are formed can be situated apart from the focal point of the lenticular lens, allowing excellent image quality to be obtained. The anisotropic scattering structures are provided to the valley regions between adjacent cylindrical lenses, preventing image separation performance from being compromised in the vicinity of the optical axis, where aberration is minimal and exceptional image separation performance is obtained. Specifically, the region where exceptional image separation performance is obtained is utilized for separating images, and the region where image separation performance is reduced is used for anisotropic scattering, whereby performance can be achieved in both respects.

Although the lenticular lens itself must be changed in the present embodiment, this can be accomplished by performing supplementary machining of the existing mold. Accordingly, the configuration of the lenticular lens; i.e., the configuration of the regions that are to serve as the lens, does not have to be changed. In the case that the anisotropic scattering structures are added in the mold, the valley regions between adjacent lenses will be the convex regions in the mold; therefore, the topmost region thereof may be machined. Machining the topmost region is more readily performed than machining the valley regions in the mold. Specifically, the mold may be ground only in the direction in which the lenses are arranged, and cutouts intentionally provided. Except as indicated above, the structure of the present embodiment is the same as that of Embodiment 1.

Figure 45:
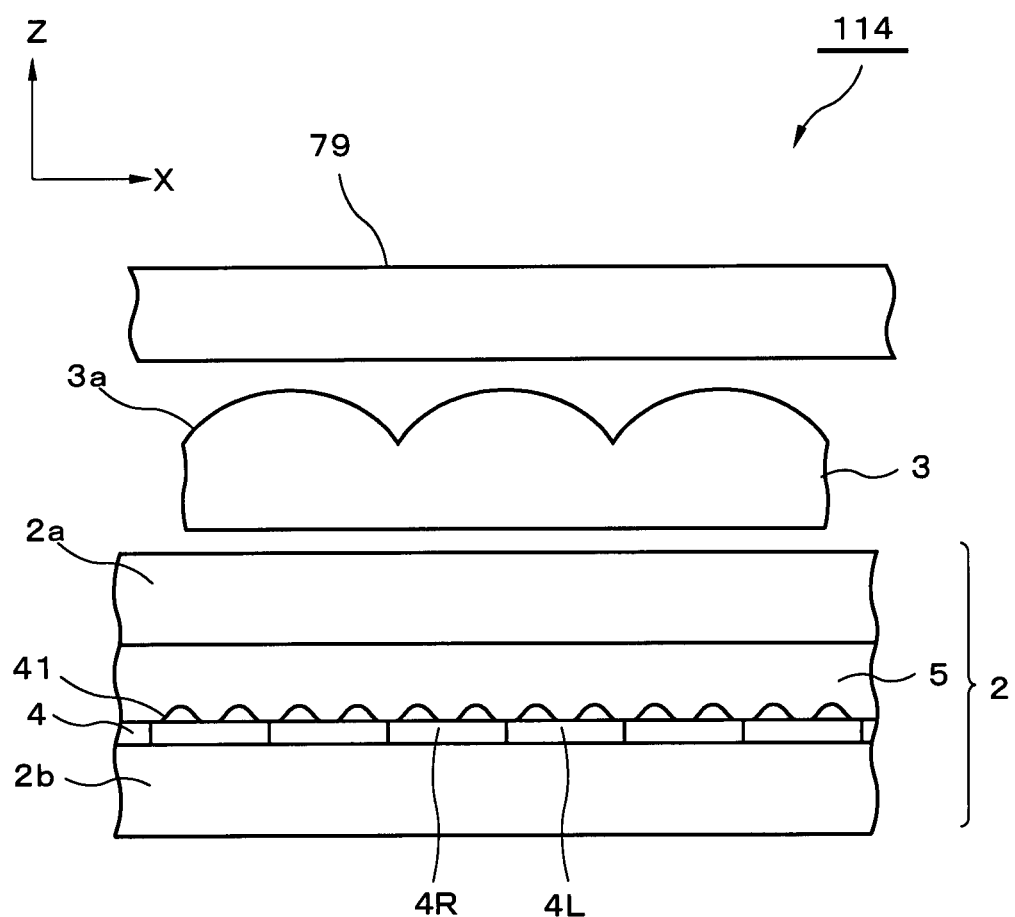
FIG. 45 is a sectional view showing the display device according to Embodiment 15.

A description shall now be provided in regard to Embodiment 15 of the present invention. FIG. 45 is a sectional view showing a display device according to Embodiment 45. Embodiment 45 differs from Embodiment 1 in that an anisotropic scattering sheet is not used, a protective sheet is provided to the observer side of the lenticular lens, and the protective sheet has anisotropic scattering capabilities.

Specifically, as shown in FIG. 45, a protective sheet 79 is disposed on the +Z direction side (observer side) of the lenticular lens 3 in a reflective liquid crystal display device 114 according to the present embodiment. The protective sheet 79 protects the display panel 2 and the lenticular lens 3 from the exterior. The protective sheet 79 has anisotropic scattering capabilities. The direction in which light is anisotropically scattered and other aspects of basic anisotropic scattering performance are the same as those in Embodiment 1. Except as indicated above, the structure of the present embodiment is the same as that of Embodiment 1.

The present embodiment does not require the display panel or lenticular lens to be changed, allows the present invention to be used, and makes it possible to minimize any deterioration in display quality due to the combined use of the lenticular lens and the concavo-convex structures of the reflective panel.

In the present embodiment, the anisotropic scattering structures may be formed on the −Z surface, which is the side surface of the protective sheet on the lenticular lens side. A touch panel may also be disposed instead of the protective sheet. If the region that demonstrates an anisotropic scattering effect is situated apart from the lenticular lens, the display will become fuzzy; therefore, the region is preferably disposed in the region near the lens, whenever possible. Except as indicated above, the structure of the present embodiment is the same as that of Embodiment 1.

Figure 46:
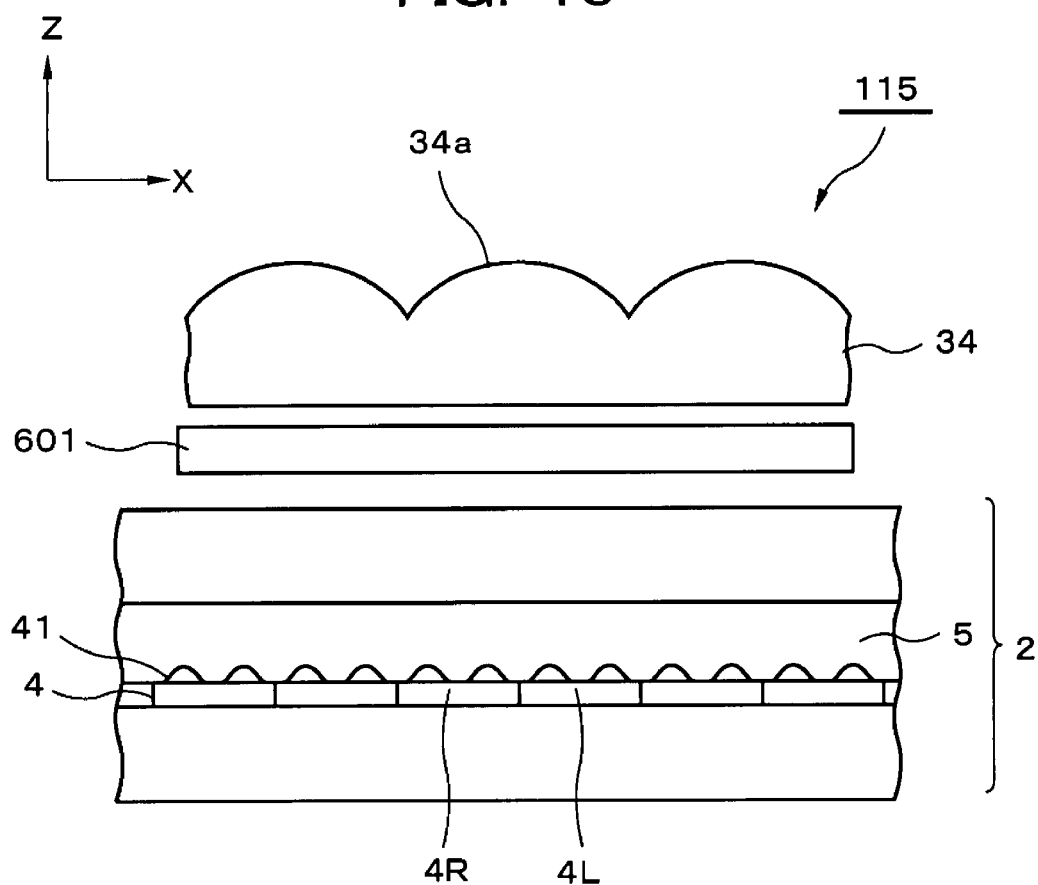
FIG. 46 is a sectional view showing the display device according to Embodiment 16.
Figure 47:
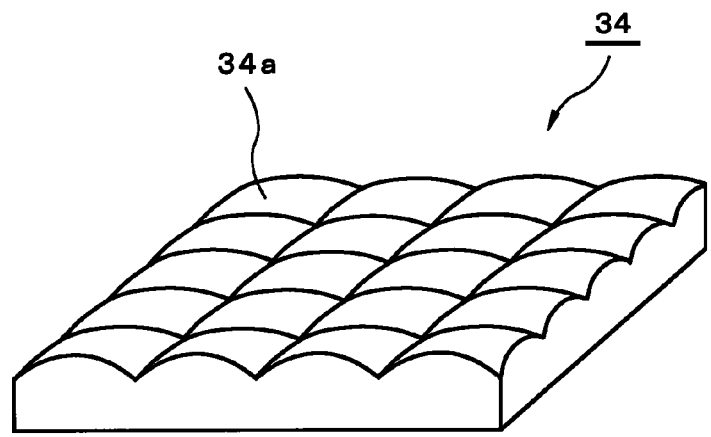
FIG. 47 is a perspective view showing a fly-eye lens that is a structural element of the display device according to the present embodiment.
Figure 48:
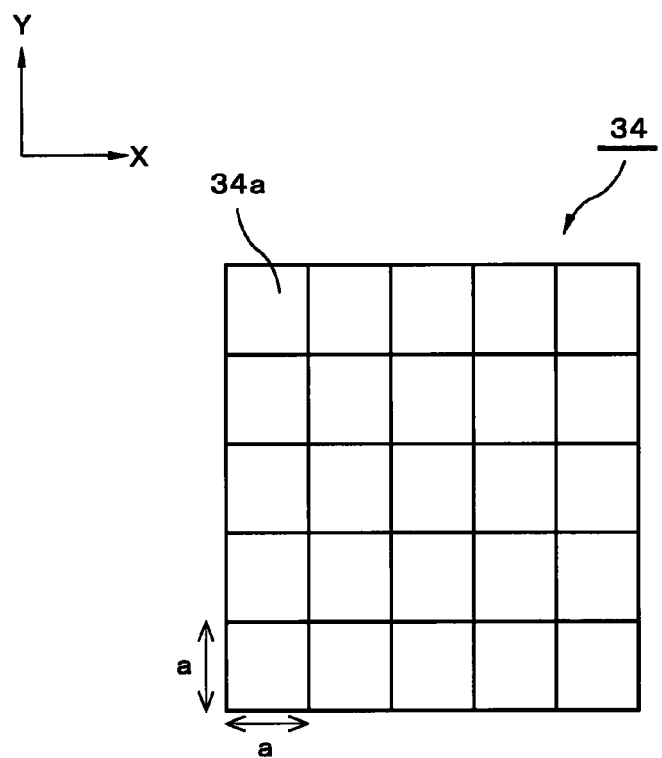
FIG. 48 is a top view showing the fly-eye lens.
Figure 49A:
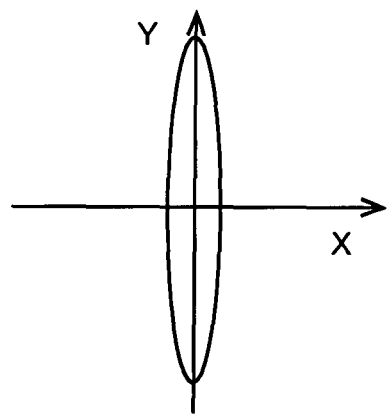
FIG. 49A shows scattering characteristics of Embodiment 1 of the present invention.
Figure 49B:
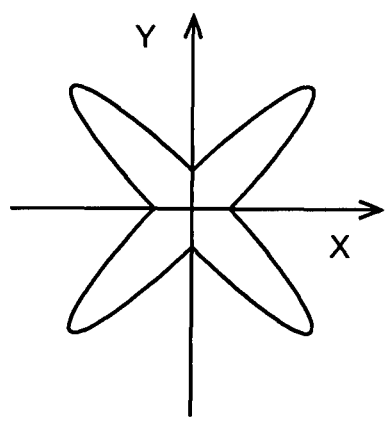
FIG. 49B shows scattering characteristics of Embodiment 16.

A description shall now be provided in regard to Embodiment 16 of the present invention. FIG. 46 is a sectional view showing a display device according to Embodiment 46; FIG. 47 is a perspective view showing a fly-eye lens that is a structural element of the display device according to the present embodiment; FIG. 48 is an top view showing the fly-eye lens; and FIG. 49 shows diagrams relating to an anisotropic scattering sheet, wherein FIG. 49A shows scattering characteristics of Embodiment 1 of the present invention, and FIG. 49B shows scattering characteristics of Embodiment 16. Embodiment 16 differs from Embodiment 1 in that a fly-eye lens is used in stead of a lenticular lens. In addition, the anisotropic scattering sheet has biaxial scattering characteristics that yield strong scattering in an X-shaped configuration. Specifically, the present embodiment is able to create an image allocation effect in a plurality of directions in the display surface. The embodiment may accordingly be suitably used in display devices providing three-dimensional viewing even if the screen is rotated, and in display devices of an integral photography format, wherein different parallax images can be viewed even in cases where the point of view is moved in the vertical direction as well as the horizontal direction.

As shown in FIG. 46, different structural elements are used in a reflective liquid crystal display device 115 according to the present embodiment, but the basic structure in the Z-axis direction is the same as that used in Embodiment 1. Specifically, a fly-eye lens 34 is disposed on the display surface side of a reflective display panel 2. An anisotropic scattering sheet 601 is disposed between the fly-eye lens 34 and the reflective display panel 2.

As shown in FIGS. 47 and 48, the fly-eye lens 34 is an image-separating optical member provided in order to separate light emitted from pixels on the reflective display panel 2 into different directions. The fly-eye lens 34 is a lens array in which numerous microlenses 34a are arranged in a two-dimensional array. In particular, the microlenses 34a in the present embodiment have a two-dimensional spherical configuration so that the fly-eye lens 34 will demonstrate a separating action in the Y-axis direction as well as in the X-axis direction. The microlenses 34a are configured to be arranged in the X-axis direction and the Y-axis direction. As a result, the fly-eye lens 34 is combined with a display panel in which display units comprising at least the left eye pixels 4L and the right eye pixels 4R are arranged in the form of a matrix, whereby different images can be displayed in the Y-axis direction as well as the X-axis direction. Those display units that are disposed next to one another in the Y-axis direction will be used to display images for viewpoints in the vertical direction.

In particular, the pitch of the microlenses 34a in the X-axis direction in the present embodiment is regarded to be the same as that in the Y-axis direction. Specifically, if the pitch of the microlenses 34a in the X-axis direction is defined as a, then the pitch in the Y-axis direction will also be a. Thus, in the case that microlenses having the same pitch in both directions are used, pixels having the same pitch in both directions are preferably used in the display panel as well.

In the graph shown in FIG. 49, the scattering intensity in the XY plane is expressed in terms of distance from the origin. Using this graph, a comparison is made between the scattering characteristics of the anisotropic scattering sheet 6 of Embodiment 1 and the anisotropic scattering sheet 601 of Embodiment 16. As shown in FIG. 49A, the scattering characteristics of the anisotropic scattering sheet 6 in Embodiment 1 are greatest in the Y-axis direction, and smallest in the X-axis direction. Conversely, as shown in FIG. 49B, the scattering characteristics of the anisotropic scattering sheet 601 in Embodiment 16 are greatest in the +45° directions, and smallest in the 0 and 90° directions; i.e., the X- and Y-axis directions. Specifically, the direction in which scattering is at a maximum is in the middle of the allocation directions. In other words, scattering is greatest in the direction by which the angle that forms the allocation direction is divided in to. X-shaped biaxial scattering characteristics of this type can be demonstrated using a holographic diffuser on which a two-dimensional hologram pattern has been recorded.

A description shall now be provided of the relationship between the scattering characteristics of the anisotropic scattering sheet 601 and the allocation directions of the fly-eye lens 34. The fly-eye lens 34 has an allocating effect in the X- and Y-axis directions; therefore, scattering is at a minimum, and substantially the same, in the allocation directions and the directions orthogonal thereto. The direction in which maximum scattering occurs is different from the allocation direction. This indicates that the scattering characteristics in the allocation direction are different from those in other directions. Except as indicated above, the structure of the present embodiment is the same as that of Embodiment 1.

The scattering performance of the anisotropic scattering sheet in the present embodiment is at a minimum in the 0 and 90° directions, which are the image allocation directions of the fly-eye lens. As a result, the anisotropic scattering sheet does not compromise the image allocation effect of the fly-eye lens. The scattering performance is strong in the diagonal directions; i.e., ±45°, where an image allocation effect is not important. As a result, any deterioration in the display quality caused by the combined use of the lenticular lens and the concavo-convex structures of the reflective panel is minimized, and the display quality can be improved without compromising the image allocation effect. In addition, the present invention can be effectively used in display devices having an image allocation effect in a plurality of directions within the display surface.

In the present embodiment, a description has been provided wherein maximum scattering occurs in the direction along which the angle that forms the allocation direction is divided in two. However, it will be sufficient if the direction in which maximum scattering occurs is only approximately a bisecting direction, and does not necessarily need to be a strictly bisecting direction.

In the present embodiment, a description has also been provided wherein a fly-eye lens is used as the optical means for image allocation purposes; however, this embodiment is not provided by way of limitation in regard to the present invention. Two lenticular lenses may be disposed at right angles to one another; alternatively, numerous lenticular lenses may be disposed in angles that do not involve an orthogonal configuration. It, is also possible to use a parallax barrier in which pinholes have been disposed in a two-dimensional configuration.

The anisotropic scattering sheet has been described as having maximum scattering in two directions (±45°) in the display surface, but the sheet may demonstrate multi-axial anisotropic scattering performance, wherein strong scattering occurs in several directions. The values for scattering intensity in two strong scattering directions may be different for each direction. Except as indicated above, the structure of the present embodiment is the same as that of Embodiment 1.

Figure 50:
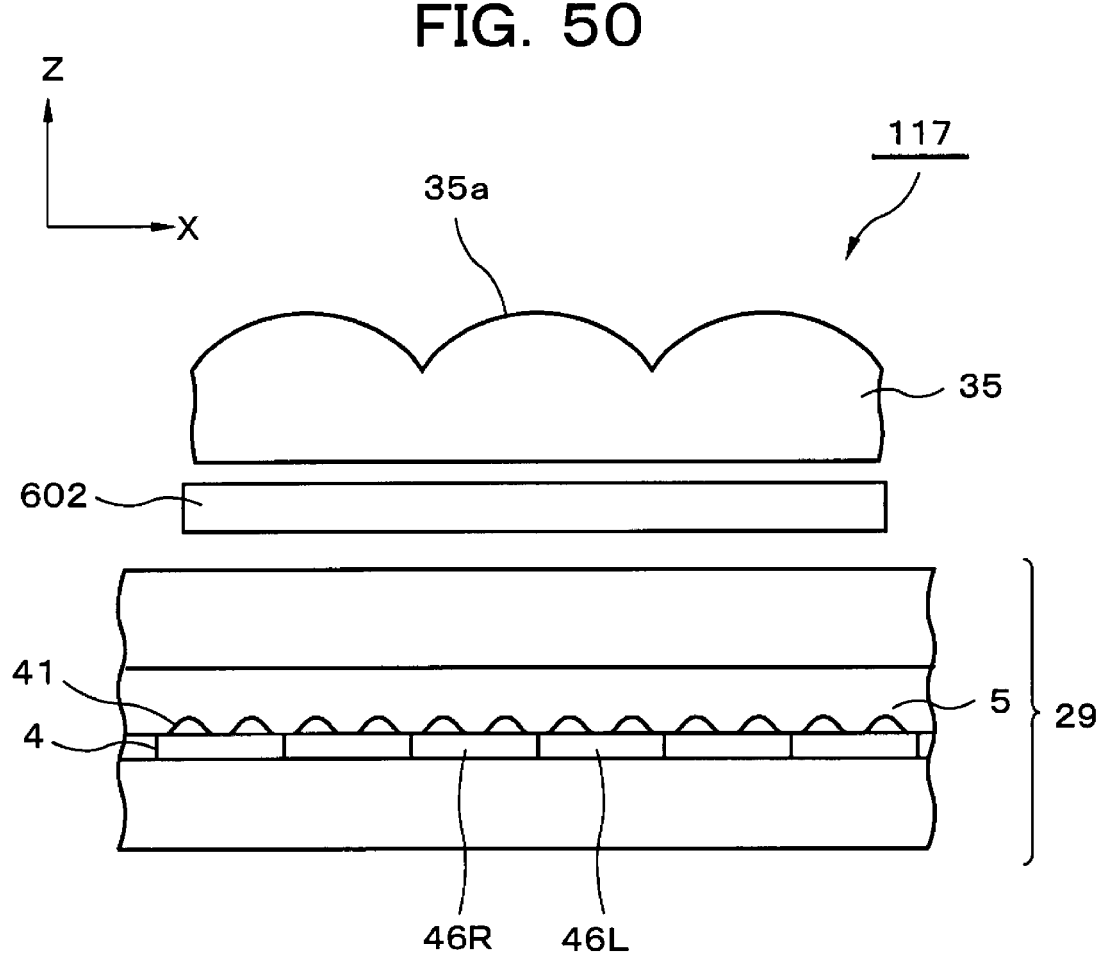
FIG. 50 is a sectional view showing the display device according to Embodiment 17.
Figure 51:
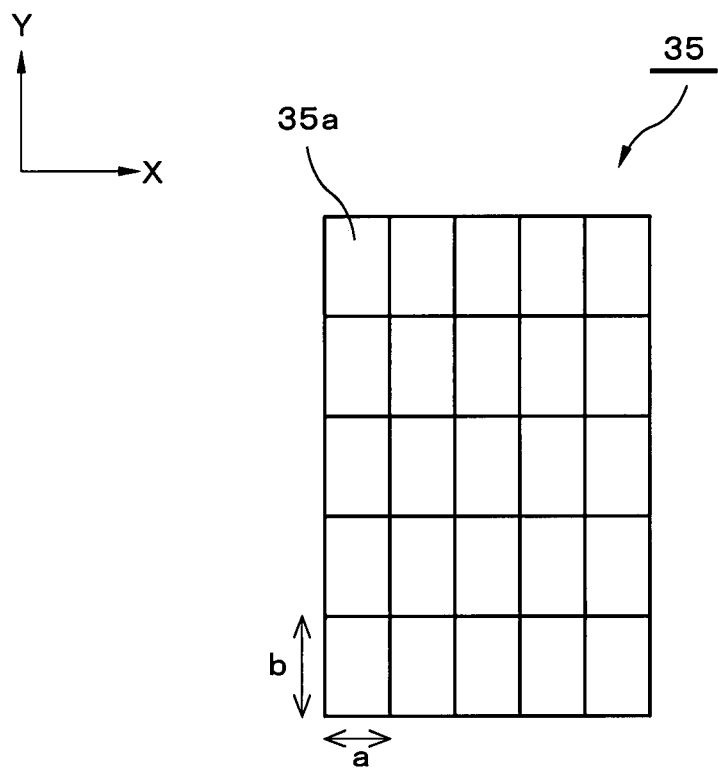
FIG. 51 is a top view showing a fly-eye lens that is a structural element of the display device according to the present embodiment.
Figure 52:
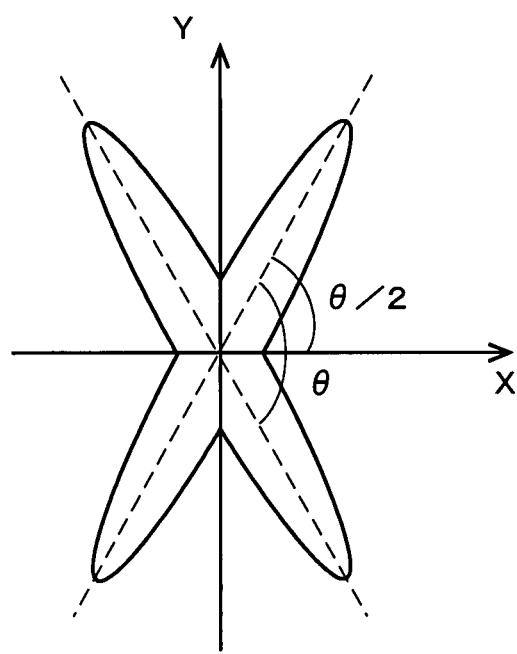
FIG. 52 is a diagram showing scattering characteristics of the anisotropic scattering part according to the present embodiment.

A description shall now be provided in regard to Embodiment 17 of the present invention. FIG. 50 is a sectional view showing the display device according to Embodiment 17. FIG. 51 is a top view showing a fly-eye lens that is a structural element of the display device according to Embodiment 17. FIG. 52 is a diagram showing scattering characteristics of the anisotropic scattering part according to Embodiment 17. FIG.

53 is a diagram showing scattering characteristics of the anisotropic scattering sheet according to the present embodiment, wherein the x-axis shows the angle within the display surface and the y-axis shows the scattering performance. Embodiment 17 differs from Embodiment 1 in regard to the pitch at which the microlenses constituting the fly-eye lens are arranged. Changing the pitch is associated with an optimization of the anisotropic scattering performance in Embodiment 17.

As shown in FIG. 50, a reflective liquid crystal display panel 29, an anisotropic scattering sheet 602, and a fly-eye lens 35 are used in a reflective liquid crystal display device 117 according to the present embodiment.

As shown in FIG. 51, microlenses 35a constituting the fly-eye lens 35 are arranged in pitch a in the X-axis direction, and in pitch b in the Y-axis direction. Specifically, the microlenses 35a have different pitch values in the X- and Y-axis directions. In association with the fly-eye lens 35, the X- and Y-axis direction pitch of the reflective liquid crystal display panel 29 are also of different values. Thus, a specific example in which the pixel pitch in the X- and Y-axis directions are different values can be cited in a case wherein the X-axis direction pitch of unit pixels constituting the display units is ⅓ the value in the Y-axis direction. Typical color display panels have pixels in three primary colors (red, green, and blue); therefore, the pixel pitch in a given direction will be ⅓ the pixel pitch in the direction orthogonal thereto. When such a display panel is used, the pitch of the microlenses in the X-axis direction will be a value that differs from the value of the pitch in the Y-axis direction. In another example where the pitch values are different, a case can be cited wherein the number of viewpoints differs in the X- and Y-axis directions, but the pixel pitch in the X- and Y-axis directions is the same. For example, in a case where there are two viewpoints in the X-axis direction and four viewpoints in the Y-axis direction, the pitch of the microlenses in the Y-axis direction is approximately four times that of the pitch in the X-axis direction. The pitch of the microlenses will thus differ depending on the structure of the display panel to be employed and the display characteristics that are to be demonstrated.

As shown in FIG. 52, an anisotropic scattering sheet 602 has X-shaped biaxial scattering characteristics, in a manner similar to Embodiment 16; however, the directions in which maximum scattering occurs are different. Specifically, the directions in which maximum scattering occurs are the directions rotated +θ/2 and −θ/2 relative to the X-axis direction. The angle θ is a cross angle formed by the two directions of maximum scattering. Two cross angles exist: θ and 180°−θ; however, in the present embodiment θ is defined as 0°≤θ≤90°, with the smaller angle being the cross angle. If this cross angle θ is used, the angle of placement in the direction of maximum scattering can be expressed as being in two directions: ±θ/2.

Figure 53:
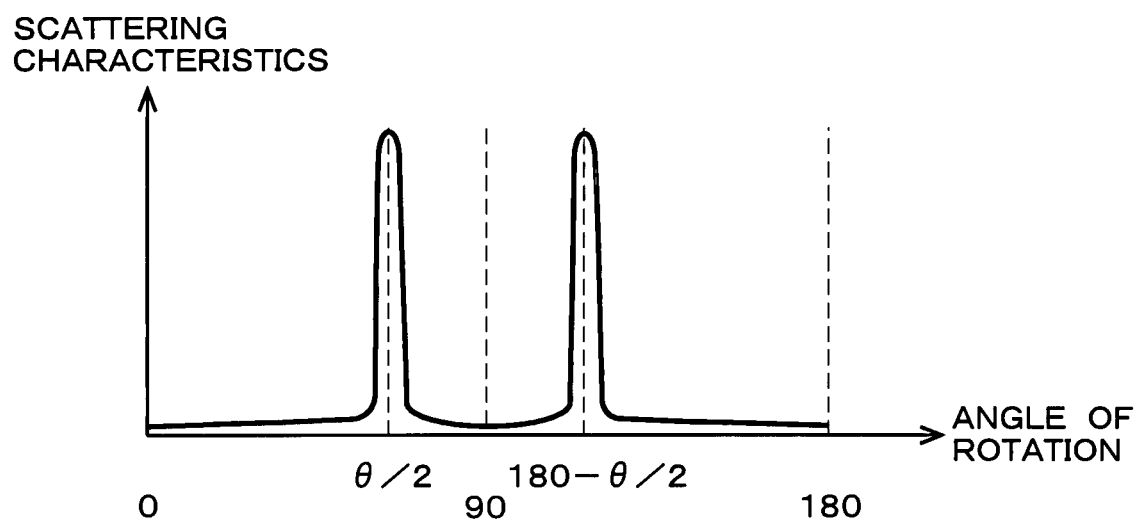
FIG. 53 is a diagram showing scattering characteristics of the anisotropic scattering sheet according to the present embodiment, wherein the x-axis shows the angle within the display plane and the y-axis shows the scattering performance.

As shown in FIG. 53, the directions in which the anisotropic scattering performance is at the minimum value are at 0 and 90°.

A detailed description shall now be provided of the relationship between the X-axis direction pitch a and Y-axis direction pitch b of the fly-eye lens of the present embodiment, and the cross angle θ and the placement angle ±θ/2 in the direction of maximum scattering. In the present embodiment, the relationship shown in Formula 44 is established using these three parameters a, b, and θ.

$$\tan(\theta/2)=b/a \qquad \text{[Formula 44]}$$

Specifically, in this relationship, it is merely that the direction in which the anisotropic scattering means produces maximum scattering is disposed in the diagonal direction of the microlenses constituting the fly-eye lens. As a result, the scattering performance in the image allocation direction of the fly-eye lens can also be reduced. Except as indicated above, the structure of the present embodiment is the same as that of Embodiment 16.

In the present embodiment, the scattering performance of the anisotropic scattering sheet is at a minimum in the 0° and 90° directions, which are the image allocation directions of the fly-eye lens. As a result, the anisotropic scattering sheet will not compromise the image allocation effect of the fly-eye lens. Scattering performance is strong in the diagonal directions, in which the image allocation effect is not important. This prevents any deterioration in display quality due to the combined use of a lenticular lens and the concavo-convex structures of the reflective panel, and enables the display quality to be improved, without the image allocation effect being compromised. The present invention is preferably used in particular with display devices wherein the pixel pitch value and number of viewpoints are different in the X- and Y-axis directions.

Formula 44 stipulates conditions at which the maximum effect of the present invention can be demonstrated; however, the value determined using this formula is not provided by way of limitation in regard to the present invention. For example, in Embodiment 16, the anisotropic scattering direction may remain the same, while merely the lens pitch in the fly-eye lens is changed; conversely, the pitch may remain the same while the anisotropic scattering placement angle and cross angle can be changed.

The concept of using the Y-axis direction lens pitch b in the fly-eye lens as the X-axis direction lens pitch a in Embodiment 17 was employed in Embodiment 16. Therefore, according to Formula 44, $\tan(\theta/2)=a/a=1$, and $\theta/2=45°$. Except as indicated above, the structure of the present embodiment is the same as that of Embodiment 16.

The above embodiments may be implemented individually or in combination as appropriate.

What is claimed is:

1. A display device, comprising:
a planar light source for emitting light in a plane via a concavo-convex structure on a surface or interior thereof;
a display panel, disposed in front of said planar light source, in which a plurality of display units that includes at least pixels for displaying an image for a first viewpoint and pixels for displaying an image for a second viewpoint is arranged in a matrix, said display panel emitting the light incident from said planar light source;
an anisotropic scattering part, disposed in front of said display panel, for scattering light incident from said display panel so that scattering in a second direction is more significant than scattering in a first direction, said second direction being orthogonal to said first direction; and
an image allocation part, disposed in front of said anisotropic scattering part, for allocating light incident from said anisotropic scattering part to different directions along said first direction in which pixels for displaying an image for said first viewpoint and pixels for displaying an image for said second viewpoint are arranged in said display units,
wherein a direction of maximum scattering by said anisotropic scattering part is said second direction,
wherein the anisotropic scattering part has a transparent sheet, and a plurality of convex parts or a plurality of concave parts on a surface of the transparent sheet and extending in the first direction, the plurality of convex parts or the plurality of concave parts each having a different length in the first direction and each having a different width in the second direction, and wherein the anisotropic scattering part reduces unevenness of the emitted light caused by the concavo-convex structure.

2. The display device according to claim 1, wherein said image allocation part is a lens array that is formed so that the lenses are arranged in said first direction.

3. The display device according to claim 1, wherein said display panel has a non-displaying region that extends in said first direction.

4. The display device according to claim 2, wherein a distance H1 between said lens and said anisotropic scattering part is equal to or less than L×H/(L+3×N×P), with L referring to a pitch of said lens in said first direction, N referring to a number of viewpoints in said first direction, H referring to a distance between said lens and said pixels and P referring to a pitch of each pixel.

5. A terminal device comprising the display device according to claim 1.

6. The display device according to claim 1, wherein the plurality of convex parts or the plurality of concave parts is formed on a back side of the transparent sheet.

7. The display device according to claim 1, wherein said display units are arranged in said first and second directions in said display panel, and said display panel has color filters extending in said first direction and arranged in a striped pattern in which the color filters having different colors are aligned in said second direction.

8. The display device according to claim 1, wherein each of said pixels in said display panel has a quadrangular display region and a light blocking region surrounding said quadrangular display region, said quadrangular display region being enclosed by first and second sides, said first sides extending in said first direction and said second sides crossing said first sides and being inclined with respect to said second direction.

9. The display device according to claim 1, wherein each of said pixels in said display panel has a trapezoidal display region having parallel opposite sides extending in said first direction, and each pair of adjacent said pixels in said first direction or said second direction are point symmetric.

10. The display device according to claim 1, wherein the plurality of convex parts or the plurality of concave parts is formed in an irregular manner.

11. A display device, comprising:
a planar light source for emitting light in a plane via a concavo-convex structure on a surface or interior thereof;
a display panel, disposed in front of said planar light source, in which a plurality of display units that includes at least pixels for displaying an image for a first viewpoint and pixels for displaying an image for a second viewpoint is arranged in a matrix, said display panel emitting the light incident from said planar light source;
an anisotropic scattering part, disposed in front of said display panel, for scattering light incident from said display panel so that scattering in a second direction is more significant than scattering in a first direction, said second direction being orthogonal to said first direction;
an image allocation part, disposed in front of said anisotropic scattering part, for allocating light incident from said anisotropic scattering part to different directions along said first direction in which pixels for displaying an image for said first viewpoint and pixels for displaying an image for said second viewpoint are arranged in said display units; and
a one-dimensional prism structure in which a plurality of one-dimensional prisms extending along the first direction is arranged such that the prisms are parallel to each other,
wherein a direction of maximum scattering by said anisotropic scattering part is said second direction, and
wherein the anisotropic scattering part reduces unevenness of the emitted light caused by the concavo-convex structure.

12. A display device, comprising:
a planar light source for emitting light in a plane via a concavo-convex structure on a surface or interior thereof;
a display panel, disposed in front of said planar light source, in which a plurality of display units that includes at least pixels for displaying an image for a first viewpoint and pixels for displaying an image for a second viewpoint is arranged in a matrix, said display panel emitting the light incident from said planar light source;
an anisotropic scattering part, disposed in front of said display panel, for scattering light incident from said display panel so that scattering in a second direction is more significant than scattering in a first direction, said second direction being orthogonal to said first direction;
an image allocation part, disposed in front of said anisotropic scattering part, for allocating light incident from said anisotropic scattering part to different directions along said first direction in which pixels for displaying an image for said first viewpoint and pixels for displaying an image for said second viewpoint are arranged in said display units; and
a one-dimensional lens array structure in which a plurality of cylindrical lenses extending along the first direction is arranged such that the cylindrical lenses are parallel to each other,
wherein a direction of maximum scattering by said anisotropic scattering part is said second direction, and
wherein the anisotropic scattering part reduces unevenness of the emitted light caused by the concavo-convex structure,
wherein a pitch of the plurality of cylindrical lenses is smaller than a pitch of the pixels.

* * * * *